United States Patent
Rackley, III et al.

(10) Patent No.: US 9,911,114 B2
(45) Date of Patent: Mar. 6, 2018

(54) METHODS AND SYSTEMS FOR MAKING A PAYMENT VIA A STORED VALUE CARD IN A MOBILE ENVIRONMENT

(75) Inventors: Brady Lee Rackley, III, Atlanta, GA (US); Warren Derek Porter, Atlanta, GA (US); Gregory Michael Rickman, Atlanta, GA (US); Kyle Leighton Cochran, Mableton, GA (US)

(73) Assignee: QUALCOMM Incorporated, San Diego, CA (US)

( * ) Notice: Subject to any disclaimer, the term of this patent is extended or adjusted under 35 U.S.C. 154(b) by 1962 days.

(21) Appl. No.: 11/428,860

(22) Filed: Jul. 6, 2006

(65) Prior Publication Data
US 2008/0040265 A1    Feb. 14, 2008

(51) Int. Cl.
*G06Q 20/32*  (2012.01)
*G06Q 20/02*  (2012.01)
(Continued)

(52) U.S. Cl.
CPC ........... *G06Q 20/325* (2013.01); *G06Q 20/02* (2013.01); *G06Q 20/023* (2013.01); *G06Q 20/10* (2013.01);
(Continued)

(58) Field of Classification Search
CPC ............................. G06Q 40/00; G06Q 20/325
(Continued)

(56) References Cited

U.S. PATENT DOCUMENTS

| 2,004 A | 3/1841 | Harris |
|---|---|---|
| 4,400,016 A | 8/1983 | Tippets |

(Continued)

FOREIGN PATENT DOCUMENTS

| EP | 1178450 | 2/2002 |
|---|---|---|
| EP | 1471475 | 10/2004 |

(Continued)

OTHER PUBLICATIONS

William Eazel, "Paypal Intros SMS payments", vnunet.com Mar. 24, 2006 http:/www.vnunet.com/articles/print/2152694.
(Continued)

*Primary Examiner* — Eric T Wong
*Assistant Examiner* — John Anderson
(74) *Attorney, Agent, or Firm* — James T. Hagler

(57) ABSTRACT

Methods and systems for making a financial payment to a payee via a stored value (SV) card utilizing a mobile device such as a mobile telephone (cellphone) or wireless connected personal digital assistant (PDA). The mobile device communicates wirelessly with a mobile financial transaction system (MFTS) that stores user information and transaction information. A user enters information via the mobile device identifying a payee and indicating a stored value card payment method. The mobile device generates a mobile payment instruction that includes information corresponding to the identified payee and indicating a stored value card payment method. The mobile payment instruction is wirelessly communicated to the MFTS. The MFTS generates an MFTS payment instruction to a payment instruction recipient that can issue a new stored value card and/or reload funds onto a pre-existing stored value card. The MFTS communicates the MFTS payment instruction to the payment instruction recipient, which arranges for payment to the identified payee by issuing a new stored value card or reloading funds onto a pre-existing stored value card.

40 Claims, 46 Drawing Sheets

(51) Int. Cl.
*G06Q 20/10* (2012.01)
*G06Q 30/04* (2012.01)
*G06Q 30/06* (2012.01)
*G06Q 40/00* (2012.01)

(52) U.S. Cl.
CPC ........... *G06Q 20/102* (2013.01); *G06Q 20/32* (2013.01); *G06Q 20/3221* (2013.01); *G06Q 20/3223* (2013.01); *G06Q 20/3255* (2013.01); *G06Q 30/04* (2013.01); *G06Q 30/06* (2013.01)

(58) Field of Classification Search
USPC .................................................. 705/40, 35
See application file for complete search history.

(56) References Cited

U.S. PATENT DOCUMENTS

| | | |
|---|---|---|
| 4,910,696 A | 3/1990 | Grossman et al. |
| 5,119,931 A | 6/1992 | Barenthsen |
| 5,208,446 A | 5/1993 | Martinez |
| 5,221,838 A | 6/1993 | Gutman et al. |
| 5,233,547 A | 8/1993 | Kapp et al. |
| 5,383,113 A | 1/1995 | Kight et al. |
| 5,387,784 A | 2/1995 | Sarradin |
| 5,590,038 A | 12/1996 | Pitroda |
| 5,649,115 A | 7/1997 | Schrader et al. |
| 5,699,528 A * | 12/1997 | Hogan ............................ 705/40 |
| 5,829,746 A | 11/1998 | Pacella |
| 5,845,211 A | 12/1998 | Roach, Jr. |
| 5,856,974 A | 1/1999 | Gervais et al. |
| 5,873,072 A | 2/1999 | Kight et al. |
| 5,884,271 A | 3/1999 | Pitroda |
| 5,903,881 A | 5/1999 | Schrader et al. |
| 5,930,778 A | 7/1999 | Geer |
| 5,991,749 A | 11/1999 | Morrill, Jr. |
| 6,029,151 A | 2/2000 | Nikander |
| 6,041,315 A | 3/2000 | Pollin |
| 6,055,567 A | 4/2000 | Ganesan et al. |
| 6,070,150 A | 5/2000 | Remington et al. |
| 6,081,790 A | 6/2000 | Rosen |
| 6,119,931 A | 9/2000 | Novogrod |
| 6,142,369 A | 11/2000 | Jonstromer |
| 6,169,890 B1 | 1/2001 | Vatanen |
| 6,185,545 B1 | 2/2001 | Resnick et al. |
| 6,286,756 B1 | 9/2001 | Stinson et al. |
| 6,289,322 B1 * | 9/2001 | Kitchen et al. ................. 705/40 |
| 6,324,525 B1 | 11/2001 | Kramer et al. |
| 6,327,577 B1 | 12/2001 | Garrison et al. |
| 6,328,207 B1 | 12/2001 | Gregoire et al. |
| 6,334,116 B1 | 12/2001 | Ganesan et al. |
| 6,352,201 B1 | 3/2002 | Novogrod |
| 6,363,362 B1 | 3/2002 | Burfield et al. |
| 6,363,364 B1 | 3/2002 | Nel |
| 6,366,893 B2 | 4/2002 | Hannula et al. |
| 6,367,693 B1 | 4/2002 | Novogrod |
| 6,442,532 B1 | 8/2002 | Kawan |
| 6,466,571 B1 | 10/2002 | Dynarski et al. |
| 6,609,113 B1 | 8/2003 | O'Leary et al. |
| 6,622,015 B1 | 9/2003 | Himmel et al. |
| 6,656,974 B1 | 12/2003 | Renn et al. |
| 6,678,664 B1 | 1/2004 | Ganesan |
| 6,684,269 B2 | 1/2004 | Wagner |
| 6,704,714 B1 | 3/2004 | O'Leary et al. |
| 6,705,520 B1 | 3/2004 | Pitroda et al. |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,814,282 B2 | 11/2004 | Seifert et al. |
| 6,819,219 B1 | 11/2004 | Bolle et al. |
| 6,836,765 B1 | 12/2004 | Sussman |
| 6,836,785 B1 | 12/2004 | Bakshi et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,866,391 B2 | 3/2005 | Krausse |
| 6,868,391 B1 | 3/2005 | Hultgren |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,988,657 B1 | 1/2006 | Singer et al. |
| 7,014,107 B2 | 3/2006 | Singer et al. |
| 7,024,396 B2 | 4/2006 | Woodward |
| 7,072,854 B2 | 7/2006 | Loeser |
| 7,089,208 B1 * | 8/2006 | Levchin ................. G06Q 20/02 705/35 |
| 7,102,620 B2 | 9/2006 | Harries et al. |
| 7,117,171 B1 | 10/2006 | Pollin |
| 7,124,937 B2 | 10/2006 | Myers et al. |
| 7,128,274 B2 | 10/2006 | Kelley et al. |
| 7,272,582 B2 | 9/2007 | Rust |
| 7,328,190 B2 * | 2/2008 | Smith et al. .................... 705/44 |
| 7,353,383 B2 | 4/2008 | Skingle |
| 7,364,071 B2 | 4/2008 | Esplin et al. |
| 7,376,583 B1 | 5/2008 | Rolf |
| 7,376,587 B1 | 5/2008 | Neofytides et al. |
| 7,376,838 B2 | 5/2008 | Narayanan |
| 7,383,226 B2 * | 6/2008 | Kight et al. .................... 705/40 |
| 7,398,252 B2 | 7/2008 | Neofytides et al. |
| 7,461,780 B2 | 12/2008 | Potts et al. |
| 7,478,062 B2 | 1/2009 | Ansley |
| 7,611,046 B2 | 11/2009 | Ahles et al. |
| 7,640,200 B2 | 12/2009 | Gardner et al. |
| 7,865,068 B2 | 1/2011 | Van Gestel et al. |
| 7,885,869 B2 | 2/2011 | Uehara et al. |
| 8,121,945 B2 | 2/2012 | Rackley, III et al. |
| 8,145,568 B2 | 3/2012 | Rackley, III et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0044776 A1 | 11/2001 | Kight et al. |
| 2002/0002535 A1 | 1/2002 | Kitchen et al. |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0032651 A1 | 3/2002 | Embrey |
| 2002/0032653 A1 | 3/2002 | Schutzer |
| 2002/0038287 A1 | 3/2002 | Villaret et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062282 A1 | 5/2002 | Kight et al. |
| 2002/0065773 A1 | 5/2002 | Kight et al. |
| 2002/0065774 A1 * | 5/2002 | Young et al. ................... 705/41 |
| 2002/0073027 A1 | 6/2002 | Hui et al. |
| 2002/0077678 A1 | 6/2002 | Andersen et al. |
| 2002/0077978 A1 | 6/2002 | O'Leary et al. |
| 2002/0077993 A1 | 6/2002 | Immonen et al. |
| 2002/0082986 A1 | 6/2002 | Lu |
| 2002/0083088 A1 | 6/2002 | Gundy et al. |
| 2002/0111906 A1 | 8/2002 | Garrison et al. |
| 2002/0116329 A1 | 8/2002 | Serbetcioglu et al. |
| 2002/0120571 A1 | 8/2002 | Maung et al. |
| 2002/0123965 A1 | 9/2002 | Phillips |
| 2002/0128968 A1 | 9/2002 | Kitchen et al. |
| 2002/0138450 A1 | 9/2002 | Kremer |
| 2002/0152160 A1 | 10/2002 | Allen-Rouman et al. |
| 2002/0152179 A1 * | 10/2002 | Racov ............................ 705/67 |
| 2002/0169713 A1 | 11/2002 | Chang et al. |
| 2002/0178062 A1 | 11/2002 | Wright et al. |
| 2003/0004891 A1 | 1/2003 | Van Rensburg et al. |
| 2003/0023524 A1 | 1/2003 | Sugimoto et al. |
| 2003/0023552 A1 | 1/2003 | Kight et al. |
| 2003/0024979 A1 | 2/2003 | Hansen et al. |

(56) References Cited

U.S. PATENT DOCUMENTS

| | | |
|---|---|---|
| 2003/0028492 A1 | 2/2003 | Levenson et al. |
| 2003/0055675 A1 | 3/2003 | Klein Twennaar |
| 2003/0055735 A1 | 3/2003 | Cameron et al. |
| 2003/0074328 A1 | 4/2003 | Schiff et al. |
| 2003/0097444 A1 | 5/2003 | Dutta et al. |
| 2003/0115126 A1 | 6/2003 | Pitroda |
| 2003/0119478 A1 | 6/2003 | Nagy et al. |
| 2003/0121967 A1 | 7/2003 | Goldberg et al. |
| 2003/0162565 A1 | 8/2003 | Al-Khaja |
| 2003/0191711 A1 | 10/2003 | Jamison et al. |
| 2003/0199312 A1 | 10/2003 | Walker et al. |
| 2003/0208441 A1 | 11/2003 | Poplawski et al. |
| 2003/0212601 A1 | 11/2003 | Silva et al. |
| 2003/0218066 A1 | 11/2003 | Fernandes et al. |
| 2003/0220884 A1 | 11/2003 | Choi et al. |
| 2003/0229590 A1 | 12/2003 | Byrne et al. |
| 2003/0233317 A1 | 12/2003 | Judd |
| 2003/0233318 A1 | 12/2003 | King et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0049456 A1 | 3/2004 | Dreyer |
| 2004/0049458 A1 | 3/2004 | Kunugi et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078329 A1 | 4/2004 | Kight et al. |
| 2004/0083170 A1 | 4/2004 | Bam et al. |
| 2004/0083171 A1 | 4/2004 | Kight et al. |
| 2004/0087339 A1 | 5/2004 | Goldthwaite et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0117302 A1 | 6/2004 | Weichert et al. |
| 2004/0122766 A1 | 6/2004 | Brooks et al. |
| 2004/0127256 A1* | 7/2004 | Goldthwaite et al. ........ 455/558 |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0199431 A1 | 10/2004 | Ganesan et al. |
| 2004/0199474 A1 | 10/2004 | Ritter |
| 2004/0203668 A1 | 10/2004 | Bowne et al. |
| 2004/0215560 A1 | 10/2004 | Amalraj et al. |
| 2004/0215564 A1 | 10/2004 | Lawlor et al. |
| 2004/0225609 A1 | 11/2004 | Greene |
| 2004/0230489 A1 | 11/2004 | Goldthwaite et al. |
| 2004/0236678 A1 | 11/2004 | Johns et al. |
| 2004/0242208 A1 | 12/2004 | Teicher |
| 2004/0243490 A1 | 12/2004 | Murto et al. |
| 2004/0249750 A1 | 12/2004 | Granzer |
| 2004/0249751 A1 | 12/2004 | Luttge |
| 2004/0249766 A1 | 12/2004 | Ganesan et al. |
| 2004/0267664 A1 | 12/2004 | Nam et al. |
| 2004/0267665 A1 | 12/2004 | Nam et al. |
| 2005/0015388 A1 | 1/2005 | Dasgupta et al. |
| 2005/0018873 A1 | 1/2005 | Rhoads |
| 2005/0038744 A1 | 2/2005 | Viijoen |
| 2005/0060261 A1 | 3/2005 | Remington et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0080634 A1 | 4/2005 | Kanniainen et al. |
| 2005/0080731 A1 | 4/2005 | Dnyaneshwar |
| 2005/0086164 A1 | 4/2005 | Kim et al. |
| 2005/0097038 A1 | 5/2005 | Yu et al. |
| 2005/0109835 A1 | 5/2005 | Jacoby et al. |
| 2005/0125315 A1 | 6/2005 | Munoz et al. |
| 2005/0125343 A1 | 6/2005 | Mendelovich |
| 2005/0125348 A1 | 6/2005 | Fulton et al. |
| 2005/0127158 A1 | 6/2005 | Figueras et al. |
| 2005/0137948 A1 | 6/2005 | Kissner et al. |
| 2005/0137978 A1 | 6/2005 | Ganesan |
| 2005/0174975 A1 | 8/2005 | Mgrdechian et al. |
| 2005/0177437 A1 | 8/2005 | Ferrier |
| 2005/0182714 A1 | 8/2005 | Nel |
| 2005/0184145 A1 | 8/2005 | Law et al. |
| 2005/0187873 A1* | 8/2005 | Labrou .................. G06Q 20/02 705/40 |
| 2005/0203844 A1 | 9/2005 | Ferguson et al. |
| 2005/0209965 A1 | 9/2005 | Ganesan |
| 2005/0218211 A1 | 10/2005 | Saso et al. |
| 2005/0222925 A1 | 10/2005 | Jamieson |
| 2005/0222961 A1 | 10/2005 | Staib et al. |
| 2005/0246253 A1 | 11/2005 | Barthelemy |
| 2005/0247777 A1 | 11/2005 | Pitroda |
| 2005/0262017 A1 | 11/2005 | Kawase et al. |
| 2006/0000900 A1 | 1/2006 | Fernandes et al. |
| 2006/0004556 A1 | 1/2006 | Nelson et al. |
| 2006/0004656 A1 | 1/2006 | Lee |
| 2006/0006226 A1 | 1/2006 | Fitzgerald et al. |
| 2006/0026070 A1 | 2/2006 | Sun |
| 2006/0080232 A1* | 4/2006 | Epps ........................... 705/39 |
| 2006/0080249 A1 | 4/2006 | Keohane et al. |
| 2006/0085310 A1 | 4/2006 | Mylet et al. |
| 2006/0089893 A1 | 4/2006 | Joseph et al. |
| 2006/0100933 A1 | 5/2006 | Fujita et al. |
| 2006/0116892 A1 | 6/2006 | Grimes et al. |
| 2006/0122932 A1 | 6/2006 | Birtwell et al. |
| 2006/0136334 A1 | 6/2006 | Atkinson et al. |
| 2006/0136901 A1 | 6/2006 | Nichols |
| 2006/0141984 A1 | 6/2006 | Taglienti et al. |
| 2006/0190351 A1 | 8/2006 | Dennis |
| 2006/0253335 A1 | 11/2006 | Keena et al. |
| 2007/0053518 A1 | 3/2007 | Tompkins et al. |
| 2007/0100749 A1 | 5/2007 | Bachu et al. |
| 2007/0125838 A1 | 6/2007 | Law et al. |
| 2007/0130063 A1 | 6/2007 | Jindia et al. |
| 2007/0194113 A1 | 8/2007 | Esplin et al. |
| 2007/0255653 A1 | 11/2007 | Tumminaro et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0126145 A1 | 5/2008 | Rackley, III et al. |
| 2008/0126465 A1 | 5/2008 | Delaney |
| 2009/0145958 A1* | 6/2009 | Stoutenburg ........... G06Q 20/04 235/376 |
| 2009/0204510 A1 | 8/2009 | Hwang |
| 2010/0185544 A1 | 7/2010 | Adiseshann |
| 2012/0265677 A1 | 10/2012 | Rackley, III et al. |
| 2013/0013501 A1 | 1/2013 | Rackley, III et al. |

FOREIGN PATENT DOCUMENTS

| | | |
|---|---|---|
| EP | 1498861 | 1/2005 |
| JP | 2002032686 A | 1/2002 |
| JP | 2002140642 A | 5/2002 |
| JP | 2002189974 A | 7/2002 |
| JP | 2003108893 A | 4/2003 |
| JP | 2003150874 A | 5/2003 |
| JP | 2004110766 A | 4/2004 |
| JP | 2004178468 | 6/2004 |
| JP | 2004259196 A | 9/2004 |
| JP | 2005267387 A | 9/2005 |
| JP | 2006004141 A | 1/2006 |
| JP | 2006018847 A | 1/2006 |
| JP | 2007507011 A | 3/2007 |
| JP | 2007527062 A | 9/2007 |
| KR | 20020007973 A | 1/2002 |
| RU | 2246757 C1 | 2/2005 |
| RU | 2263959 | 11/2005 |
| WO | WO9745814 | 12/1997 |
| WO | WO0177938 | 10/2001 |
| WO | WO0213120 | 2/2002 |

(56) References Cited

FOREIGN PATENT DOCUMENTS

| WO | WO0241271 | 5/2002 |
|---|---|---|
| WO | WO02059847 | 8/2002 |
| WO | WO2005015452 A1 | 2/2005 |
| WO | WO2005031541 | 4/2005 |
| WO | WO2005079254 | 9/2005 |
| WO | WO2005086593 A2 | 9/2005 |
| WO | WO2006023745 | 3/2006 |

OTHER PUBLICATIONS

A. Andreeff, L. Binmoeller, E. Boboch, O. Cerda, S. Chakravorti, T. Ciesielski, E. Green: "Electronic bill presentment and payment. Is it just a click away?," Economic Perspectives (4Q/2001), Federal Reserve Bank of Chicago, pp. 2-16, XP002615813, Retrieved from the Internet: URL: http://phoenixhecht.com/treasuryresources/PDF/EBPP17.pdf [retrieved on Jan. 7, 2011].

Ammenheuser, Maura "Colorado Credit Union rolls out mobile service", Bank Systems & Technology, v38n pp. 32.

Boyd John, "Here Comes the Wallet Phone. Japan's DoCoMo gets ready to put your money where your mouth is", IEEE Spectrum, Nov. 2005, pp. 12-14.

Caro, Dick: "Wireless Versus Wired Networks: A notable problem with wireless devices is that they still need a power source," InTech, Jun. 1, 2004, Retrieved online: <http://www.isa.org/InTechTemplate.cfmSection=Archives4&template=/ContentManagement/ContentDisplay.cfm&ContentID=36558>.

Davis, Charles, "Mobile banking on the move at last", Retail Banker International (London ed.). London; Mar. 2006. p. 3.

European Search Report—EP08103081. Search Authority—The Hague Patent Office, Jan. 21, 2011.

European Search Report—EP08103086 , Search Authority—The Hague Patent Office, Jan. 21, 2011.

European Search Report—EP08103090, Search Authority—Munich Patent Office, Jan. 21, 2011.

Herzberg, Amir, "Payments and Banking with Mobile Personal Devices", Communications of the ACM, May 2003/vol. 46. No. 5.

Itani, W. et al.: "J2ME End-to-End Security for M-Commerce," 2003 IEEE Wireless Communications and Networking Conference Record: Mar. 16-20, 2003, New Orleans, Louisiana, USA, vol , 3, (Mar. 16, 2003), pp. 2015-2020, XP010640078, DOI: 10.1109/WCNC. 2003.1200696, ISBN: 978-0/7803-7700-4.

Jerry Gao, Ph.D, Jackey Cai, Kiran Patel, Simon Shim, Ph.D., "A Wireless Payment System", San Jose State University, Computer Engineering, San Jose, USA,Proceedings of the Second International Conference on Embedded Software and Sysytems (ICESS'05).

Jerry Gao, Ph.D, Krishnaveni Edunuru, Jacky Cai, Simon Shim, Ph.D., "P2P-Paid: A Wireless Payment System", San Jose State University, Computer Engineering, San Jose, USA, Proceedings of the 2005 Second IEEE International Workshop on Mobile Commerce and Services (WMCS'05).

Labrou, V. et al.: "Wireless wallet," Mobile and Ubiquitous Systems: Networking and Services, 2004. Proceedings of the First Annual International Conference on Mobile and Ubiquitous Systems: Networking and services (MobiQuitos '04), Boston, MA, USA Aug. 22-26, 2004, (Aug. 22, 2004), pp. 32-41, XP010721016, DOI: 1O.1109/MOBIQ.2004.1331708, ISBN: 978-0-7695-2208-1.

Merell, C, "Spanish Steps [mobile payments]", Financial World, pp. 21-24, Sep. 26, 2003.

Schwiderski-Grosche, S. et al.: "Secure Mobile Commerce," Electronics and Communication Engineering Journal, Institution of Electrical Engineers, London, GB, vol. 14, No. 5, Oct. 1, 2002, pp. 228-238, XP001164854, ISSN: 0954-0695, DOI:10.1049/ECEJ:20020506.

Tanna, G.B. et al.: "Information assurance metric development framework for electronic bill presentment and payment systems using transaction and workflow analysis," Decision Support Systems, Elsevier Science Publishers, Amsterdam, NL, vol, 41, No. 1, Nov. 1, 2005, pp. 242-261, XP005096774, ISSN: 01 67-9236, DOI:10.1016/J.DSS.2004.06.013.

* cited by examiner

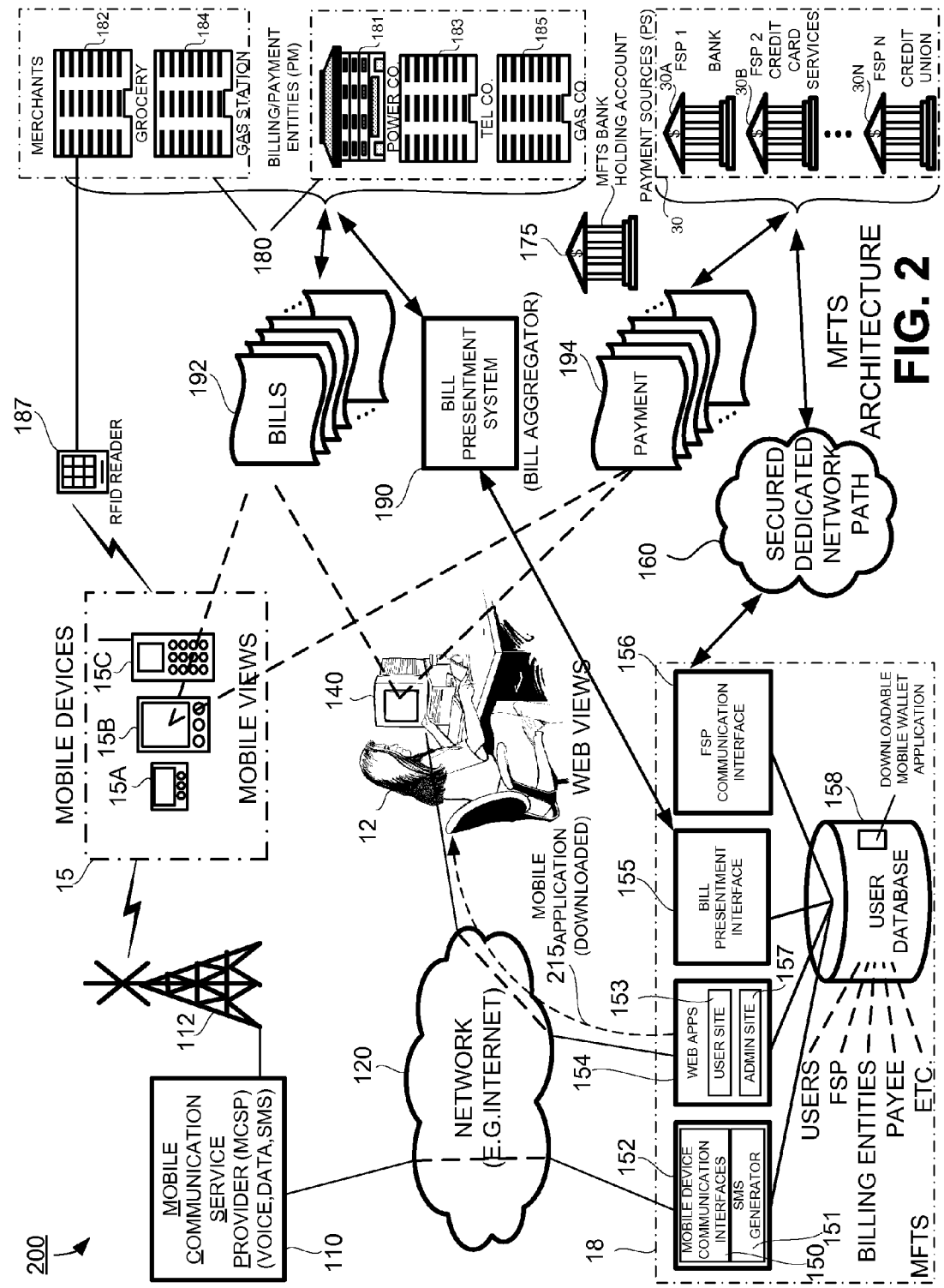

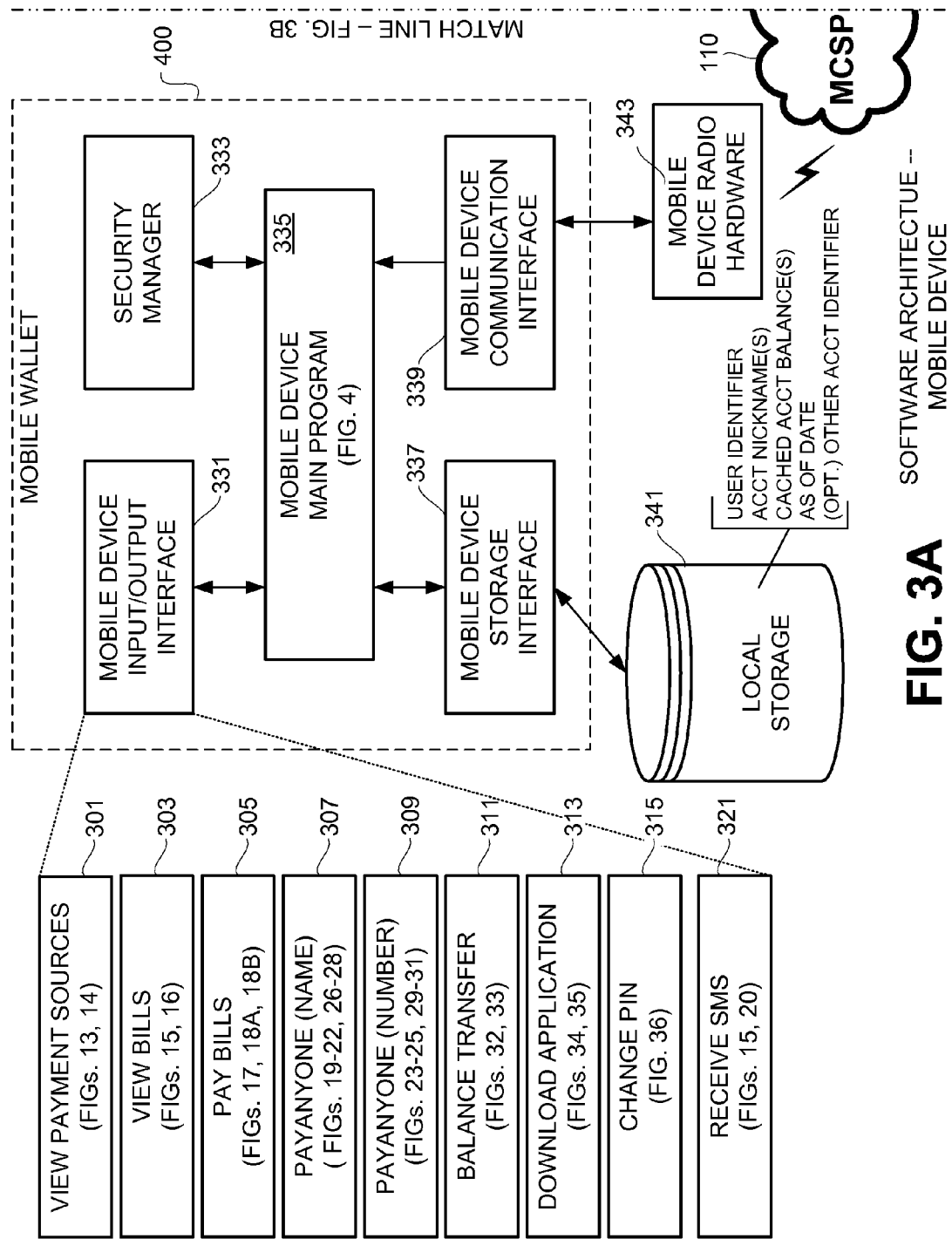

MFTS MAIN PROGRAM

FIG. 6 USER DATABASE SCHEMA

FIG. 7 TRANSACTION TABLE AND TRANSACTION DATABASE

MOBILE DEVICE COMMUNICATION INTERFACE (MFTS)

FINANCIAL SERVICE PROVIDER (FSP)
COMMUNICATION INTERFACE
(MFTS)

WEB APPLICATION INTERFACE  FIG. 10

WEB APPLICATION FOR NEW USER ENROLLMENT
(MFTS)

VIEW PAYMENT SOURCES & ACCOUNT BALANCE

SEQUENCE DIAGRAM FOR VIEWING PAYMENT SOURCES AND ACCOUNT BALANCES

SEQUENCE DIAGRAM FOR VIEWING BILLS

PAY BILLS

SEQUENCE DIAGRAM FOR PAYING A BILL
(PREFERRED EMBODIMENT)

SEQUENCE DIAGRAM FOR PAYING A BILL
(ALTERNATIVE EMBODIMENT)

PAYANYONE BY NAME (RECIPIENT DEFINED, PAYER'S VIEW)

PAYANYONE BY NAME
(RECIPIENT DEFINED, PAYEE'S VIEW)

SEQUENCE DIAGRAM FOR PAYANYONE

SEQUENCE DIAGRAM FOR PAYANYONE
RECIPIENT DEFINED PAYMENT METHOD

PAYANYONE BY PHONE NUMBER (ACH, PAYER'S VIEW)

PAYANYONE BY PHONE NUMBER (ACH, PAYEE'S VIEW)

SEQUENCE DIAGRAM FOR PAYANYONE WITH ACH  FIG. 25

PAYANYONE BY NAME (PAPER CHECK, PAYER'S VIEW)

PAYANYONE BY NAME (PAPER CHECK, PAYEE'S VIEW)

SEQUENCE DIAGRAM FOR PAYANYONE WITH PAPER CHECK

PAYANYONE BY PHONE NUMBER (STORED VALUE CARD, PAYER'S VIEW)

PAYANYONE BY PHONE NUMBER (STORED VALUE CARD, PAYEE'S VIEW)

SEQUENCE DIAGRAM FOR PAYANYONE WITH STORED VALUE CARD

BALANCE TRANSFER

SEQUENCE DIAGRAM FOR BALANCE TRANSFER

MOBILE WALLET INSTALLATION BY PAYEE

CHANGE PIN

| ACCOUNT SUMMARY | BILLING ENTITIES | PAYMENT SOURCES |
|---|---|---|

4005 / 4010 / 4015

ACCOUNT NO: 011-009-876  MOBILE NUMBER: 678-555-1000
NAME: John DOE  JOINT OWNER NAME: Mary DOE
LOGIN ID: JDOE  PASSWORD: xxxxxx

EDIT (4020)   NEW (4025)

Entity Attributes — 4035

ADDRESS-1: 123 MAIN STREET
ADDRESS-2:
CITY: ALPHARETTA
STATE: GA
ZIP CODE: 34567
HOME PHONE: 678-555-1001
REGISTRATION DATE: 05/05/2005
NUMBER OF BILLING ENTITIES: 3
NUMBER OF PAYMENT SOURCES: 3

4030

4001

WEB APPLICATION: ACCOUNT SUMMARY

FIG. 40

WEB APPLICATION: BILLING ENTITY DETAIL

FIG. 42

WEB APPLICATION: PAYMENT SOURCE DETAIL

| ACCOUNT SUMMARY | BILLING ENTITIES | PAYMENT SOURCES | | |
|---|---|---|---|---|
| ACCOUNT NO: | 011-009-876 | MOBILE NUMBER: | 678-555-1000 | |
| NAME: | John DOE | JOINT OWNER NAME: | Mary DOE | |
| LOGIN ID: | JDOE | PASSWORD: | xxxxxxxxxx | |

BANK 1 | BANK 2 | BANK 3

NAME OF THE PAYMENT SOURCE: GEORGIA BEST BANK
ACCOUNT NUMBER: GBB-0123-9876
ACCOUNT TYPE: CHECKING
ADDRESS-1: 564 SW 43RD STREET
ADDRESS-2:
CITY: NORCROSS
STATE: GA
ZIP CODE: 34568
USER SERVICE PHONE: 1-800-GA-B-BANK
SERVICE ESTABLISHED DATE: 01/01/2001

EDIT   NEW

CURRENT BALANCE:
$ 20,789.01

METHODS AND SYSTEMS FOR MAKING A PAYMENT VIA A STORED VALUE CARD IN A MOBILE ENVIRONMENT

CROSS-REFERENCE TO RELATED APPLICATIONS

This application is related to and incorporates by reference herein the following U.S. patent applications:

application Ser. No. 11/428,857, entitled "Methods and Systems for Payment Transactions in a Mobile Environment," filed on Jul. 6, 2006, application Ser. No. 11/428,859, entitled "Methods and Systems for Making a Payment via a Paper Check in a Mobile Environment," filed on Jul. 6, 2006;

application Ser. No. 11/428,861, entitled "Methods and Systems for Viewing Aggregated Payment Obligations in a Mobile Environment," filed on Jul. 6, 2006, application Ser. No. 11/428,864, entitled "Methods and Systems for Providing a Payment in a Mobile Environment," filed on Jul. 6, 2006, application Ser. No. 11/428,866, entitled "Methods and Systems for Managing Payment Sources in a Mobile Environment," filed on Jul. 6, 2006, application Ser. No. 11/428,870, entitled "Methods and Systems for Real Time Account Balances in a Mobile Environment," filed on Jul. 6, 2006, application Ser. No. 11/428,874, entitled "Methods and Systems for Distribution of a Mobile Wallet for a Mobile Device," filed on Jul. 6, 2006, application Ser. No. 11/428,876, entitled "Methods and Systems for Indicating a Payment in a Mobile Environment," filed on Jul. 6, 2006, application Ser. No. 111428,879, entitled "Methods and Systems for Payment Method Selection by a Payee in a Mobile Environment," filed on Jul. 6, 2006, and International (PCT) application no. PCT/US06/026,399, entitled "Methods and Systems for Financial Transactions in a Mobile Environment," filed on Jul. 6, 2006, the disclosures of which applications are incorporated by reference as if the same were fully set forth herein.

FIELD OF THE INVENTION

The present invention relates generally to financial transactions, and more particularly relates to methods and systems for conducting financial transactions in a mobile environment using a mobile device such as a mobile telephone (cellphone) or wireless connected personal digital assistant (PDA).

BACKGROUND OF THE INVENTION

Busy consumers in mobile societies seek to maximize the use of their time. Electronic devices such as personal digital assistants ("PDA's") and mobile telephones ("cell phones") provide the promise of more efficient use of time, by allowing communication with other people and institutions wherever a user may go. One particular demand of mobile consumers is better capability to securely manage one's financial situation, such as balances in bank accounts, credit cards, other sources of funds, etc., and quickly but efficiently fulfill financial obligations such as paying bills, transferring funds to third parties and family members, etc. Several useful web- and personal computer (PC)-based financial services programs are available for consumers and businesses. These include the popular QUICKEN™ product from Intuit Inc., MICROSOFT MONEY by Microsoft Corp. and others.

However, these web- and PC-based solutions to financial payments and money management require that a user have access to a network-connected PC. A PC may not always be readily available to a mobile consumer when he or she needs to pay a bill. But a mobile device such as a cellphone or PDA is more likely to be available. (So ubiquitous are modern mobile communication devices that an average consumer knows within about 6 minutes whether they have lost their cellphone, but about 18 minutes before they realize they have lost their traditional wallet.)

Consumers in mobile societies tend to carry a variety of personal possessions, such as keys, wallets, cards, and electronic devices. Currently popular electronic devices include mobile phones, PDAs, MP3 players or other types of music players (e.g. APPLE iPOD™), and personal video players (also APPLE iPOD™). Such electronic devices are converging as to functionality, but the average mobile society consumer still tends to carry too many other personal possessions, such as a wallet, checkbook, multiple credit cards, debit cards, membership cards, loyalty (points) cards, keys, etc. Further consolidation and convergence of electronic and mobile communication devices is expected in the future to alleviate some of the personal possession clutter, but the present-day communication and financial services infrastructure is still lacking in the need for effective conduct of mobile financial transactions and reduction of personal possession clutter.

Unfortunately, current mobile device technology and the financial services infrastructure do not provide convenient, secure, and rapid attention to a person's financial needs in the mobile environment. To enable a mobile device such as cellular phone or PDA to be used successfully for mobile financial transactions, certain functionality relating to transactions is important. A person's financial payment obligations arise from many sources—paying bills and mortgages, sending money, checking out purchases at a retail establishment point of sale (POS), etc. Such obligations can involve dozens (or more) of different entities. Different entities may require different payment forms. A mobile financial transaction system that is attractive to mobile consumers would provide for aggregation and consolidation of payment obligations, and allow a choice of payment vehicles such as checks, direct funds transfer, use of a credit card account, etc. Stored value (SV) cards are an increasingly popular payment option in some communities, especially the so-called "unbanked" (i.e. people who may not have an established bank account and tend to conduct business in cash).

Similarly, a person may have multiple sources of payments and funds—credit cards, bank accounts with savings and checking features, debit cards, etc. People often have preferences as to which source of funds should be used to pay certain payment obligations. A bank account may be desired for some payments, while a credit card may be desired for other transactions, for many reasons such as participation in loyalty programs such as "frequent user" programs. Before using a particular source of funds for a payment, a consumer often needs or wants to have information about available funds balance or credit balance. Some form of account balance inquiry, or perhaps real time balance information updating, from a mobile device is desirable. In addition to balance information, the ability to invoke other financial institution operations while mobile is desirable. Such other operations include funds transfer between accounts, selection of different payment sources or accounts from a particular financial institution, remittance and payment, inquiry and payment of loans, and the like, at any time and anywhere, without requiring an appearance at a banking facility in person or at a PC terminal with internet connectivity.

Some online financial service providers, e.g. CheckFree Corporation, offer a service known as "bill aggregation" or "bill presentment," whereby multiple payment obligations are collected into a centralized computer facility and provided to the consumer as a list. For example, U.S. Pat. No. 6,289,322 to Kitchen et al. describes a method of electronically presenting billing information, which can be used in connection with "online bill payment." This method includes receiving billing information associated with a plurality of different billers, different portions of which represent bills for different people (as payers). Billing information is consolidated for each registered user or payer. Individual customers can go to an Internet web site to register an account, add information about billers, add information about financial institutions, and pay bills online. However, the system described in U.S. Pat. No. 6,289,322 patent is intended for users with a PC and Internet access and has several shortcomings for use in a mobile environment. One particular shortcoming is that a web-based user interface actually provides too much information about the user's accounts and bill detail, and is difficult to view and navigate on a small mobile device. Another shortcoming is the lack of integration of online bill payment with the use of multiple and conveniently selectable different payment sources.

U.S. Published Pat. App. No. 20050086164 to Kim et al. describes a method for utilizing a mobile phone to pay a charge of goods or services rendered through approval of a mobile phone network. First, a buyer uses his or her mobile phone to connect to a payment transaction server. A buyer and "merchant store" identification code (for each) and a bill for the goods or services is transmitted to the payment transaction server. The payment transaction server examines the data received from the mobile phone and determines the approval of the transaction based on a balance corresponding to the buyer identification code. When approved, an approval notification is sent to a terminal at the merchant store. After the confirmation from the approval notification at the merchant store, the buyer receives the goods or services.

A system as described in the Kim et al. publication depends on having a pre-established balance in a prepaid account established by the buyer with the mobile phone networks. Furthermore, the method involves delivering voice prompts to the user via the mobile phone and receiving the user's selection of options by activation of keys on the mobile phone keypad. While such a device and system is certainly one way that financial transactions can be conducted using a mobile phone, the well-known method of voice prompts for keypad data entry is slow and awkward, and is a known source of consumer frustration. Furthermore, modem mobile devices are more than just a telephone—many such devices now include displays, controls, and keypads, and provide more ways for wireless interaction than voice messages and prompts.

Mobile communication devices and systems have now progressed beyond the limitations of voice prompts and telephone keypad data entry and option selection. The first generation (1G) of mobile telephone systems was limited to analog radio voice transmission, and has been surpassed by second generation (2G) systems that provide digital signal transmission features and enable greater functionality. Present mobile device communication systems (beyond 2G) are now all digital and utilize data communication channels for carrying voice signals as well as other data signals. Features enabled by the digital data communications include Short Message System (SMS) message for text messaging, ringtone downloads, and other features. Consumer-oriented mobile communication systems are now progressing beyond advanced second generation (2.5G) technologies into third generation (3G) technologies that provide high speed broadband data connectivity for mobile devices. New 3G systems and devices permit capabilities such as full Internet usage on mobile devices, SMS messaging capability, person-to-person direct calling, direct download of content such as ringtones, music, and videos, and many other features.

Significantly, modern mobile devices now involve highly converged PDA and telephone capabilities. New mobile devices possess color displays, touch screens, full telephone capability as well as music playback, streamed videos, memory for data storage (e.g. memory cards), wireless headsets, infrared data connections, and many other features. A system that facilitates convenient, secure, and rapid mobile financial transactions will invariably take advantage of available communication bandwidth and device features in the modern 2.5G and 3G networks and their devices. However, prior to the present invention there has been no effective attempt to identify the usage methodologies and features that consumers want—those that allow convenient, secure, and rapid mobile financial transactions, in a way that is consumer-friendly and allows reduction of personal possession clutter.

In particular, consumers require strong security in using their devices. They require speedy, convenient checkout if used at retail point of sale (POS). They must be able to "PayAnyone", at any time, in any of a number of different ways. They must be provided with the information they need to conduct a transaction—and only such information as is necessary—and this information must be current. Similarly, financial institutions require strong security, which includes authentication, for transactions initiated in a mobile environment. There must be an opportunity for revenue opportunities as well as user retention. There must be opportunity to lower the expense of customer service by use of automation. For retailers and entities that send bills, there must be rapid payment. Any POS transactions must clear quickly. Charges based on credit cards and debit cards must be authenticated and clear quickly—fraud prevention and reduction is paramount both for financial institutions as well as billing entities and other payees. Facilitation of, or at least compatibility with, customer loyalty programs is highly desirable.

All of these requirements—some of which are merely desirable but some are absolutely essential—present a challenge to the present day mobile communication and financial services infrastructure. Prior to the present invention, no system has been made that addresses all of these features, goals, and desires of a mobile communication based financial transaction system in a satisfactory manner.

Therefore, there is a need for a comprehensive solution that allows consumers using mobile devices to consolidate their bills and other payment obligations, pay such bills and other obligations at anytime and anywhere, using any selectable available funds, to merchants for goods or services, or to anyone or any other designated entity, with knowledge of the amounts to be paid and the funds available balances. And of course, all of this must be convenient, secure, and rapid.

As will be described and explained in detail below, the present inventors have constructed various systems and methods for completing financial transactions in a mobile environment that meet these and other requirements for an efficient, effective, robust, secure and convenient solution.

SUMMARY OF THE INVENTION

Briefly described, the present invention relates to methods and systems for making a payment by way of a stored value (SV) card in a mobile environment utilizing a mobile device such as a mobile telephone or wireless connected personal digital assistant (PDA) that communicates with a mobile financial transaction system that stores user information and transaction information.

Aspects of the invention are embodied in mobile devices, in software for mobile devices (e.g. in the form of computer-implemented methods), in a mobile financial transaction system (MFTS), in software for mobile financial transaction systems (e.g. in the form of computer-implemented methods), in systems that combine aspects of mobile devices and mobile financial transaction systems, and in software for such systems (e.g. in the form of software for mobile devices and related systems that effect computer-implemented methods).

In one aspect, the present invention relates to systems and methods for making a financial payment to a payee via a stored value (SV) card utilizing a mobile device connected for communications via a wireless network. From the mobile device perspective, such aspects of the invention involve: (i) receiving user input at the mobile device of information identifying a payee for a payment to be made by a stored value (SV) card payment method, (ii) at the user mobile device in response to the user input, generating a mobile payment instruction comprising information corresponding to the identified payee, and (iii) wirelessly communicating the mobile payment instruction from the user mobile device to a mobile financial transaction system (MFTS). From the MFTS perspective, such aspects further involve: (iv) at the MFTS and in response to receipt of the mobile payment instruction, determining information corresponding to an identified payee for receiving the payment and information indicating payment by a SV card method, (v) generating an MFTS payment instruction to a payment instruction recipient that maintains a relationship with a SV card issuing entity, and (vi) communicating the MFTS payment instruction from the MFTS to the payment instruction recipient. Further aspects involve, at the payment instruction recipient, in response to receipt of the MFTS payment instruction, arranging for payment to the identified payee by issuing a new stored value card to a payee or "reloading" a pre-existing stored value card of the payee. The payment instruction recipient can be one of a financial service provider, a billing aggregator, a stored value card issuer, a retail establishment that handles stored value cards, or other entity that issues stored value cards.

In one embodiment, the mobile financial transaction system (MFTS) includes a mobile financial transaction system (MFTS) database for storing user information and payment source information associated with at least one account associated with at least one financial service provider. The MFTS database further stores transaction information corresponding to a user's financial transactions, the transaction information including payment to make information in addition to other information utilized to track status of the payment to make. The transaction information includes one or more of the following items of information: a user ID number, a transaction identifier, an amount, a financial service provider identifier, an account identifier, a payee identifier, a pending/complete flag, and other data items.

Other aspects of the invention involve identifying a payee by selection of one of a plurality of prestored names on the mobile device. In one aspect, a payee is identified by user entry of a mobile number of a payee. In another aspect, at least some payee information is input by the user via an Internet-accessible web site accessible by the user for input of payee information and is thereafter wirelessly communicated to the mobile device for display to the user.

Other aspects of the invention involve displaying information at the user mobile device corresponding to selection by the user/payer of a SV card payment method for effecting a payment to a payee from among a plurality of different payment methods. The selectable payment methods include: a recipient-defined method, an ACH funds transfer, a paper check, and a stored value (SV) card.

Another aspect of the invention involves displaying information corresponding to at least one selectable payment source for the payment at the user mobile device, receiving user input corresponding selection of a payment source for making a payment, and including information indicating the selected payment source in the mobile payment instruction, at the user mobile device. A related aspect involves determining information corresponding to a selected account at a selected financial service provider for making the payment by retrieving such information from information prestored in the MFTS database.

Other aspects of the invention involve the real time updating of account balances on the user's mobile device. Such aspects involve storing a cached account balance in the mobile device representative of the balance in the at least one account as of a particular date, receiving updated account balance information for the account, and displaying updated account balance information corresponding to the account to the user via the mobile device.

Another aspect of the invention involves receiving user selection of at least one selectable payment source for the payment at the user mobile device. The selection of a payment source for making a payment includes selection of a financial service provider and selection of a particular account associated with the selected financial service provider for making the payment. In a preferred embodiment, selection of a payment source causes the MFTS to retrieve current account information from one or more financial service providers and wirelessly communicate the current account information to the mobile device upon receipt of such information from the one or more financial service providers.

Another aspect of the invention involves providing a Mobile Wallet application on the user mobile device. A Mobile Wallet application is a mobile device application that provides functionality for viewing and selecting bills to be paid or other payments to make, viewing and selecting payment sources for making such payments, viewing balances, etc. In one aspect, the Mobile Wallet application provides a display on the mobile device of selectable commands including a Pay Anyone command, a Payment Source selection command, and a Payment Method selection command. User activation of the Payment Source selection command causes the MFTS to retrieve current account information from a selected financial service provider and communicate current account information to the mobile device upon receipt of such information from the selected financial service provider.

Another aspect of the invention involves receiving user input corresponding to selection of a payment source for making a payment in response to display of a Payment Source selection command. Yet another aspect involves receiving user input of a payment source for making the payment comprising selection of a financial service provider and selection of a particular account associated with the selected financial service provider for making the payment.

According to another aspect of the invention, the identified payee corresponds to a billing entity that communicated bill information to the MFTS. According to yet another aspect, a payment confirmation message is communicated from the selected financial service provider to the MFTS in response to completion of a predetermined stage in making the payment. According to another aspect, a payment confirmation message is communicated by the MFTS to the mobile device in response to receipt of the payment confirmation message from the selected financial service provider.

In a preferred embodiment, the MFTS is coupled for electronic communications with a user's computer via a data communications network such as the Internet. Another related aspect of the invention involves: (i) providing a web application in association with the MFTS, (ii) receiving user information via the web application corresponding to financial service providers, accounts at financial service providers, and payees, and (iii) storing the user information input via the web application in an MFTS database for use in connection with payments initiated via the user mobile device. A related aspect of the invention involves retrieving and displaying transaction information corresponding to transactions conducted via the user mobile device, via the web application, to a user on the user's computer.

In one embodiment, a payee's pre-existing SV card account number is displayed to the user for confirmation that the payment is to be made by crediting a payee's pre-existing SV card. The information corresponding to the payee's pre-existing SV card is stored in an MFTS database and wirelessly communicated to the user mobile device for display to the user and confirmation by user command.

Another aspect of the invention relates to communications with a payee's mobile device in connection with the payment by the SV card method. Such aspects involve: (i) wirelessly communicating a message to a payee's mobile device advising the payee that a payment has been sent by a user/payer via SV card, and (ii) receiving input from the payee at the payee's mobile device indicating a selected manner in which the payee wishes to receive the payment via SV card. This aspect further involves providing a data entry screen on the payer/user's mobile device for entry of a payee's pre-existing SV card account number for purposes of crediting a payee's pre-existing SV card. In one embodiment, the message to the payee's mobile device is a text message (SMS). In another embodiment the message is provided via a Mobile Wallet application installed on the payee's mobile device. The selected manner in which the payee can receive payment via SV card includes crediting the payment to a payee's pre-existing SV card and issue of a new SV card.

Another aspect of the invention related to a response to an indication by a payee of receipt of payment via a new SV card. Such aspect involves: (i) displaying a data entry screen on the payee's mobile device for receiving entry of information to identify a location for receipt of a new SV card, such as a zip code, (ii) receiving payee input of information for identifying a location for receipt of the new SV card, and (iii) wirelessly communicating the location information to the MFTS. Such aspect further involves wirelessly communicating information back to the payee identifying a specific retail location at which the new SV card may be obtained.

Yet other aspects of the invention involve communicating card pickup information to the SV card issuer that enables the SV card issuer to issue a card to the payee and further enables a retail location that issues SV cards to verify the identity of the payee for SV card pickup. Another aspect involves wirelessly communicating the card pickup information to a payee's mobile device. The card pickup information comprises a transaction number provided by the MFTS that is associated with the payment, a card number, and a mobile phone number associated with the payee.

From the foregoing, those skilled in the art will understand and appreciate that with its various aspects for a mobile device, a mobile financial transaction system, a web interface, and combinations of functionality, a system constructed in accordance with aspects of the inventions provides mobile device users with unprecedented convenience and flexibility in making payments by issue or reloading of a stored value card, using a mobile device. Furthermore, the invention facilitates the monitoring of bills to pay and other payments to make, provides information about current account balances provided in real time, and also provides other improved functionality for mobile device users that have heretofore not been possible at reasonable economic cost and convenience.

These and other aspects, features, and benefits of the present invention(s) will become apparent from the following detailed written description of the preferred embodiments taken in conjunction with the following drawings, although variations and modifications therein may be affected without departing from the spirit and scope of the novel concepts of the disclosure.

BRIEF DESCRIPTION OF THE DRAWING FIGURES

FIG. 2 is a more detailed overview of an exemplary mobile financial transaction system (MFTS) according to an exemplary aspect of the invention.

Figure 3B:
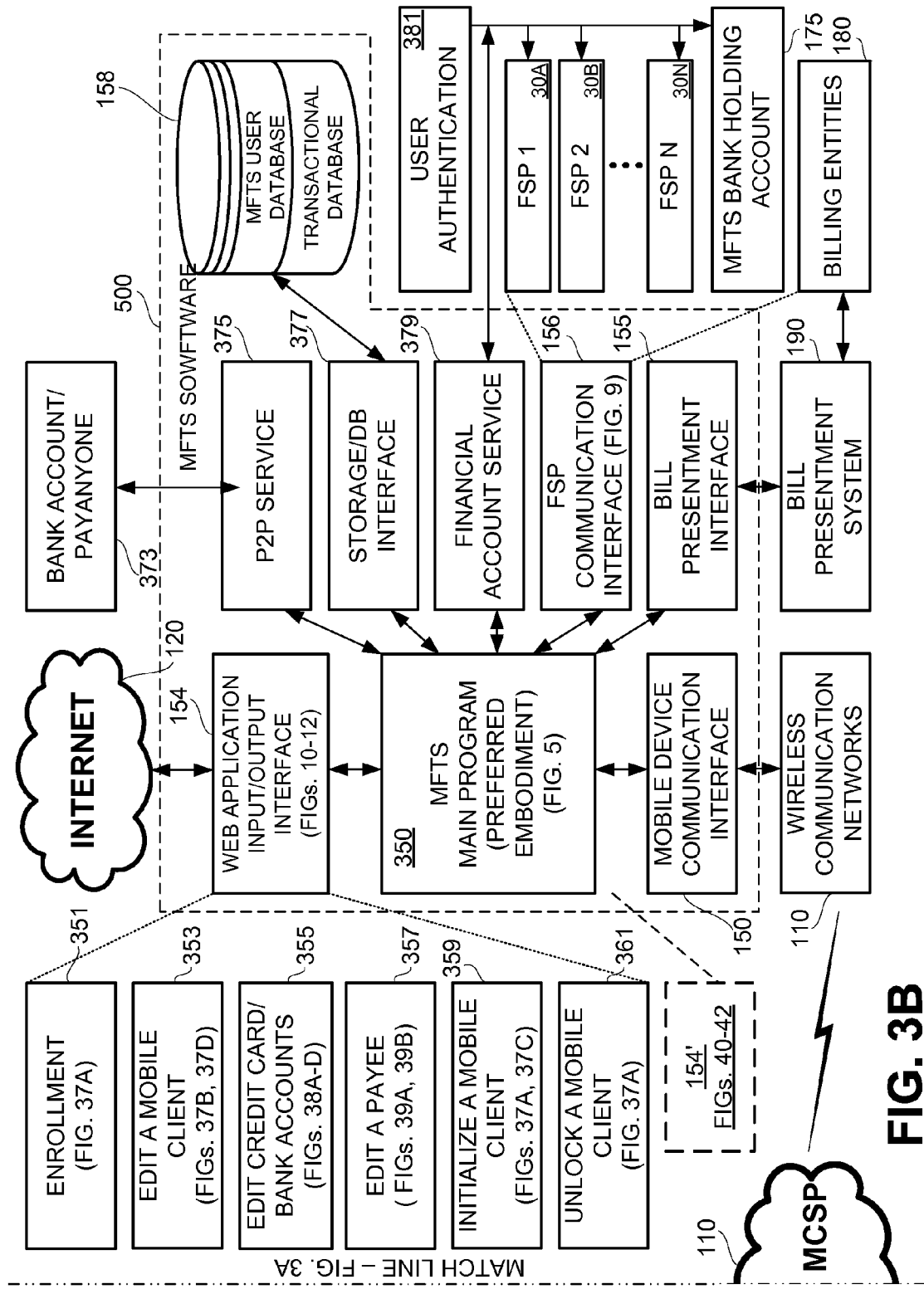

FIG. 3, consisting of FIG. 3A and FIG. 3B, is a computer software architecture diagram illustrating various computer program modules that provide computer-implemented method steps for a cellphone or mobile device application (FIG. 3A) and computer-implemented method steps for operations of the MFTS system (FIG. 3B), in accordance with exemplary aspects of the invention.

Figure 4:
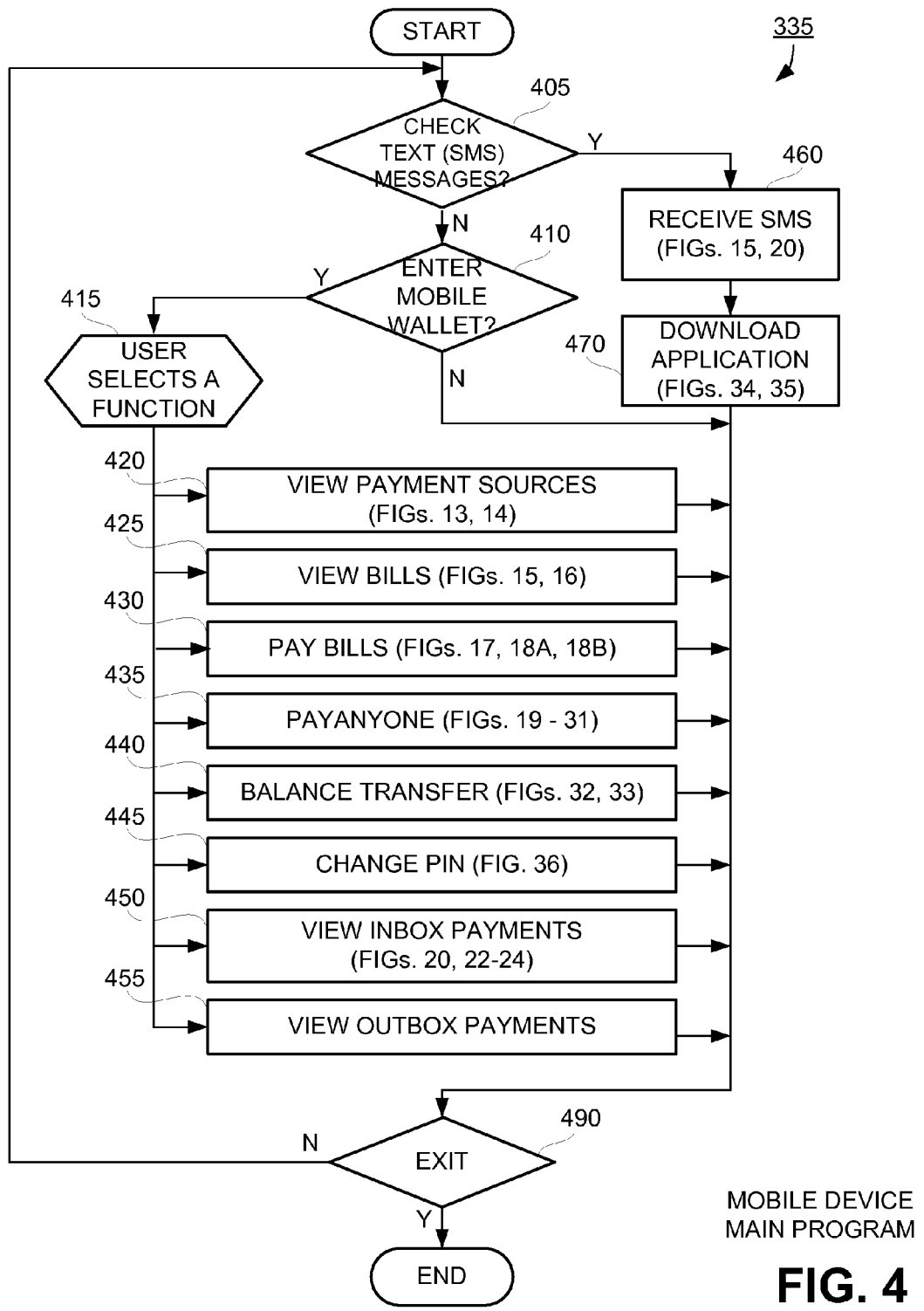

FIG. 4 is a flowchart showing the operation of the main program of a mobile financial transaction system (MFTS) constructed according to exemplary aspects of the present invention.

Figure 5:
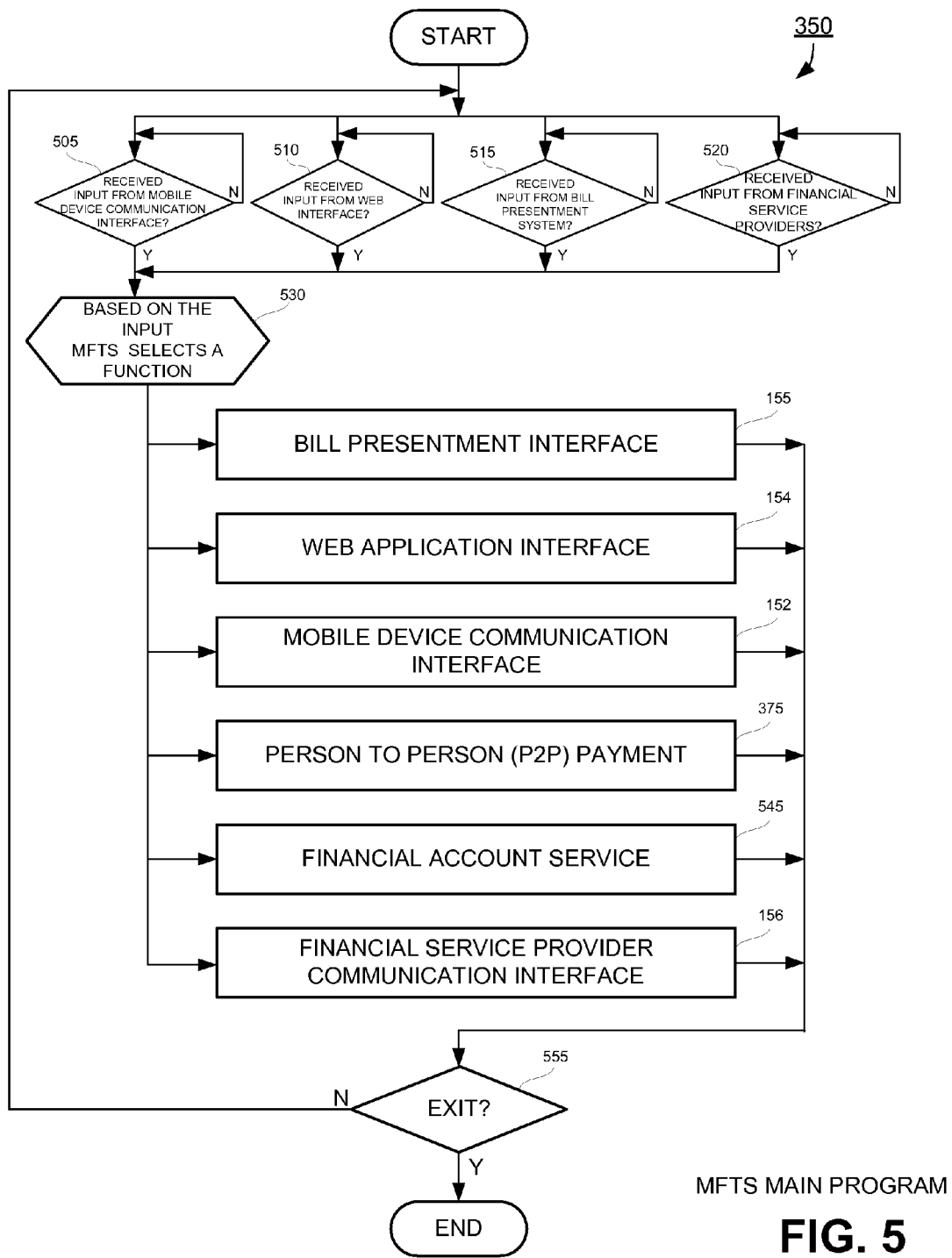

FIG. 5 is a flowchart showing the operation of the main program of a mobile financial transaction system (MFTS) constructed according to exemplary aspects of the present invention.

Figure 6:
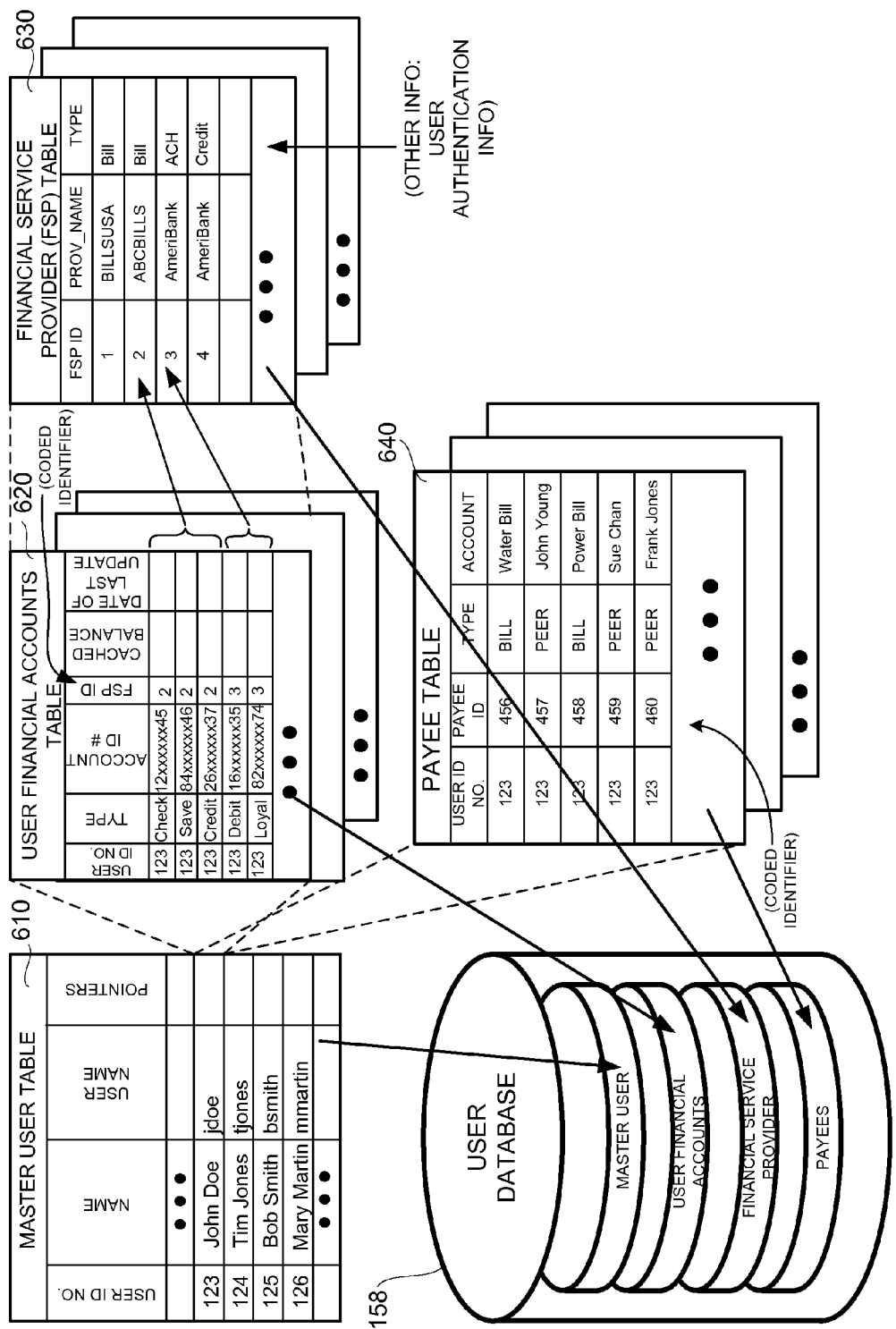

FIG. 6 illustrates exemplary database schemas (data table layouts) for a mobile financial transaction system (MFTS) user database according to an exemplary aspect of the invention.

Figure 7:
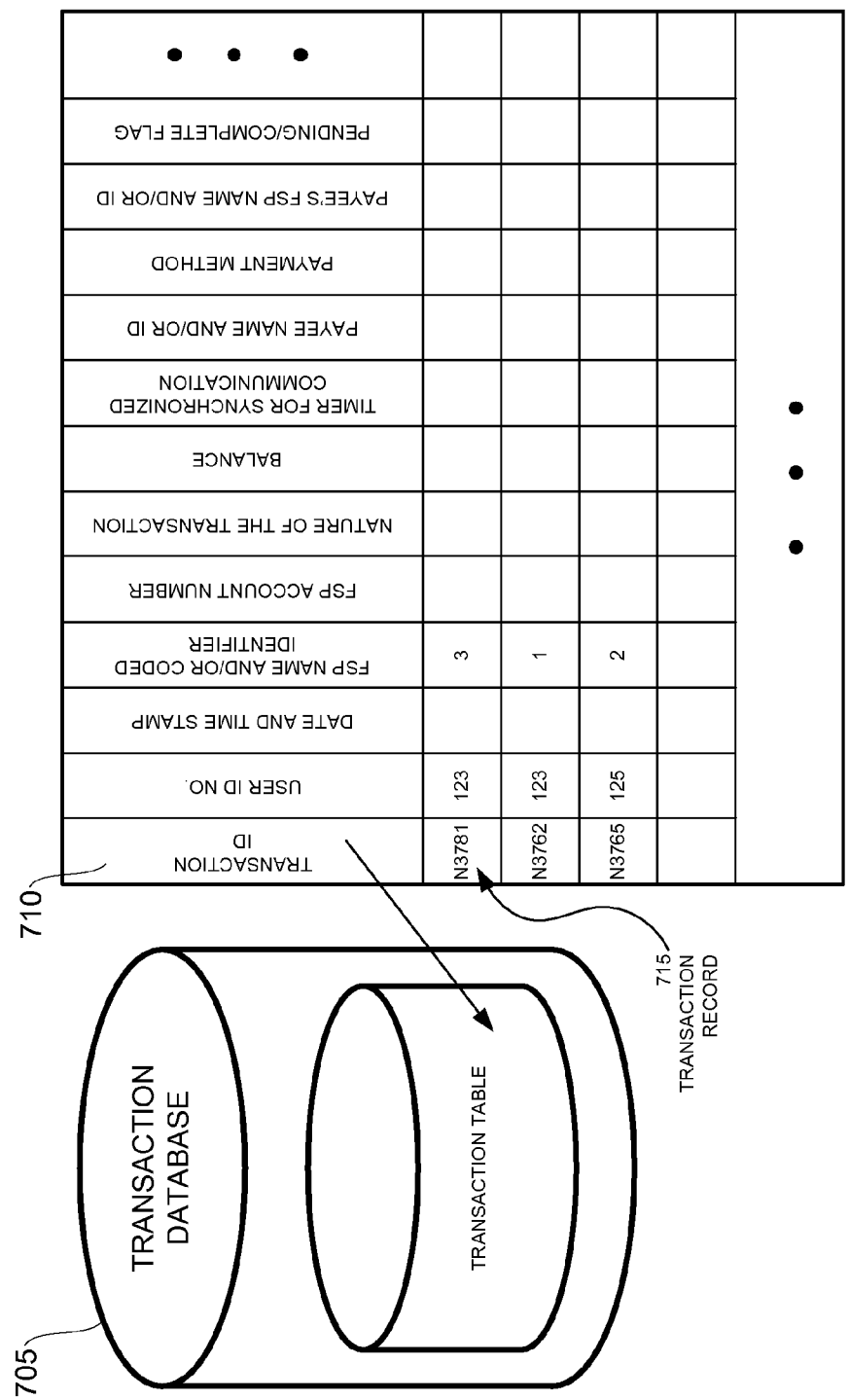

FIG. 7 illustrates an exemplary database schema (data table layout) for a mobile financial transaction system (MFTS) transaction database in accordance with exemplary aspects of the invention.

Figure 8:
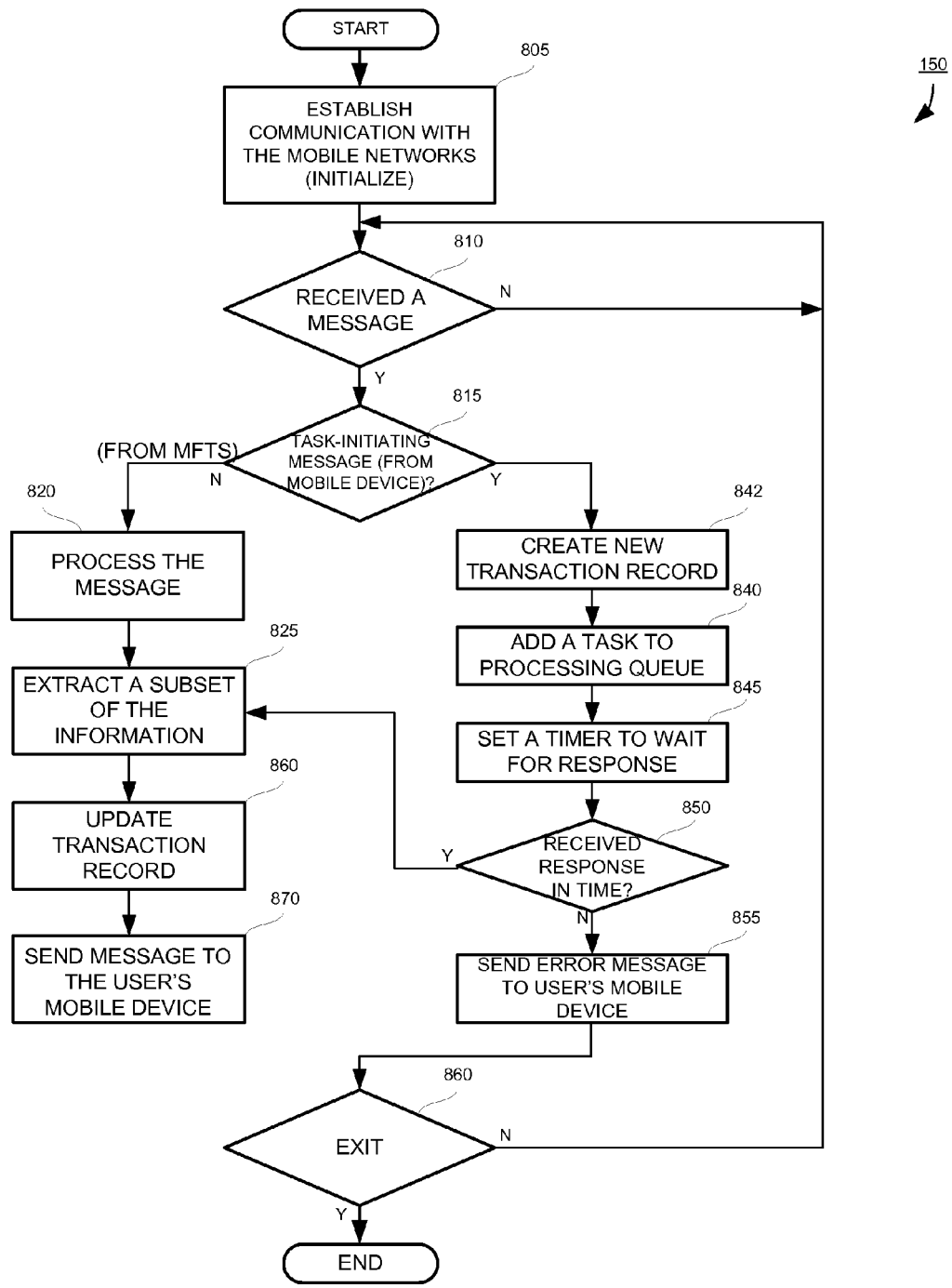

FIG. 8 is a flow chart diagram illustrating computer-implemented method steps of a computer program embodying operations of a mobile device communication interface for the MFTS in accordance with exemplary aspects of the invention.

Figure 9:
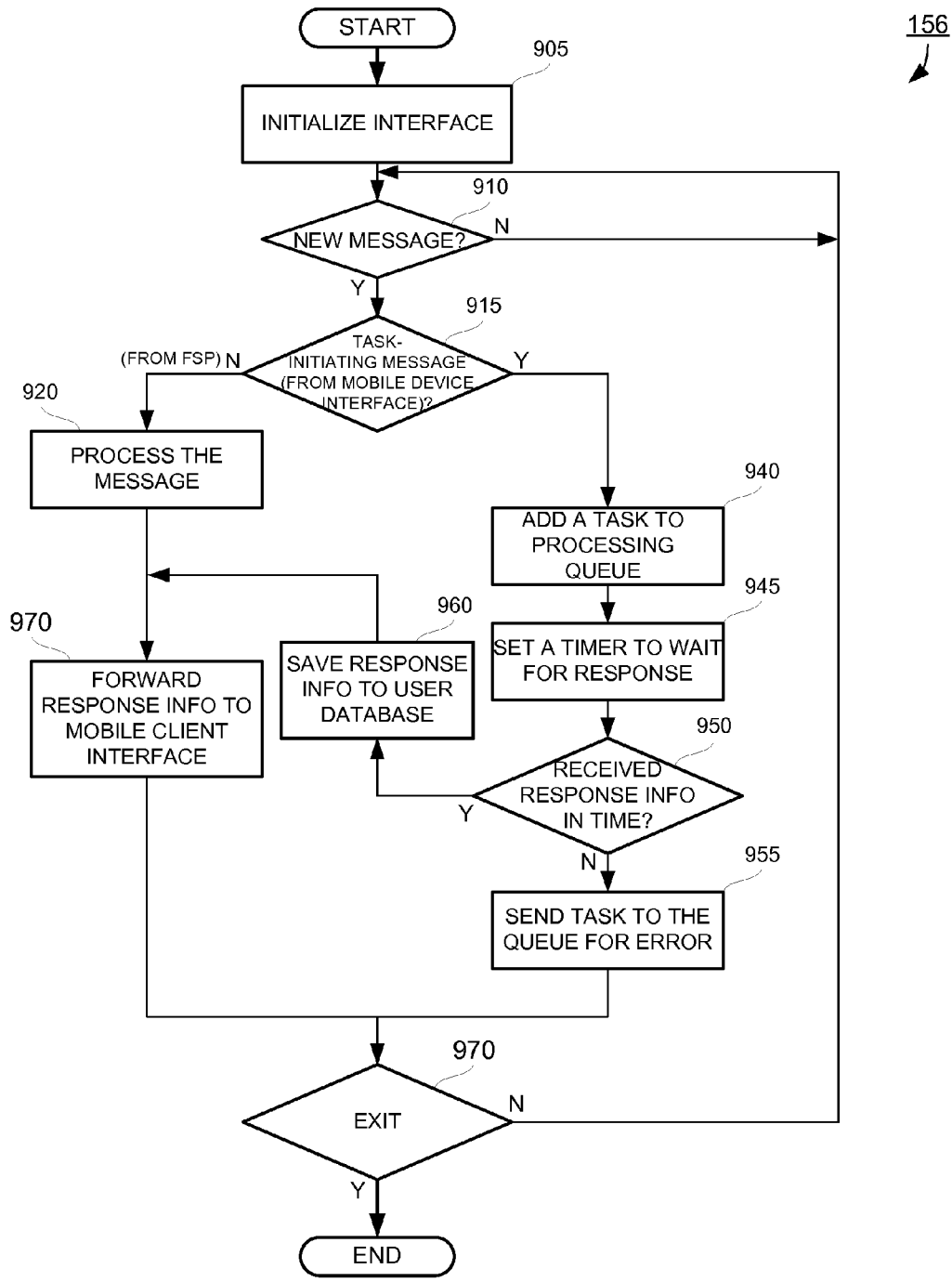

FIG. 9 is a flow chart diagram illustrating computer-implemented method steps of a computer program embodying operations of a financial service provider (FSP) communications interface for the MFTS in accordance with exemplary aspects of the invention.

Figure 10:
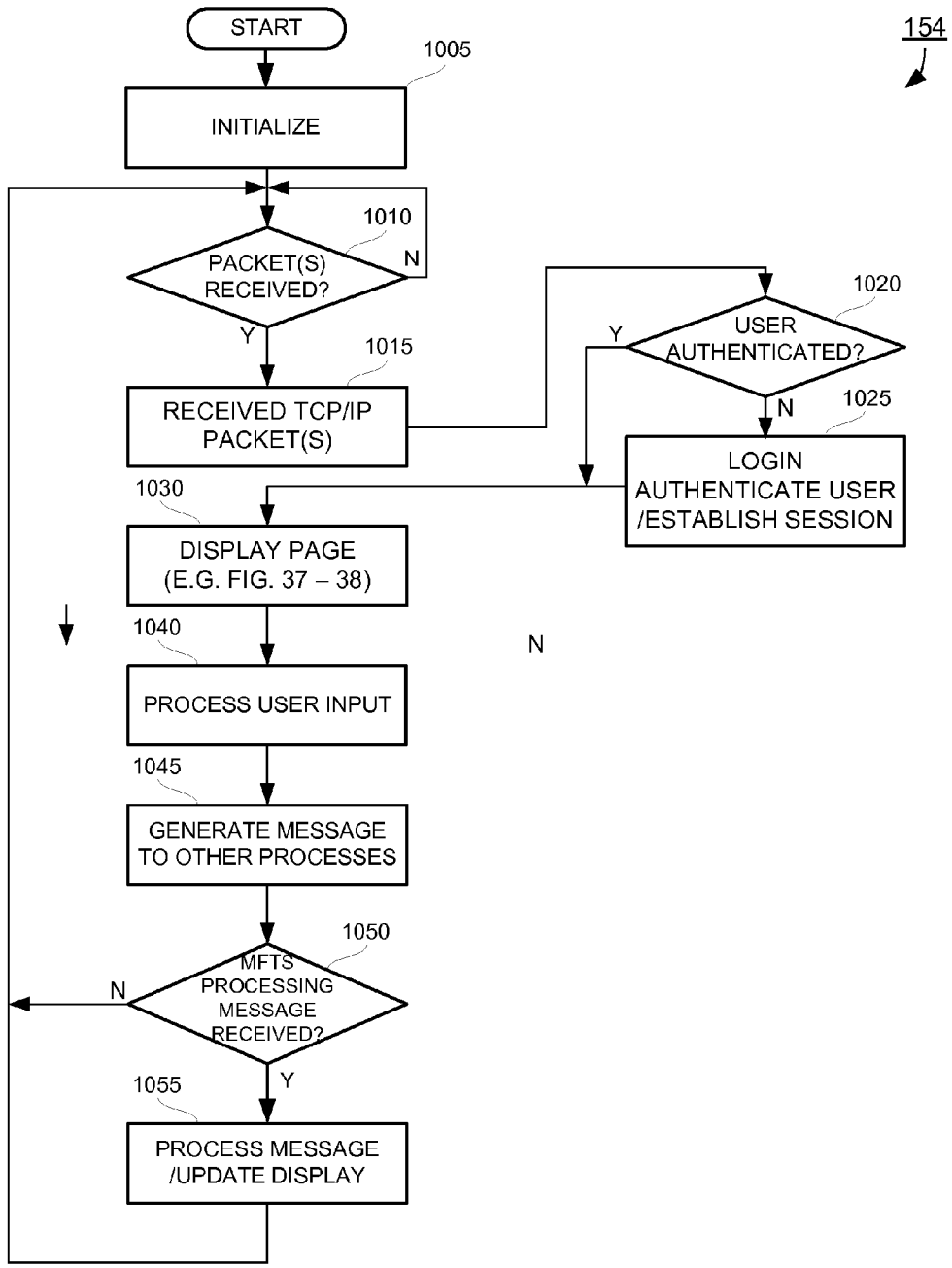

FIG. 10 is a flow chart diagram illustrating computer-implemented method steps of a computer program embodying operations of a user web application input/output (I/O) interface for the MFTS in accordance with exemplary aspects of the invention.

Figure 11:
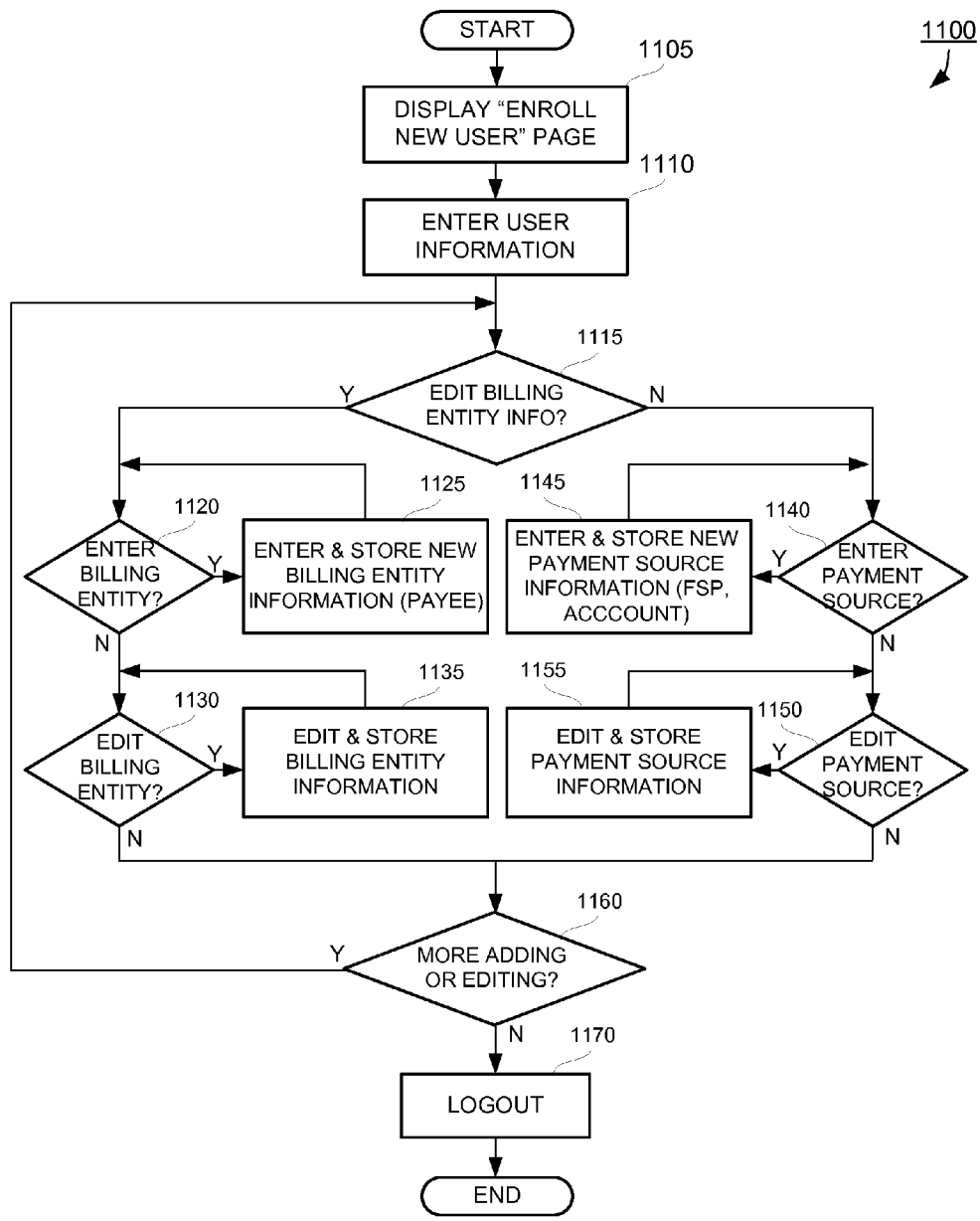

FIG. 11 is a flow chart diagram illustrating computer-implemented method steps of a computer program embodying operations of a web application for enrolling a new user in accordance with exemplary aspects of the invention.

Figure 12:
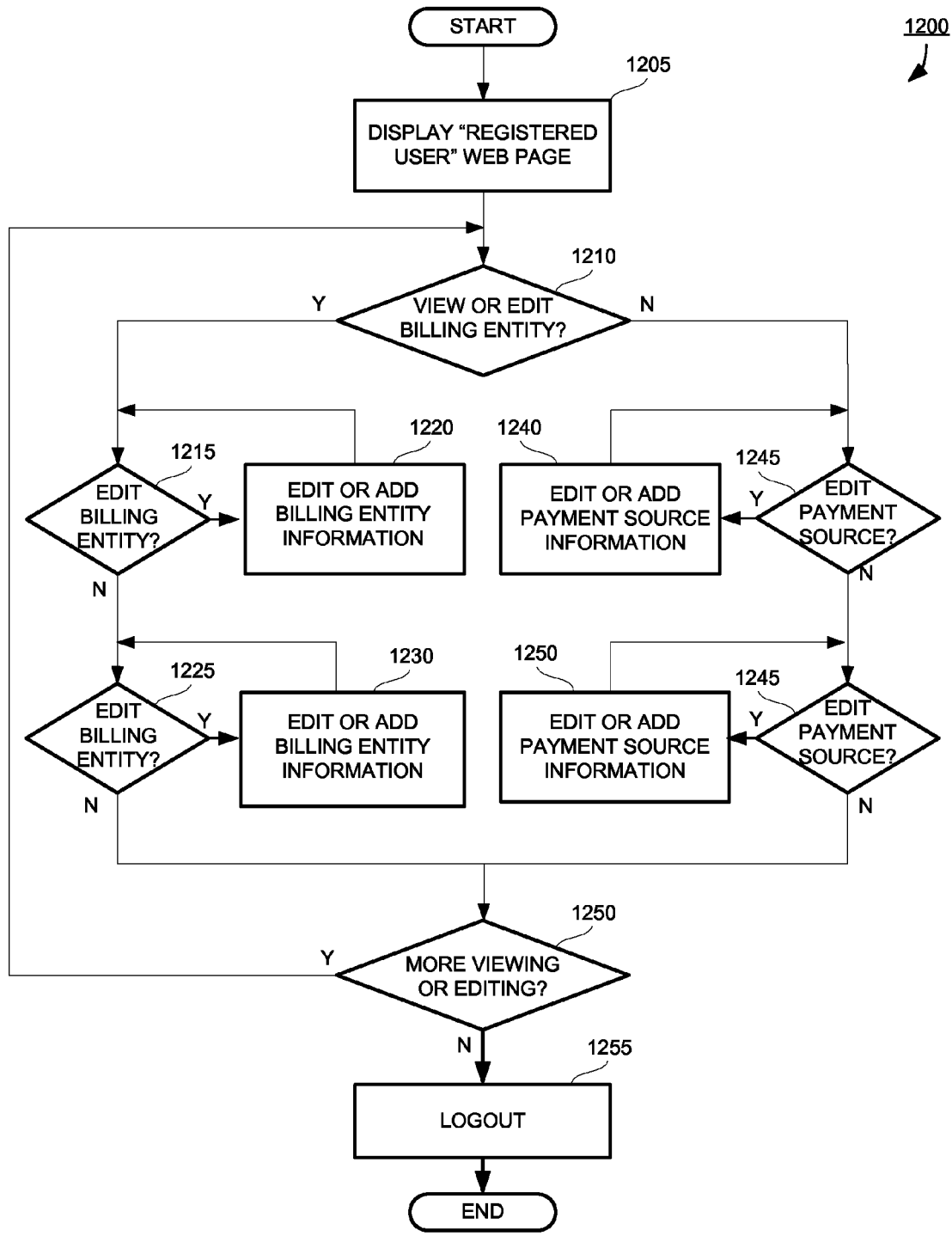

FIG. 12 is a flow chart diagram illustrating computer-implemented method steps of a computer program embodying operations of a web application for a registered user in accordance with exemplary aspects of the invention.

Figure 13:
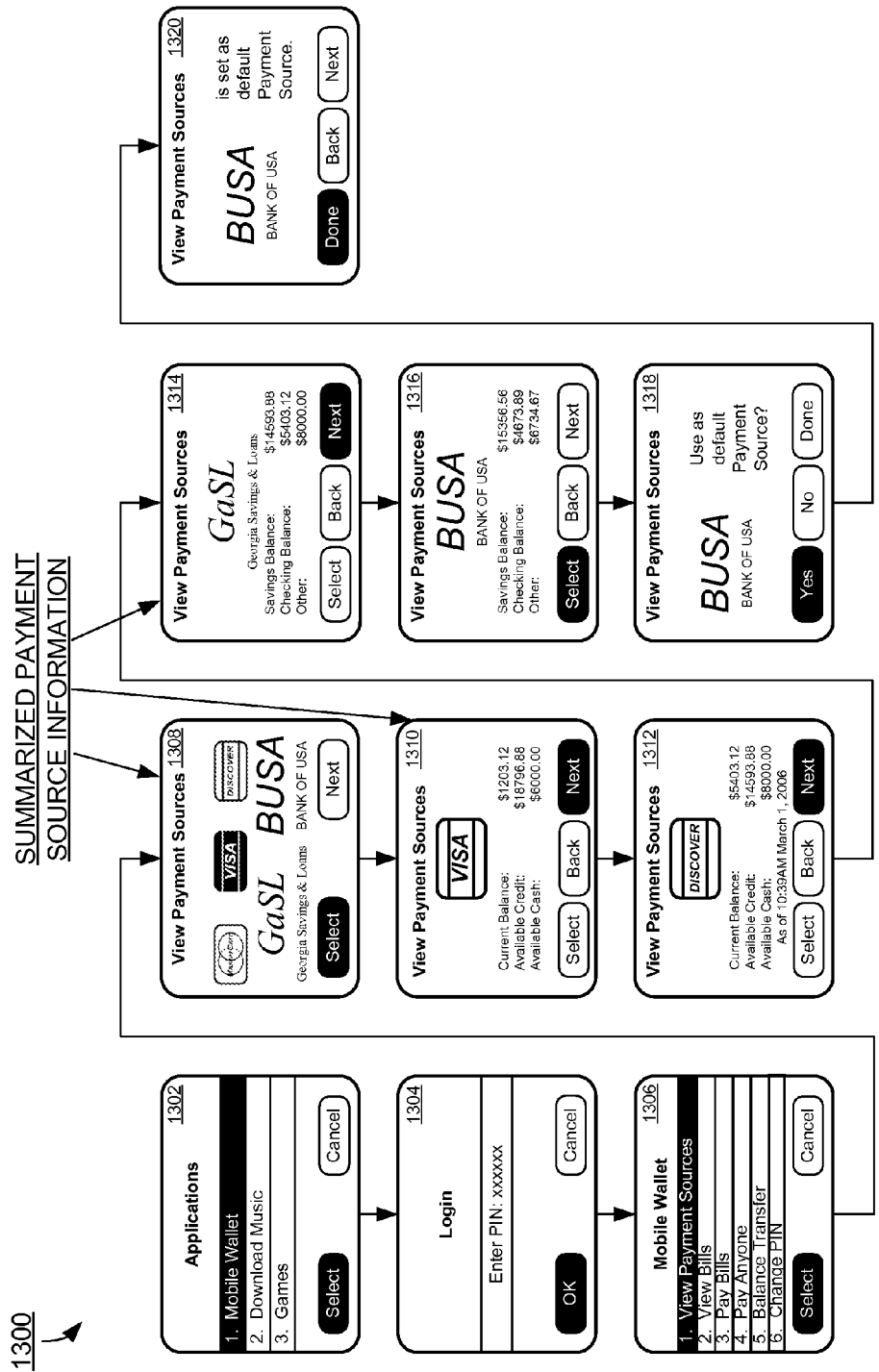

FIG. 13 shows a sequence of mobile device screen displays for viewing selectable payment sources and account balances according to an exemplary aspect of the invention.

Figure 14:
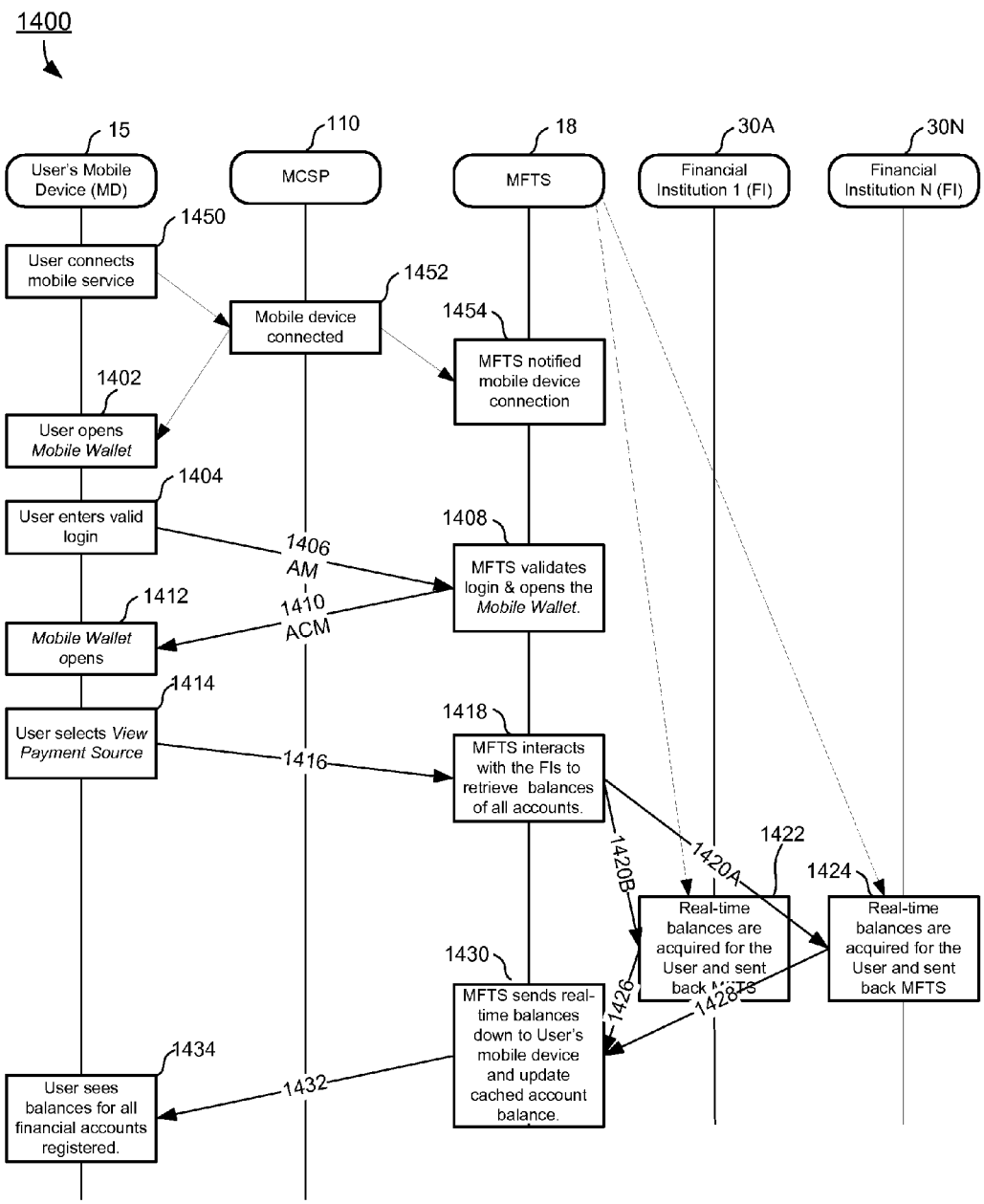

FIG. 14 is a sequence diagram illustrating computer-implemented method steps for viewing payment sources and account balances according to an exemplary aspect of the invention.

Figure 15:
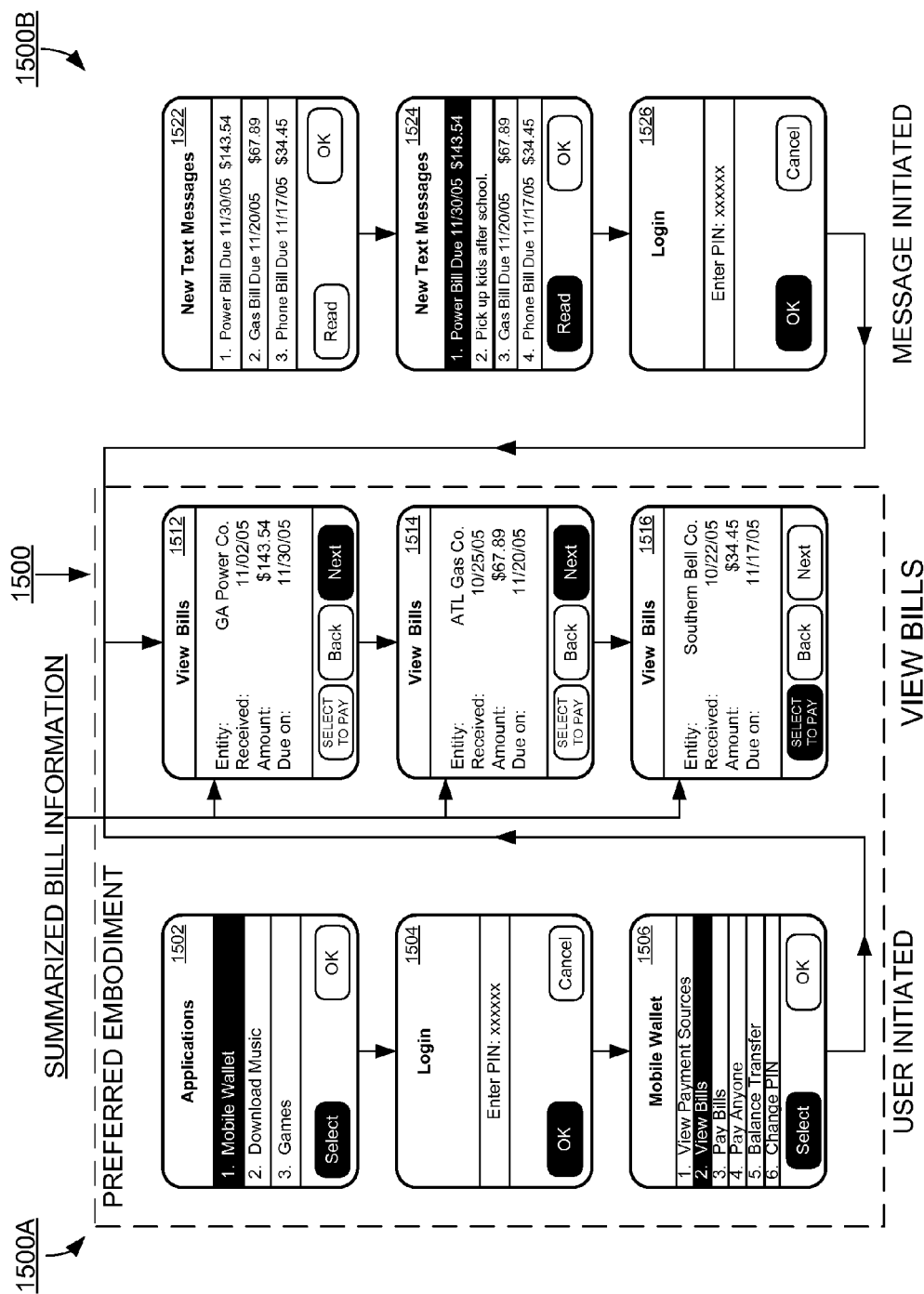

FIG. 15 shows a sequence of mobile device screen displays for viewing bills according to a preferred embodiment and an alternative embodiment of the present invention.

Figure 16:
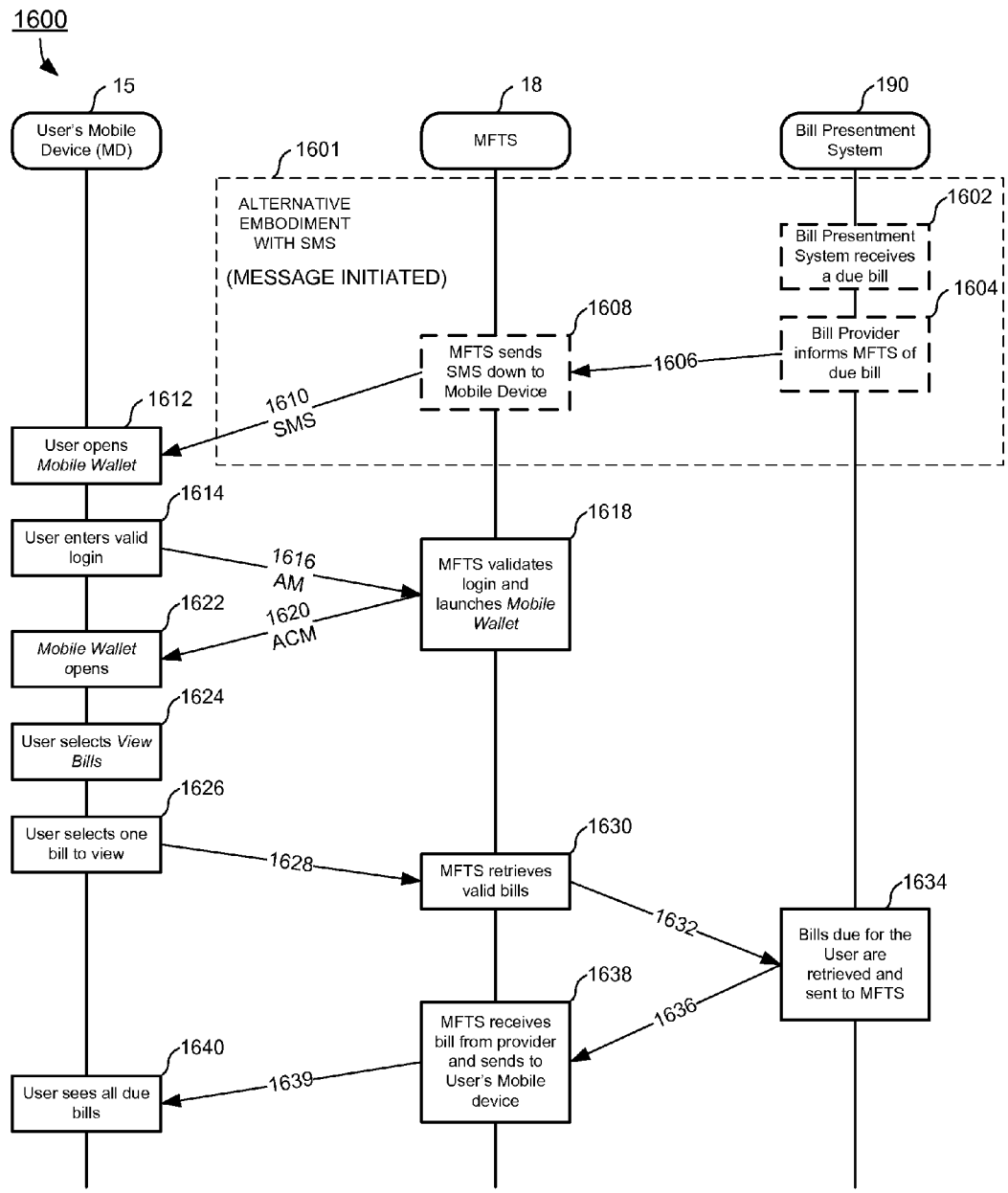

FIG. 16 is a sequence diagram illustrating computer-implemented method steps for viewing bills according to a preferred embodiment and an alternative embodiment of the present invention.

Figure 17:
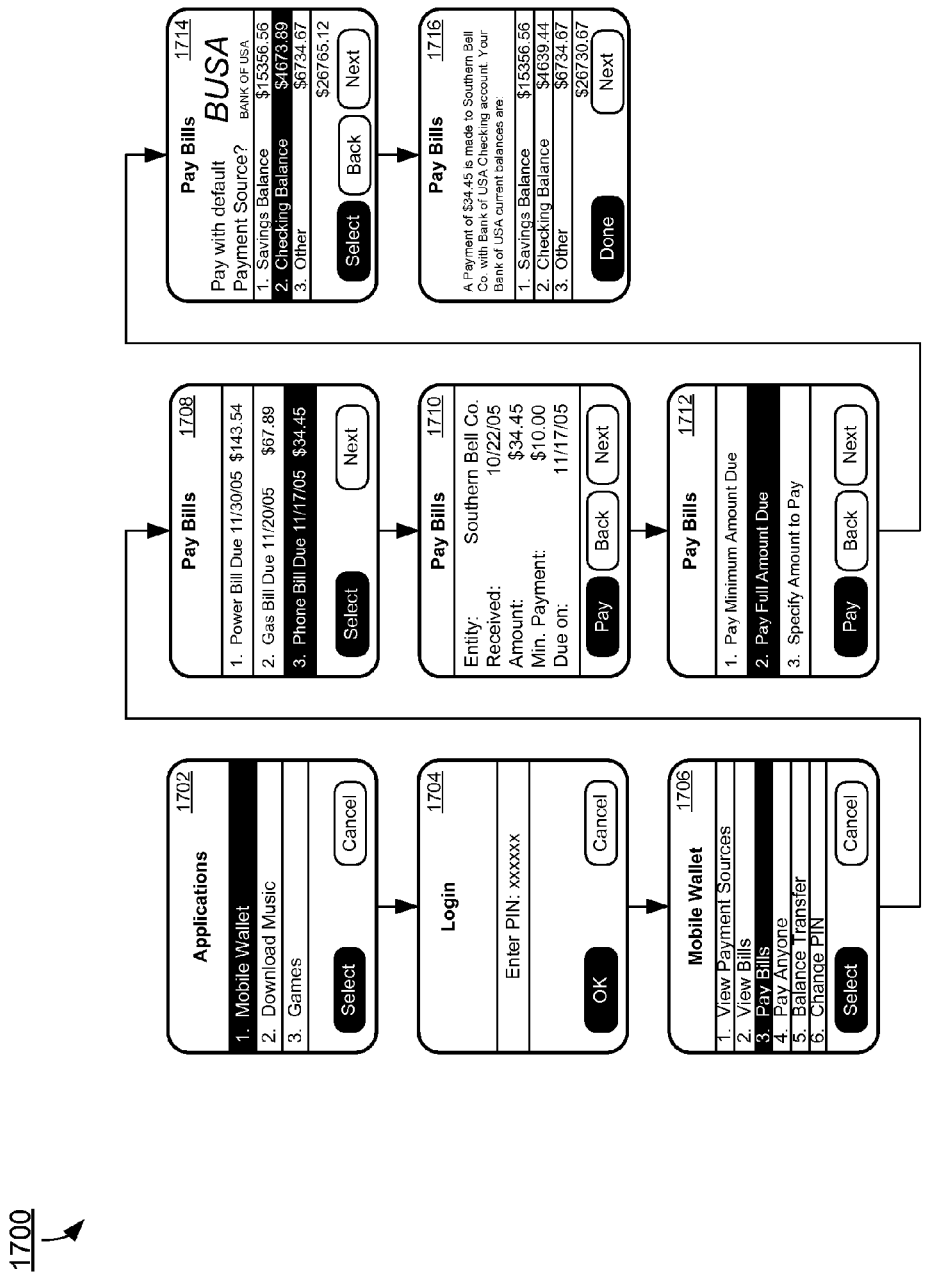

FIG. 17 shows a sequence of mobile device screen displays for paying a bill according to an exemplary aspect of the invention.

Figure 18A:
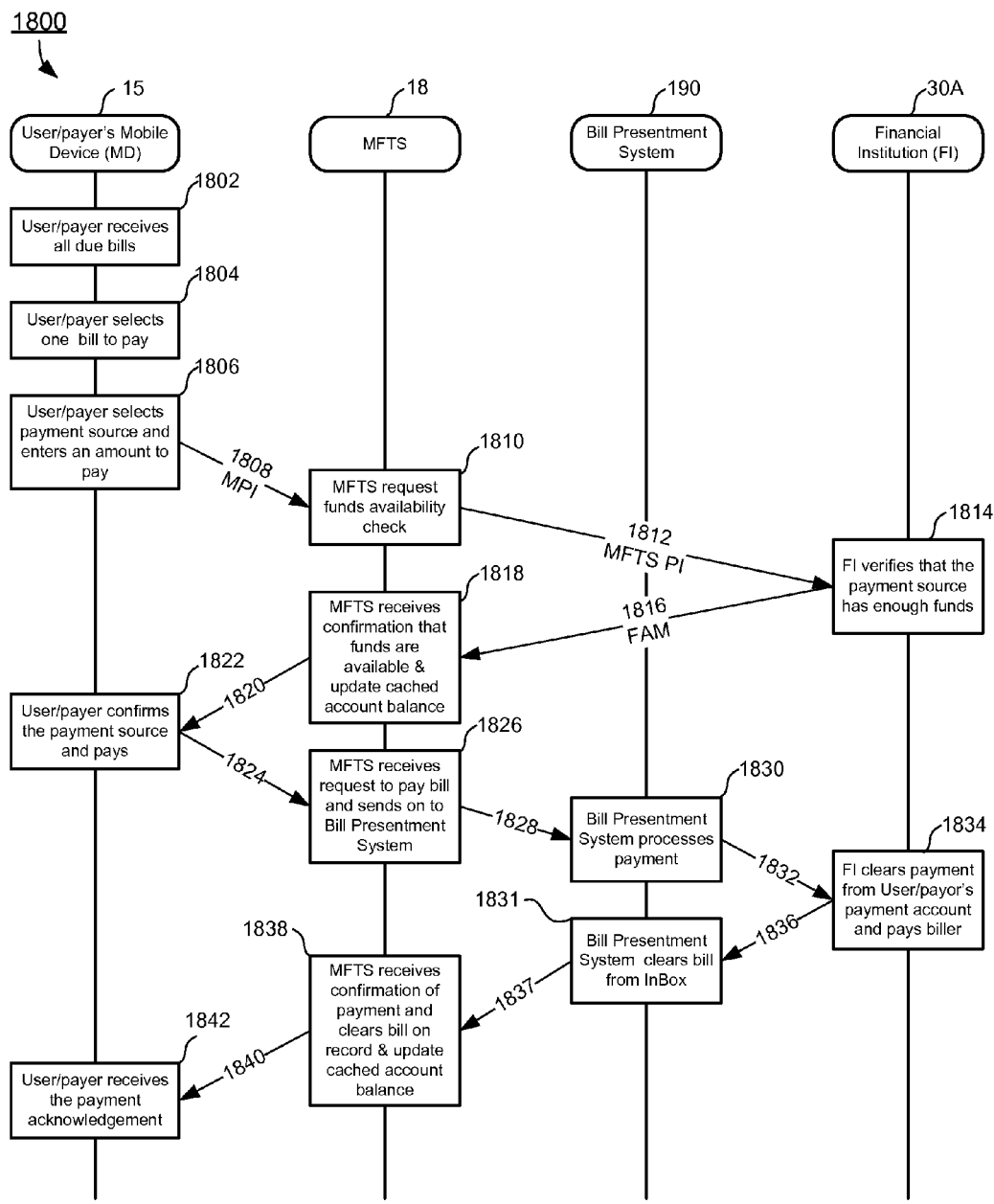
Figure 18B:
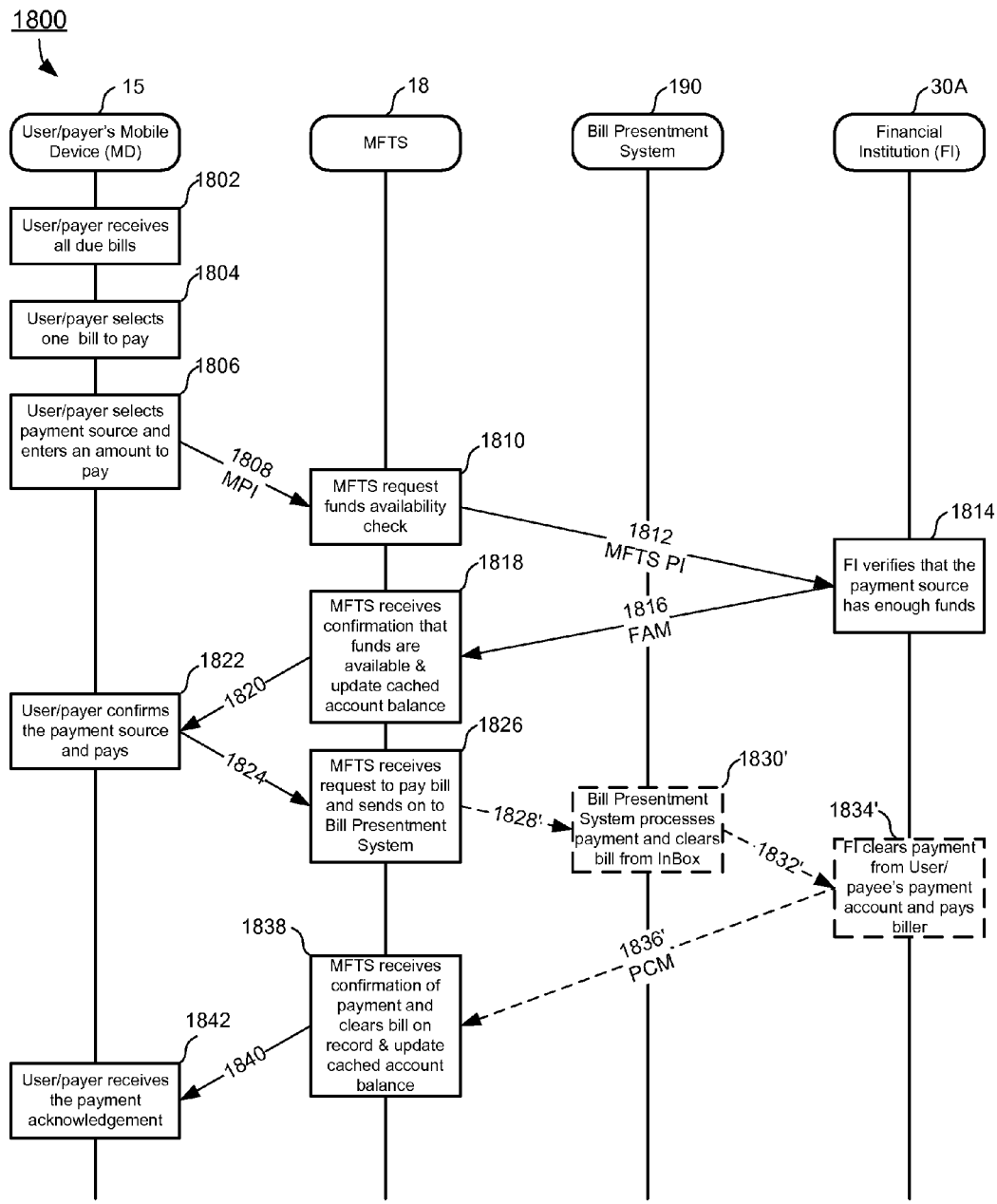

FIG. 18A shows a sequence diagram illustrating computer-implemented method steps for paying a bill according to a preferred embodiment of the present invention, and FIG. 18B shows a sequence diagram illustrating computer-implemented method steps for paying a bill according to an alternative embodiment of the present invention.

Figure 19:
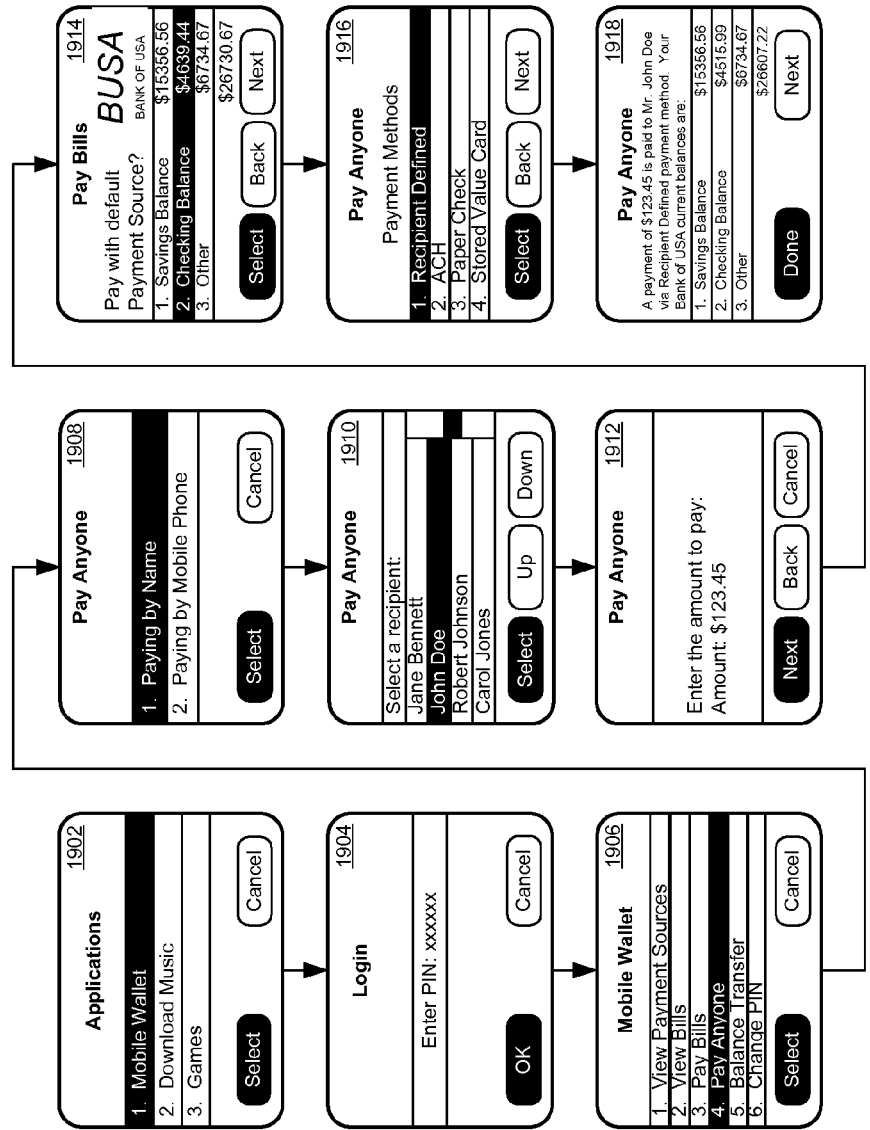

FIG. 19 is a sequence of mobile device screen views from a payer's perspective as a user uses a "PayAnyone" payment option, selects a name from a list, and uses a "recipient defined" payment method according to an exemplary aspect of the invention.

Figure 20:
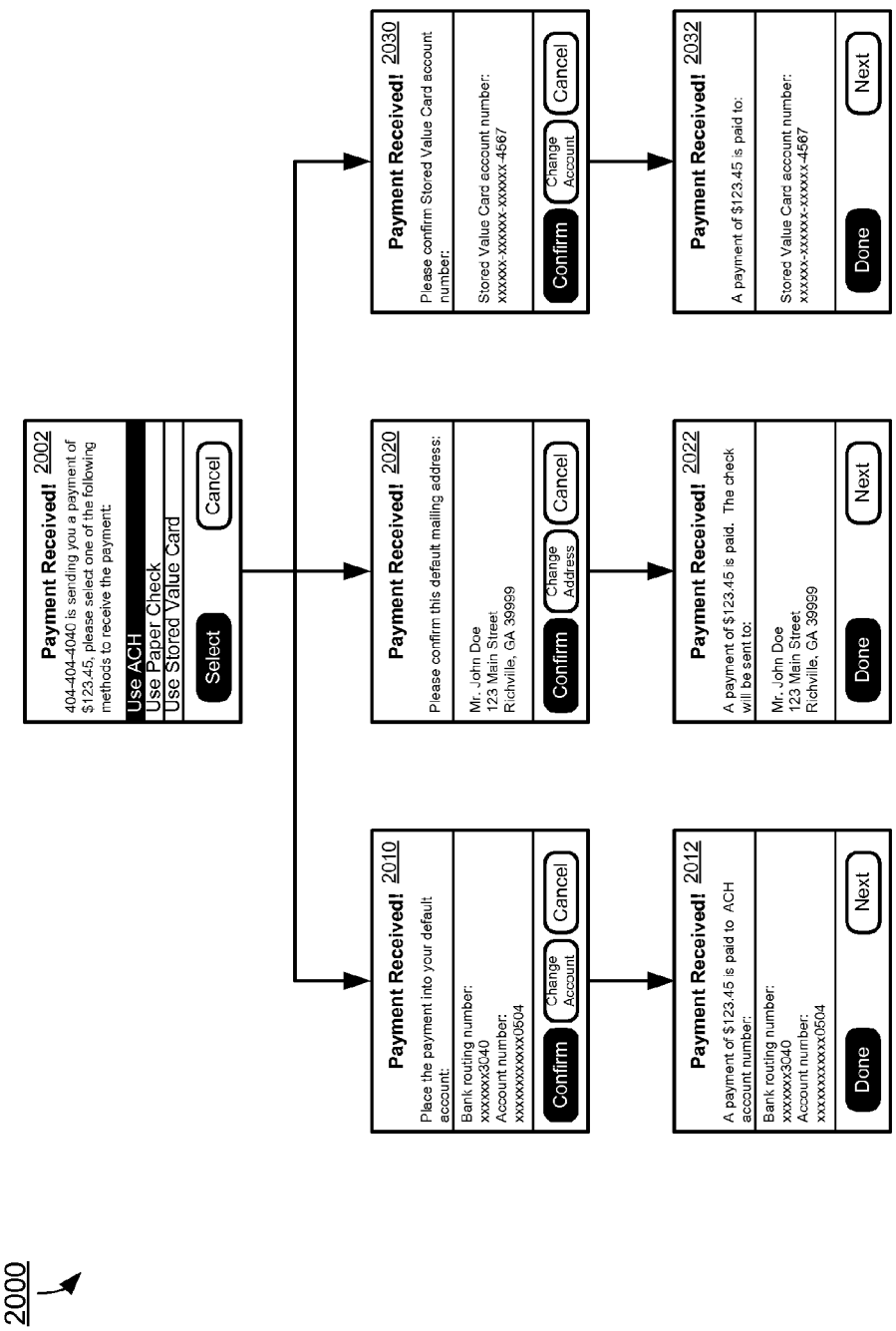

FIG. 20 is a sequence of mobile device screen views from a payee's perspective of a "PayAnyone" using a "recipient defined" payment option according to an exemplary aspect of the invention.

Figure 21:
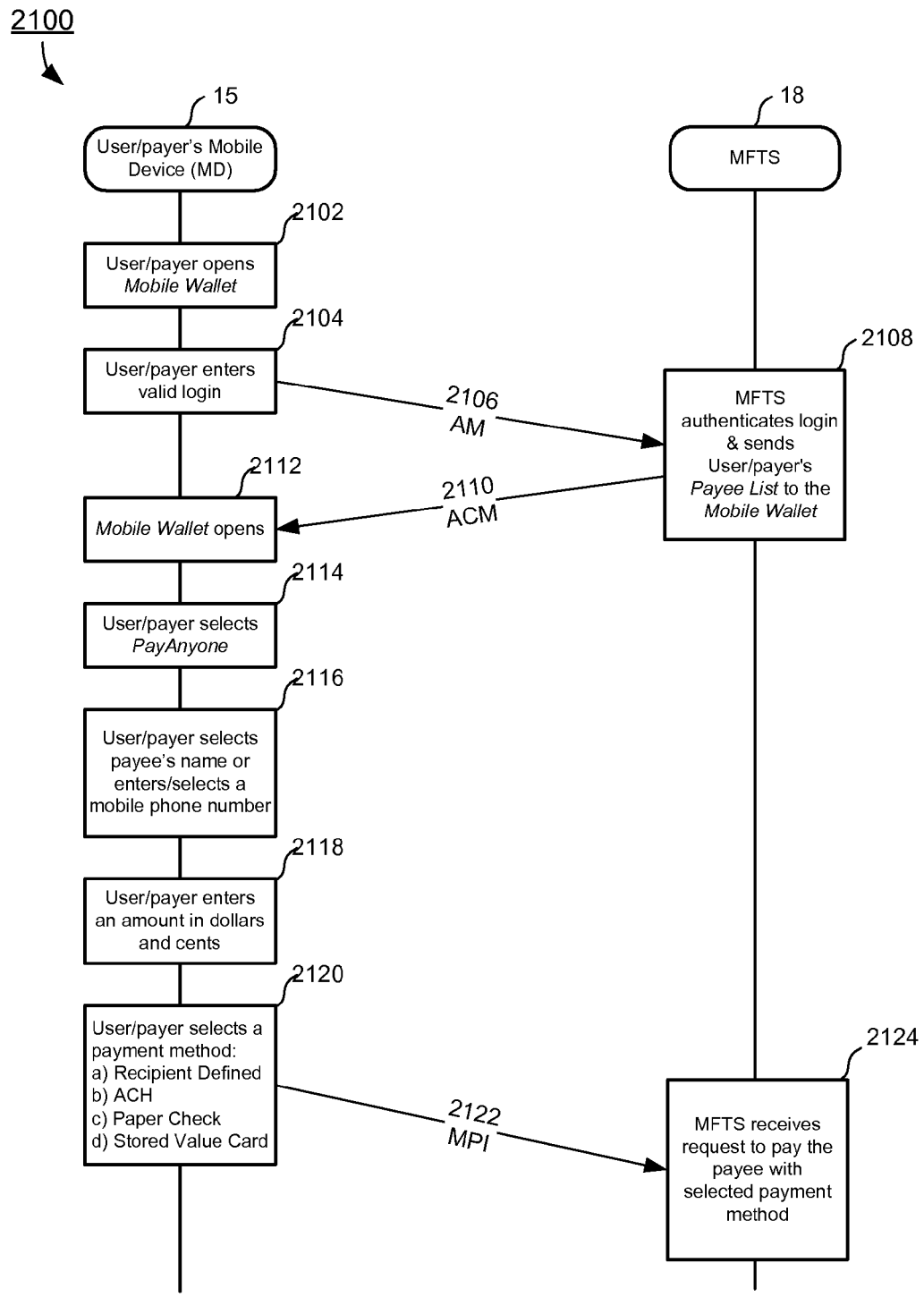

FIG. 21 shows a sequence diagram illustrating computer-implemented method from a payer's perspective as a user uses a "PayAnyone" payment option, selects a payee, and selects a payment method according to an exemplary aspect of the invention.

Figure 22:
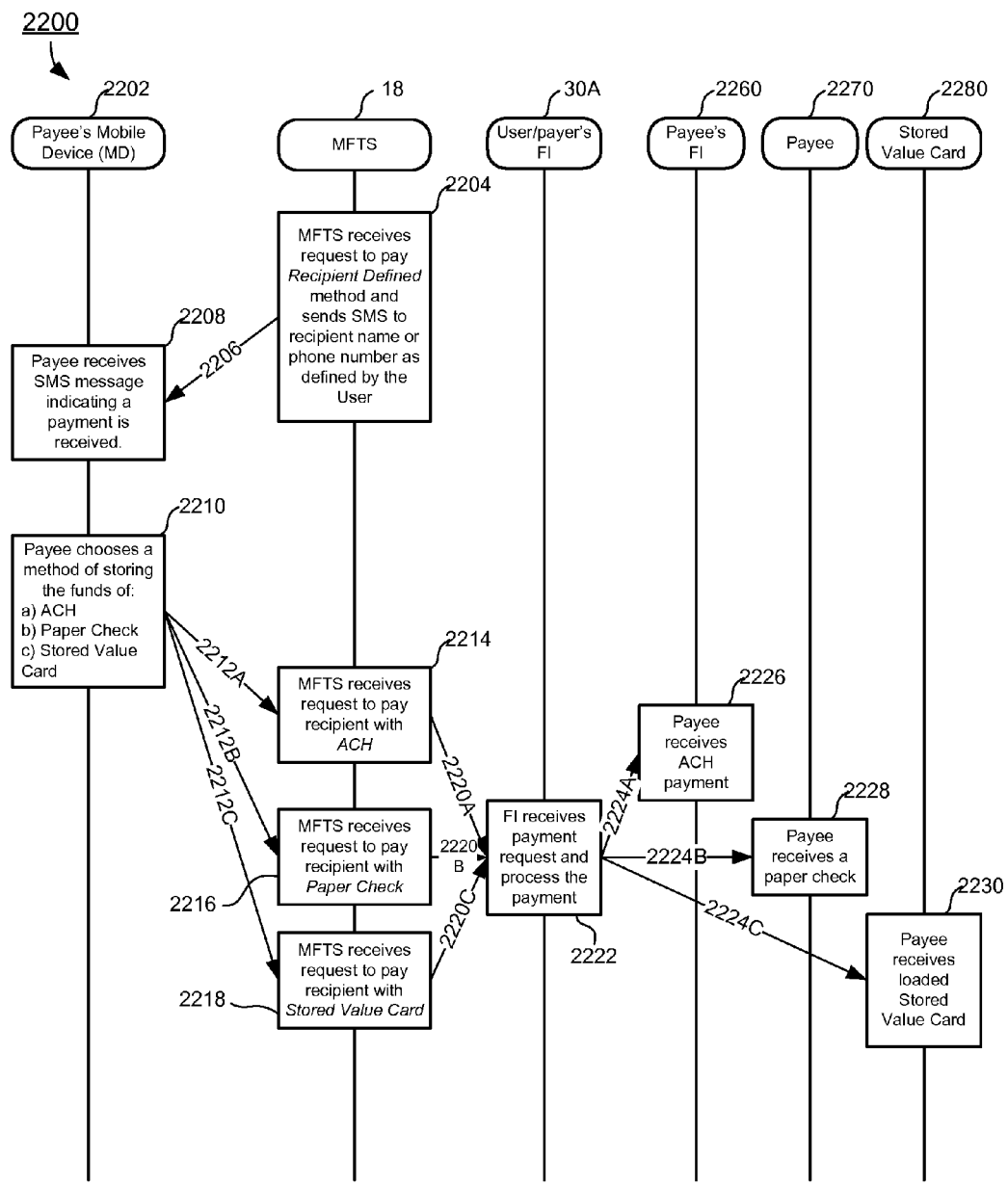

FIG. 22 shows a sequence diagram illustrating computer-implemented method from a payee's perspective as a user uses a "PayAnyone" payment option, selects "recipient defined" payment method, selects a payment method, and receives the payment according to an exemplary aspect of the invention.

Figure 23:
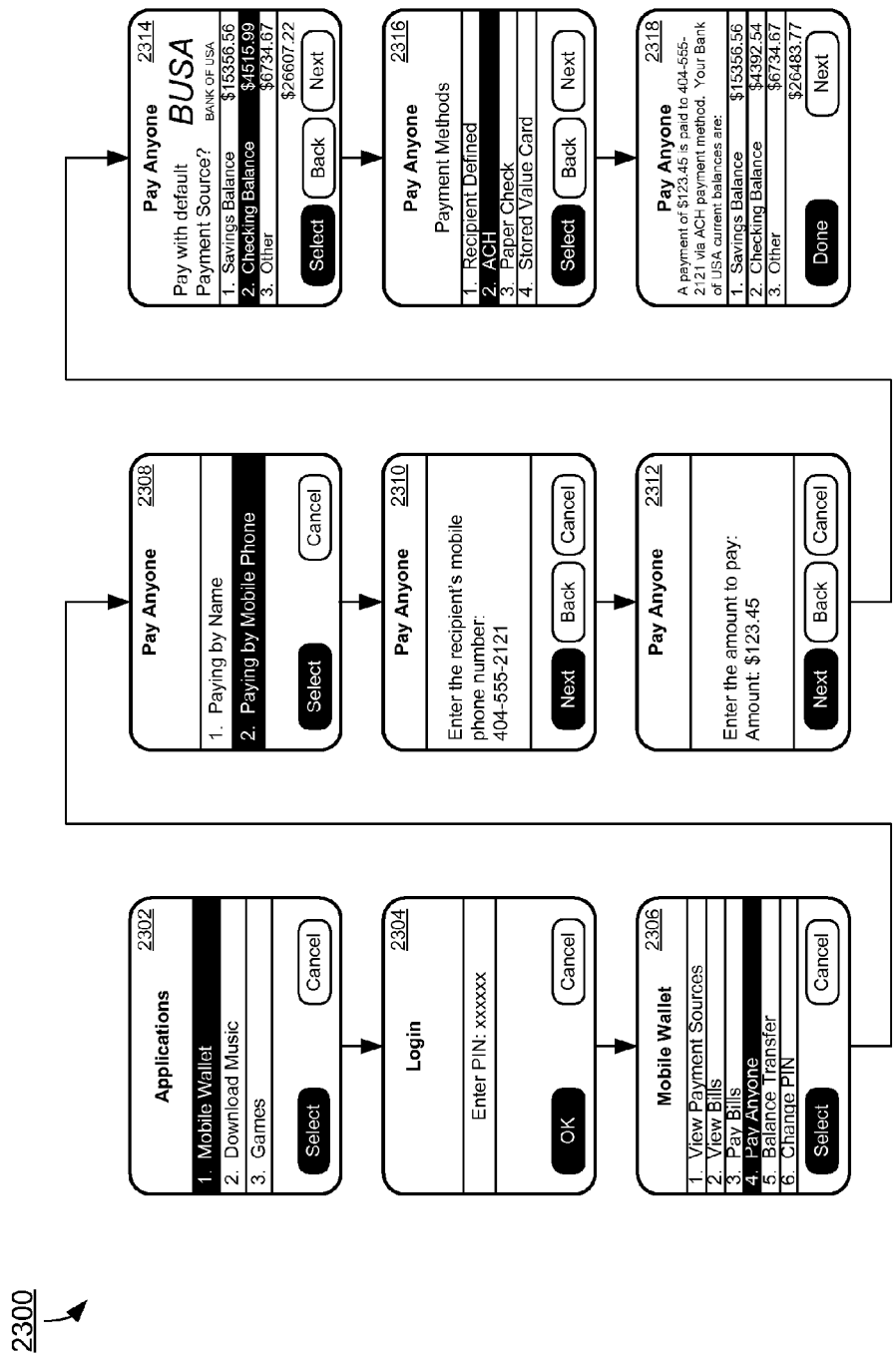

FIG. 23 shows a sequence of mobile device screen views from a payer's view of a "PayAnyone" payment feature with selection of an ACH payment method according to an exemplary aspect of the invention.

Figure 24:
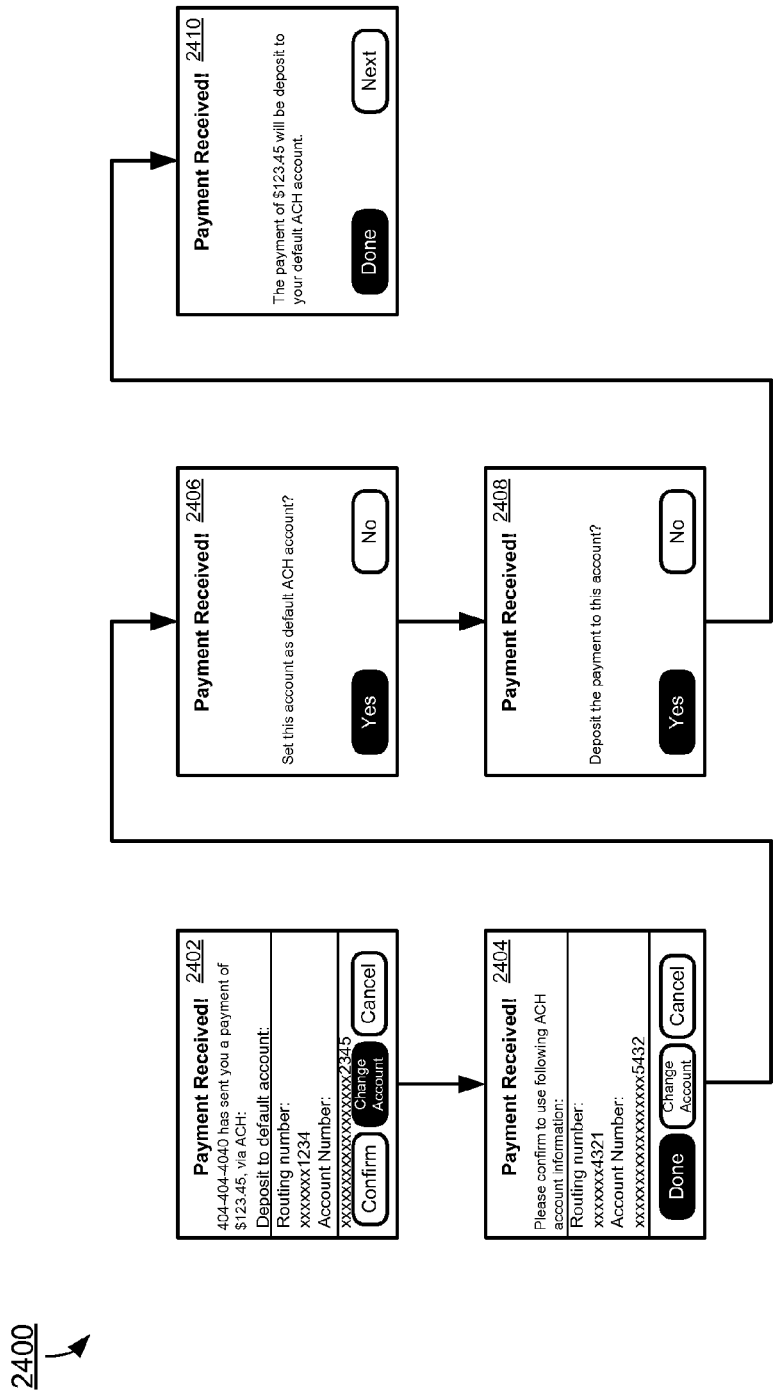

FIG. 24 shows a sequence of mobile device screen views from a payee's perspective of a "PayAnyone" payment feature with ACH payment method according to an exemplary aspect of the invention.

Figure 25:
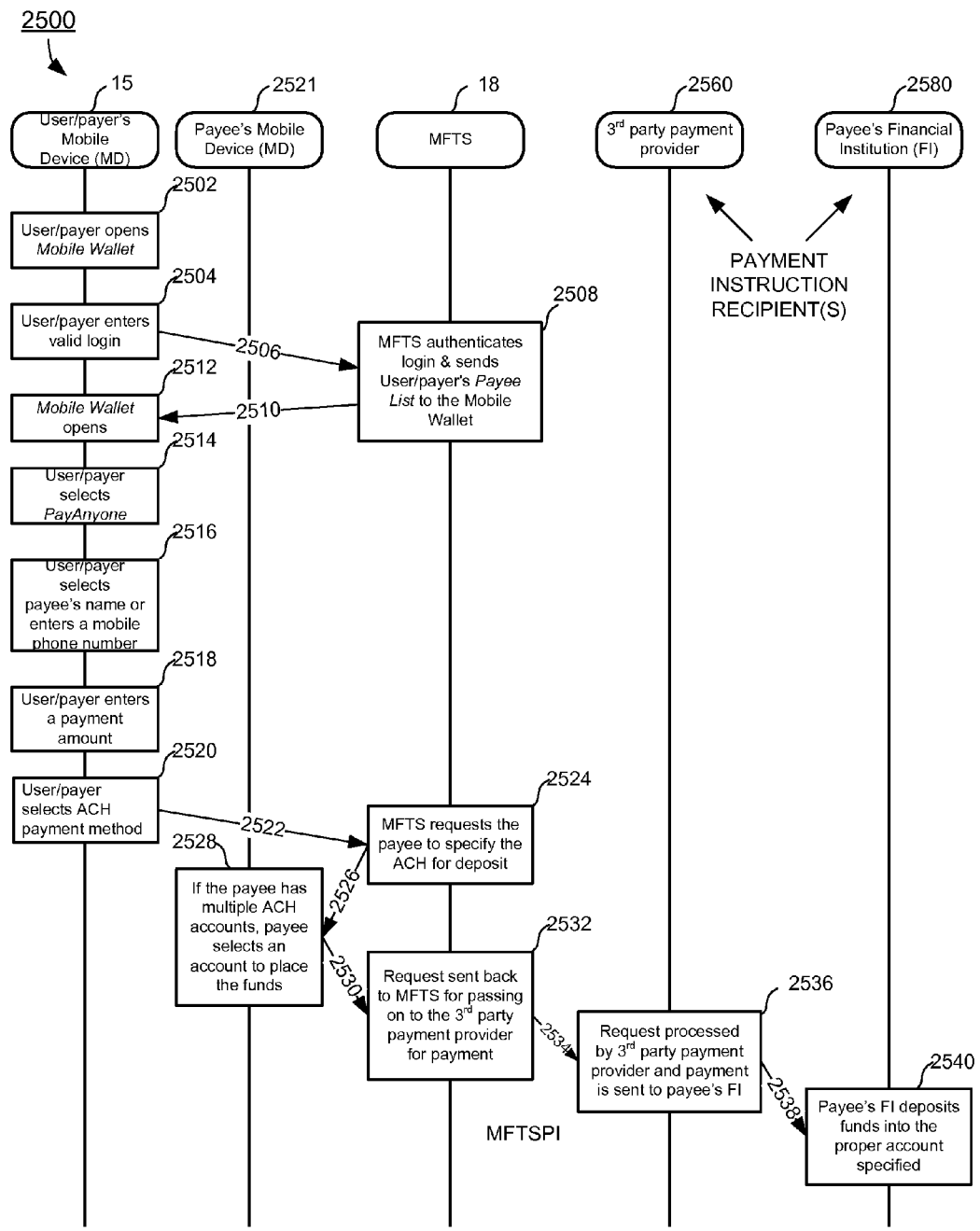

FIG. 25 is a sequence diagram illustrating computer-implemented method steps for a "PayAnyone" payment feature with ACH payment method according to an exemplary aspect of the invention.

Figure 26:
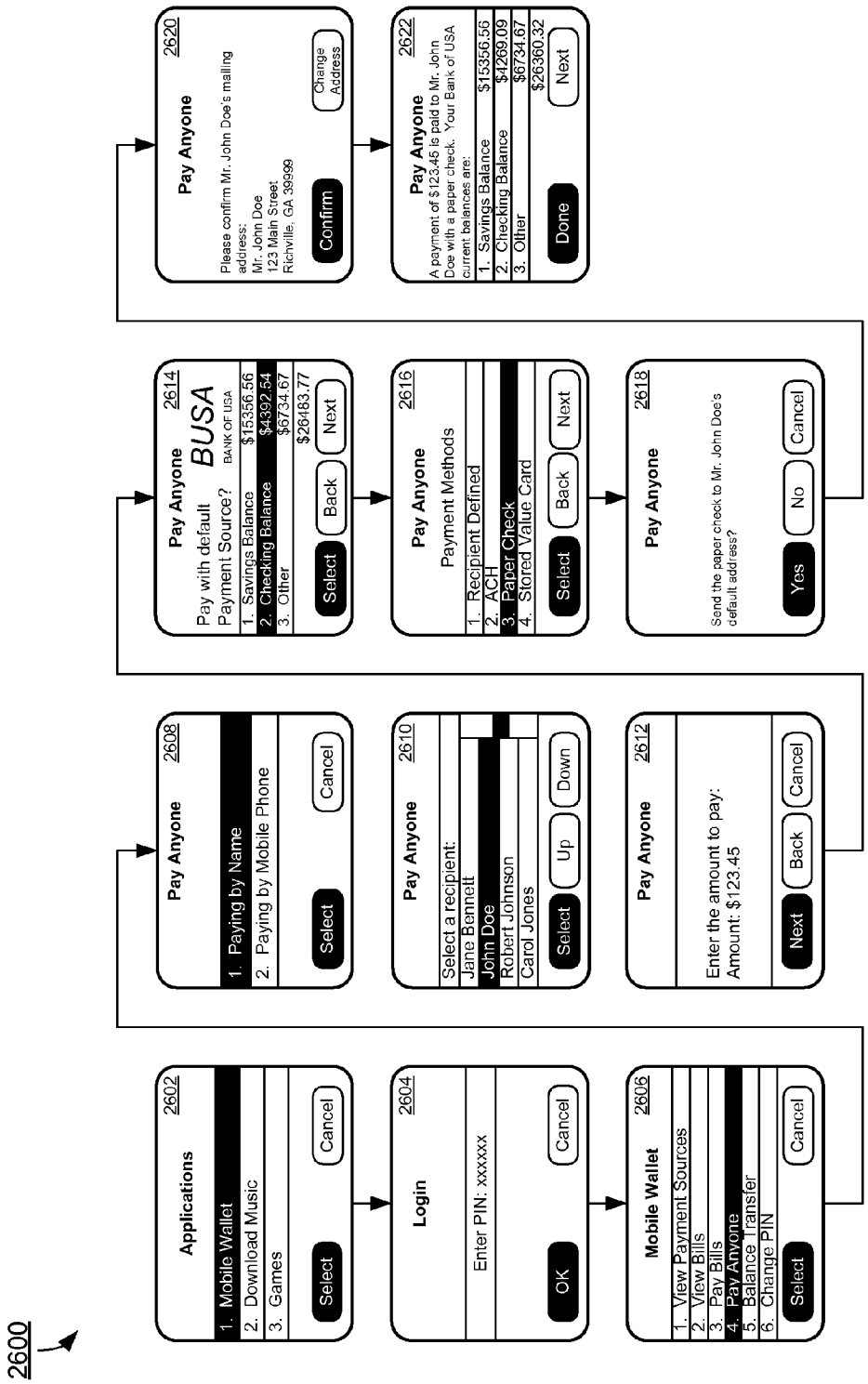

FIG. 26 shows a sequence of mobile device screen views from a payer's perspective as a user uses a "PayAnyone" payment feature and selects a paper check payment method according to an exemplary aspect of the invention.

Figure 27:
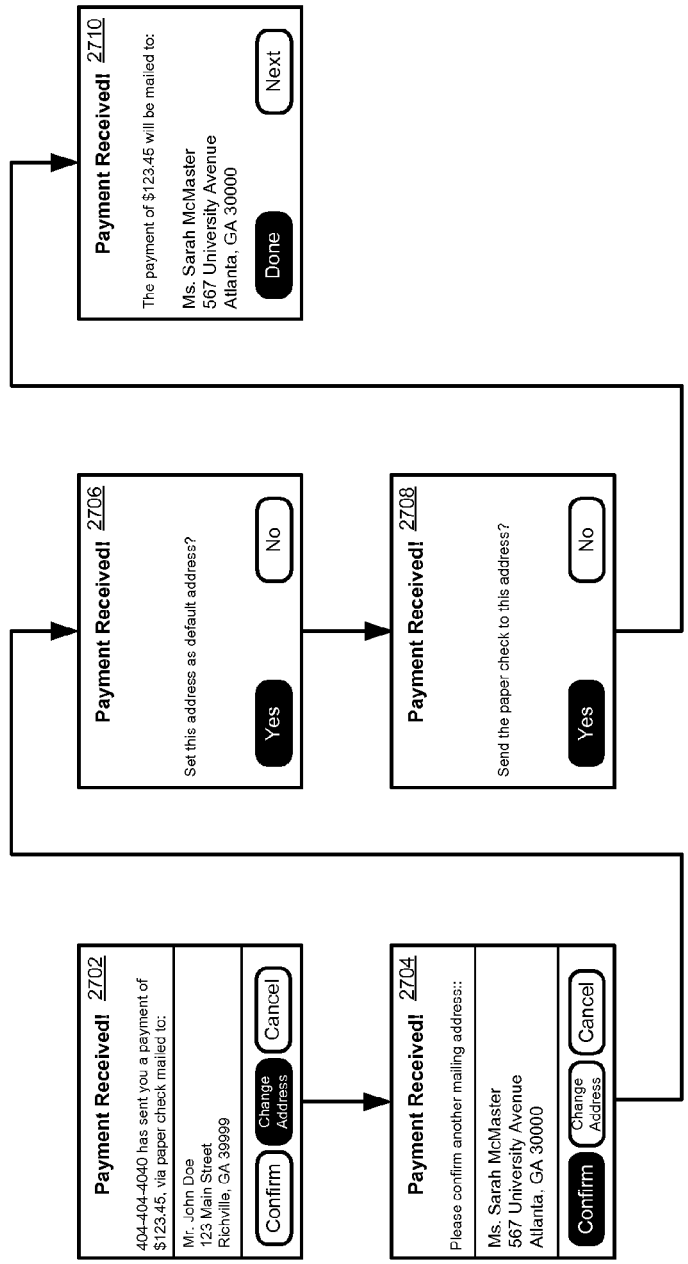

FIG. 27 shows a sequence of mobile device screen views from a payee's perspective of a "PayAnyone" payment feature with a paper check payment method according to an exemplary aspect of the invention.

Figure 28:
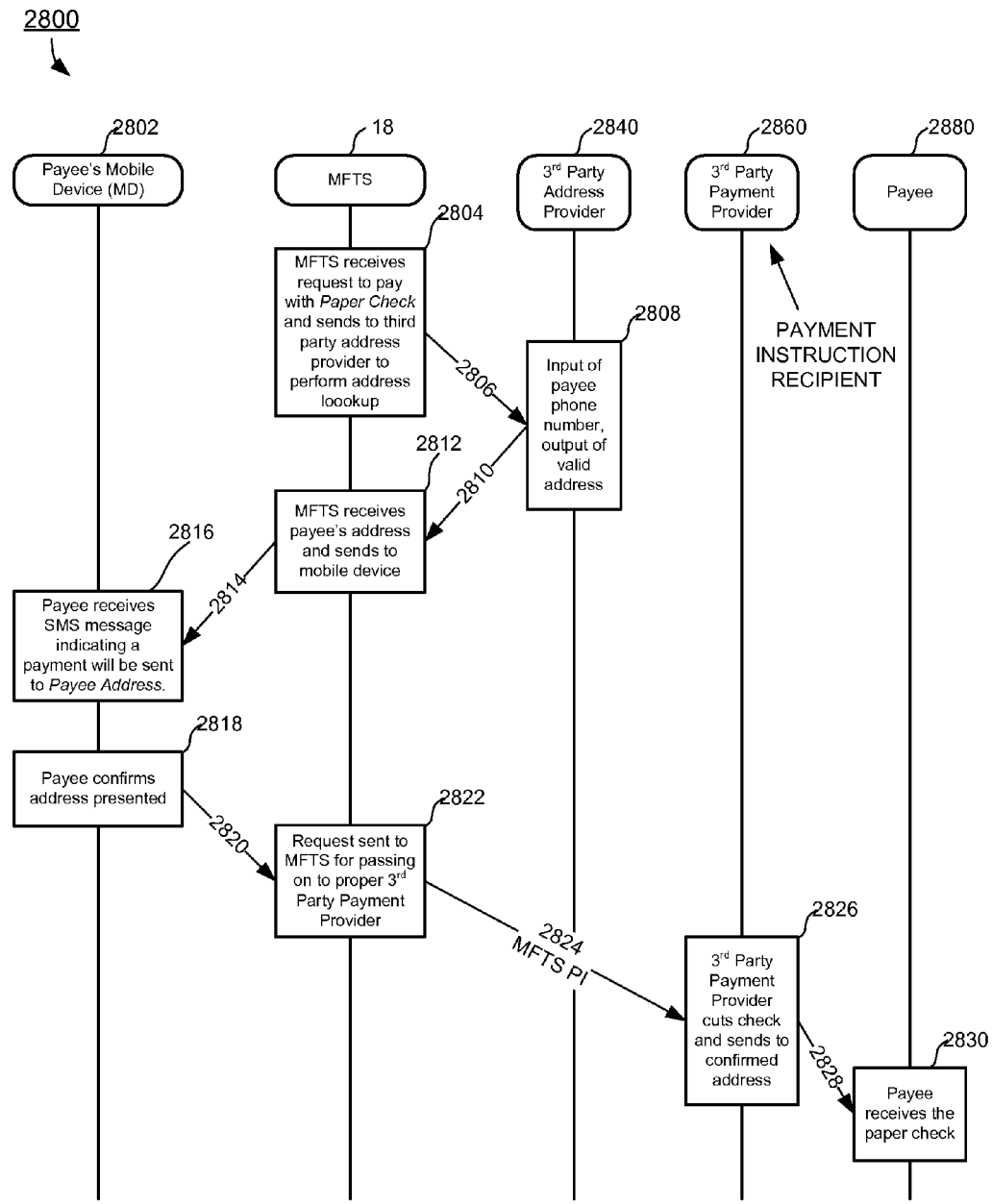

FIG. 28 is a sequence diagram illustrating computer-implemented method steps for a "PayAnyone" payment feature, involving a paper check payment method according to an exemplary aspect of the invention.

Figure 29:
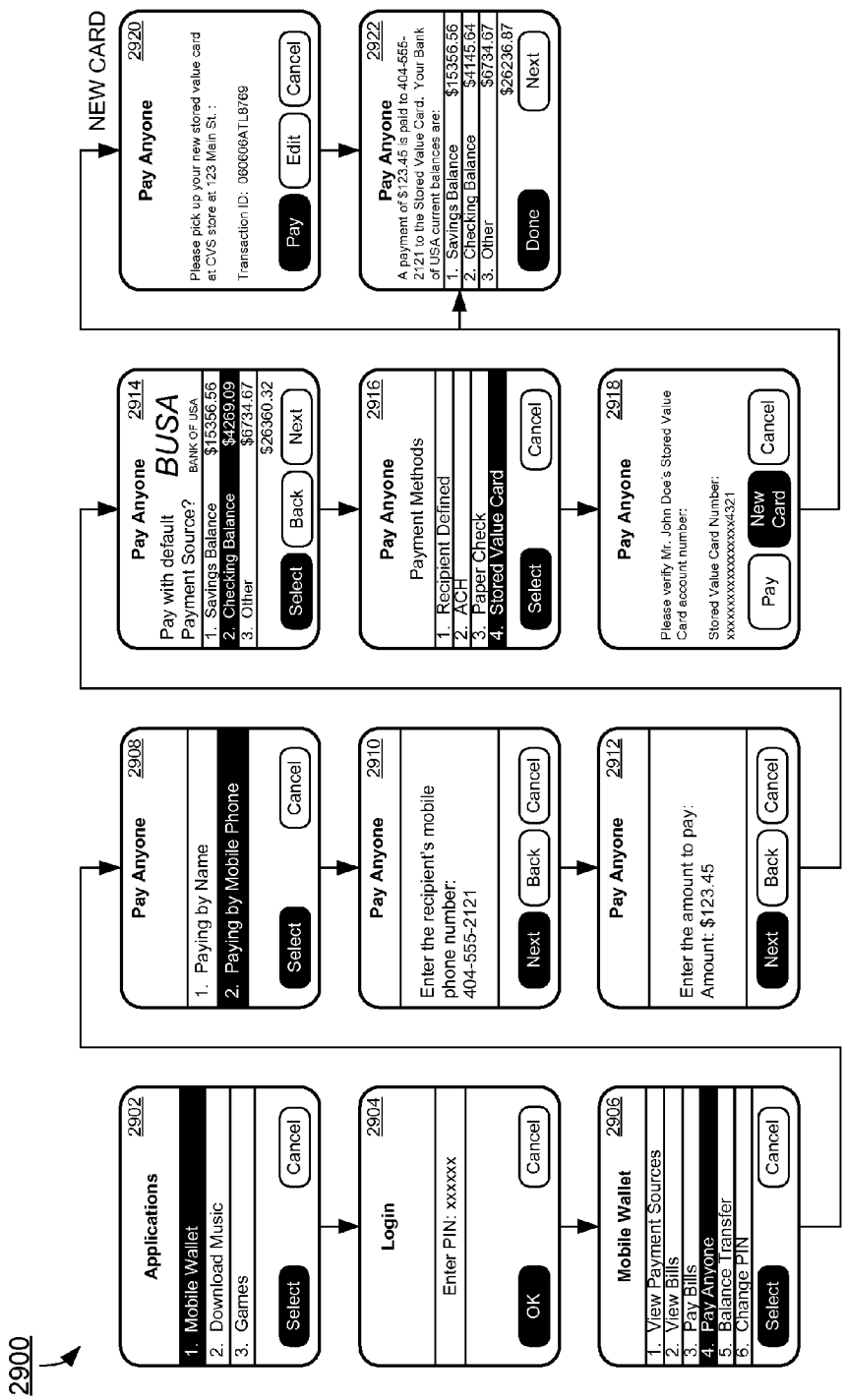

FIG. 29 shows a sequence of mobile device screen views from a payer's perspective as a user uses a "PayAnyone" payment feature and selects a stored value (SV) card payment method according to an exemplary aspect of the invention.

Figure 30:
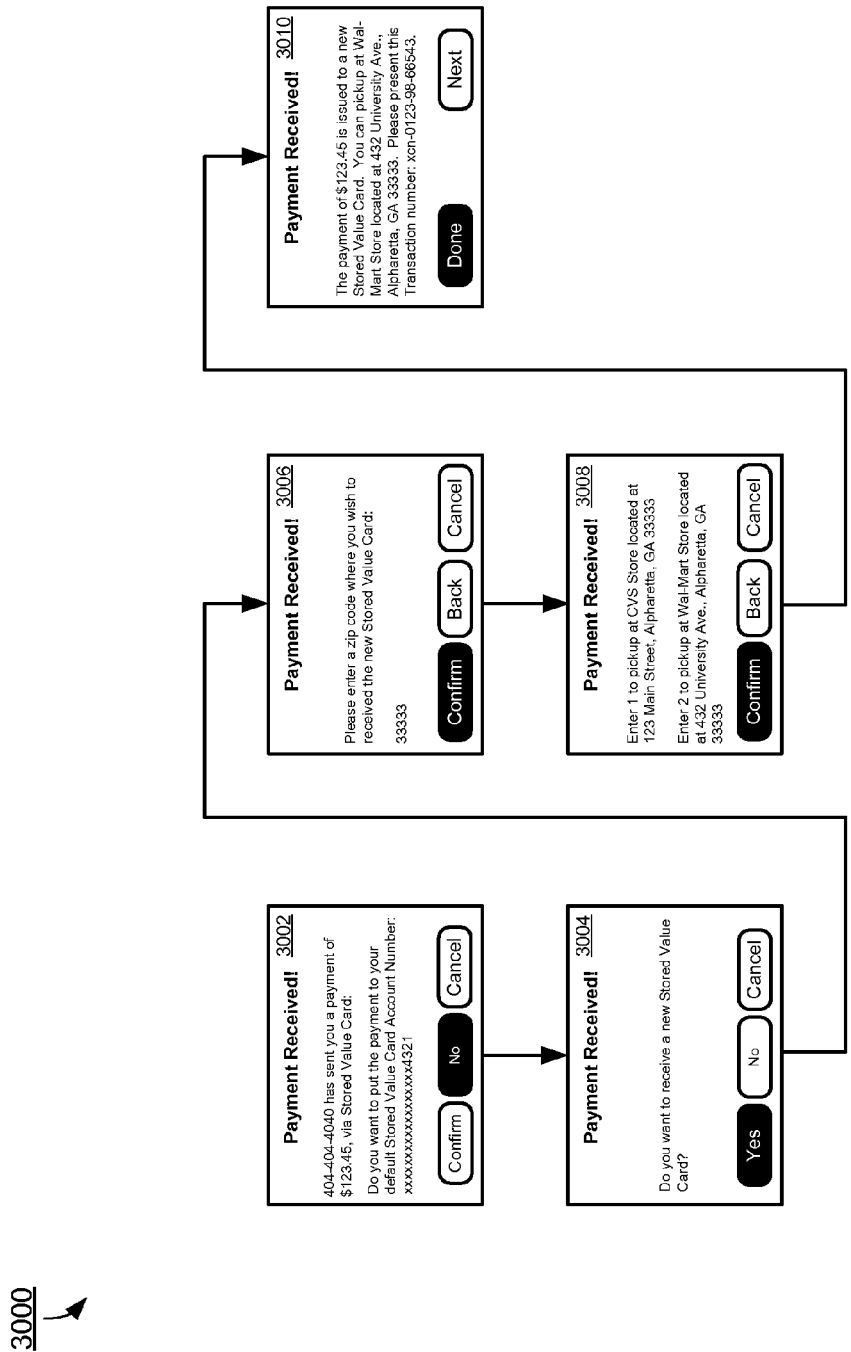

FIG. 30 shows a sequence of mobile device screen views from a payee's perspective of a "PayAnyone" payment feature with the stored value (SV) card payment method according to an exemplary aspect of the invention.

Figure 31:
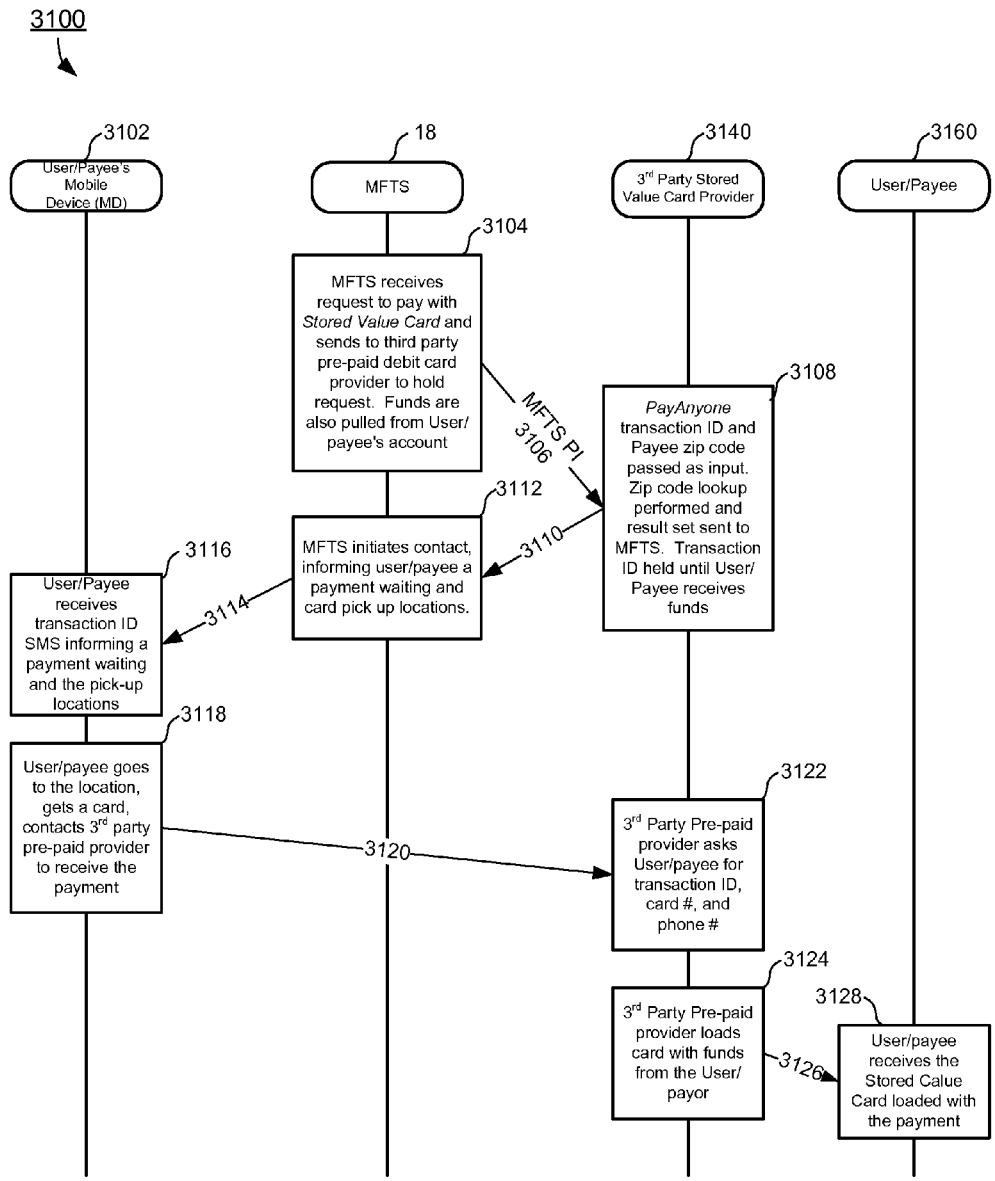

FIG. 31 is a sequence diagram illustrating computer-implemented method steps for a "PayAnyone" payment method involving use of a stored value (SV) card payment method according to an exemplary aspect of the invention.

Figure 32:
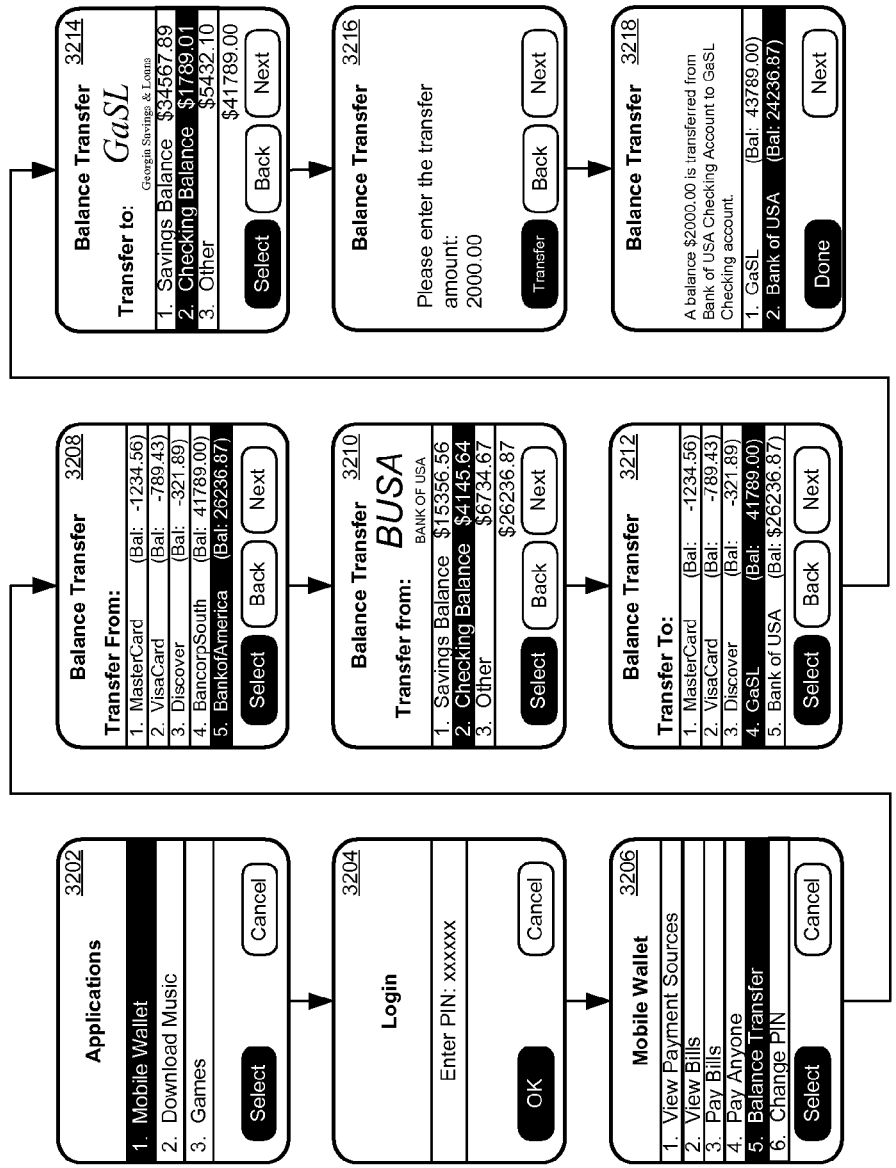

FIG. 32 shows a sequence of mobile device screen views as a user transfers funds or account balances according to an exemplary aspect of the invention.

Figure 33:
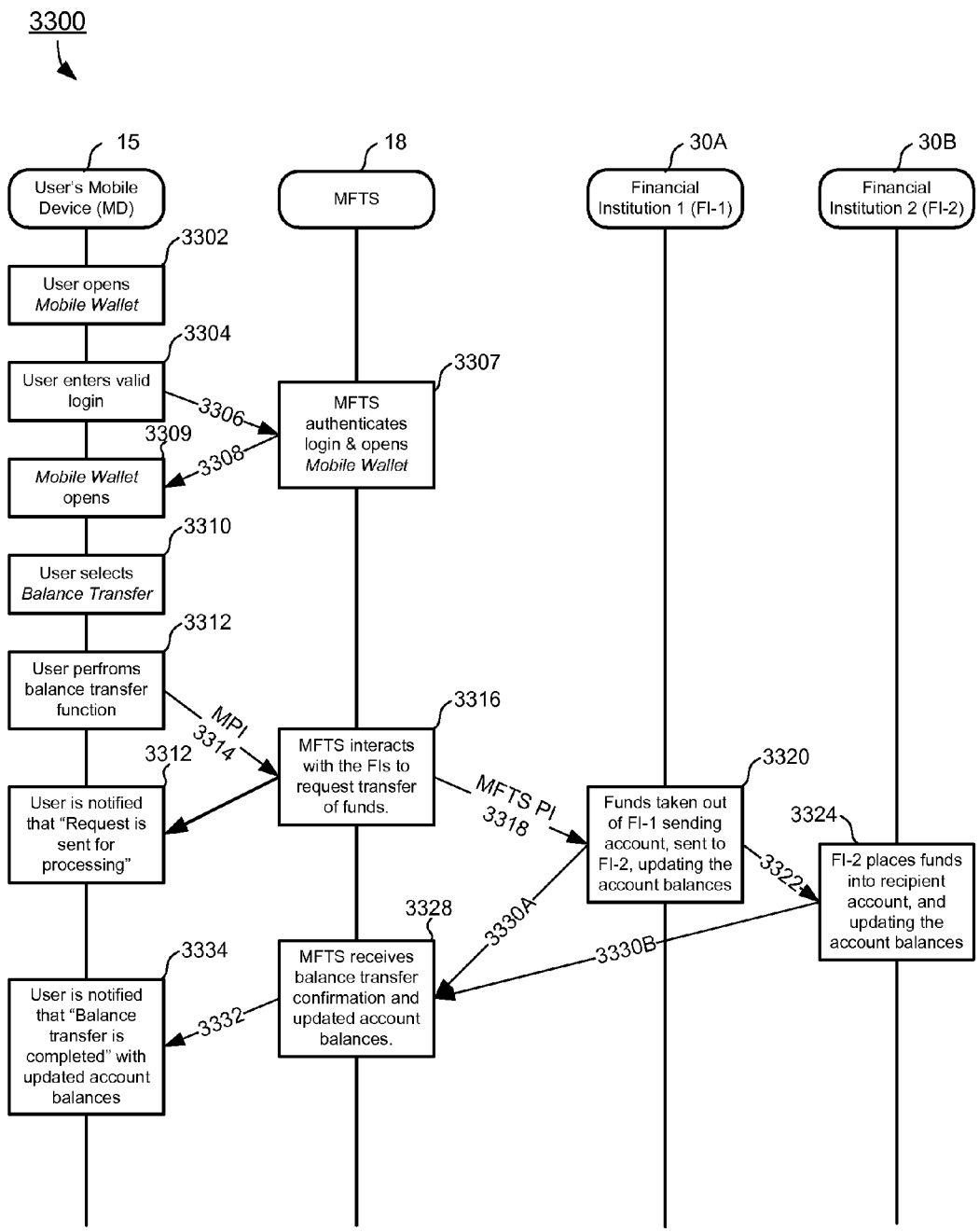

FIG. 33 is a sequence diagram illustrating computer-implemented method steps for funds transfer or balance transfers between accounts of payment sources according to an exemplary aspect of the invention.

Figure 34:
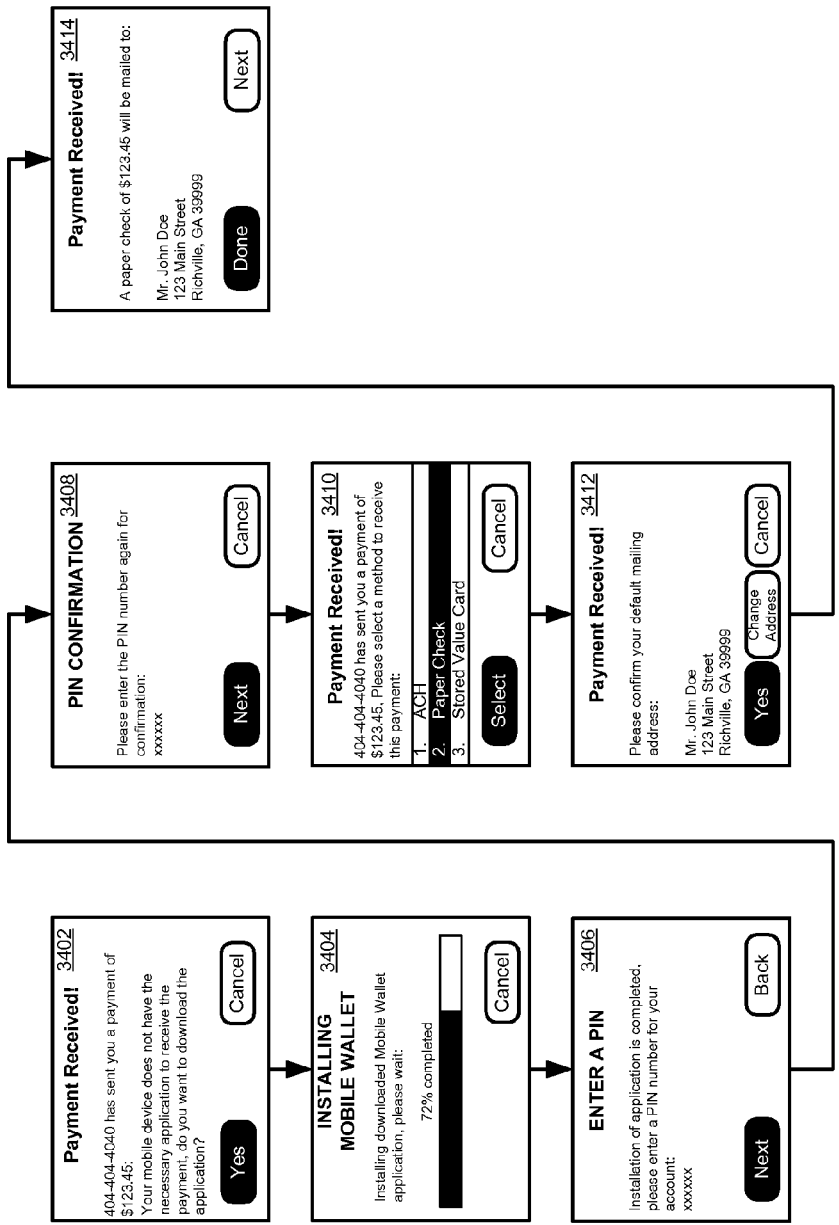

FIG. 34 shows a sequence of mobile device screen views that illustrate receipt of payment for a payee with a mobile device, with optional installation of a mobile device application to the payee's mobile device, according to an exemplary aspect of the invention.

Figure 35:
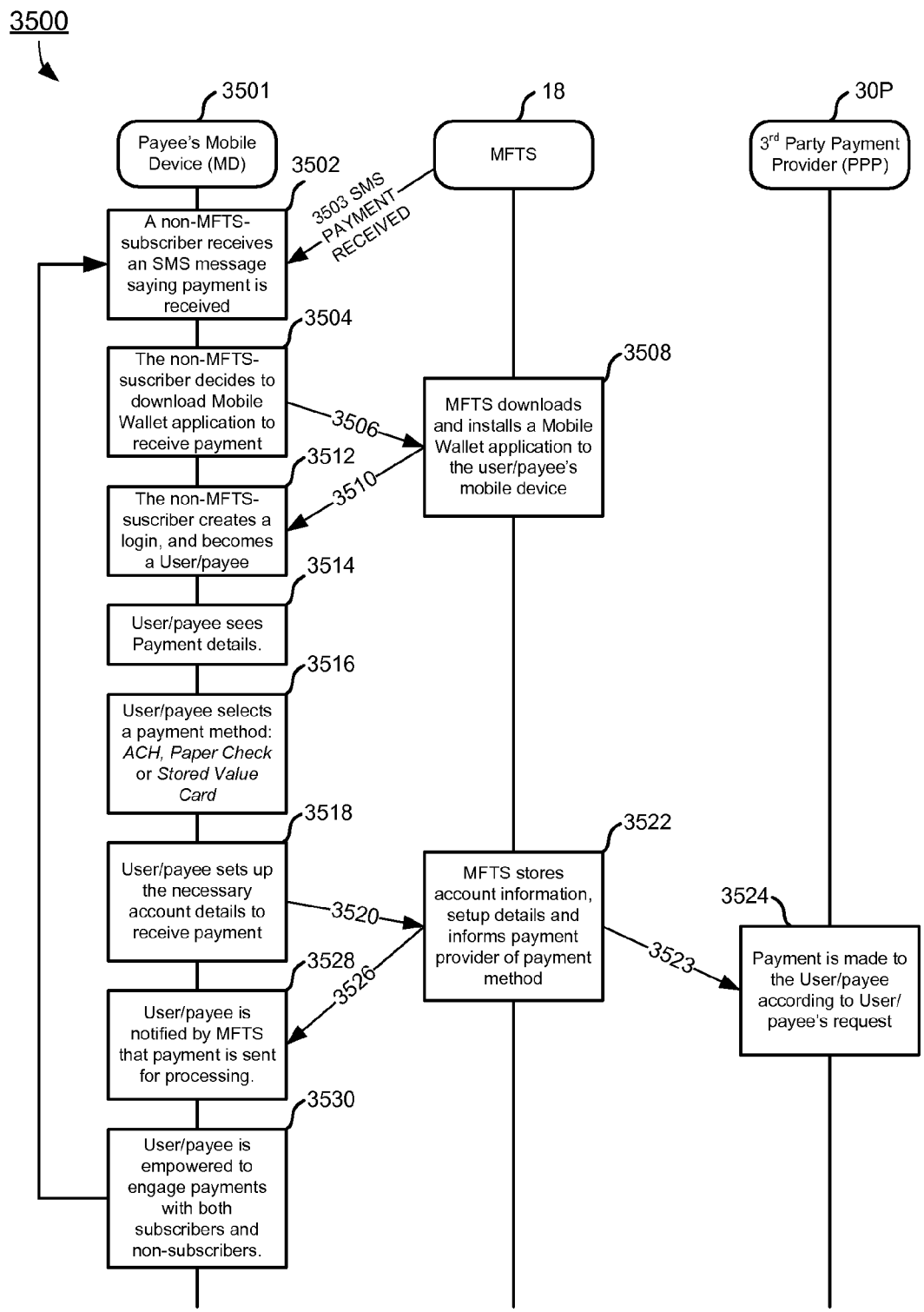

FIG. 35 is a sequence diagram illustrating computer-implemented method steps whereby a payee downloads and installs a mobile device application from the MFTS system as a part of the viral financial commerce system according to an exemplary aspect of the invention.

Figure 36:
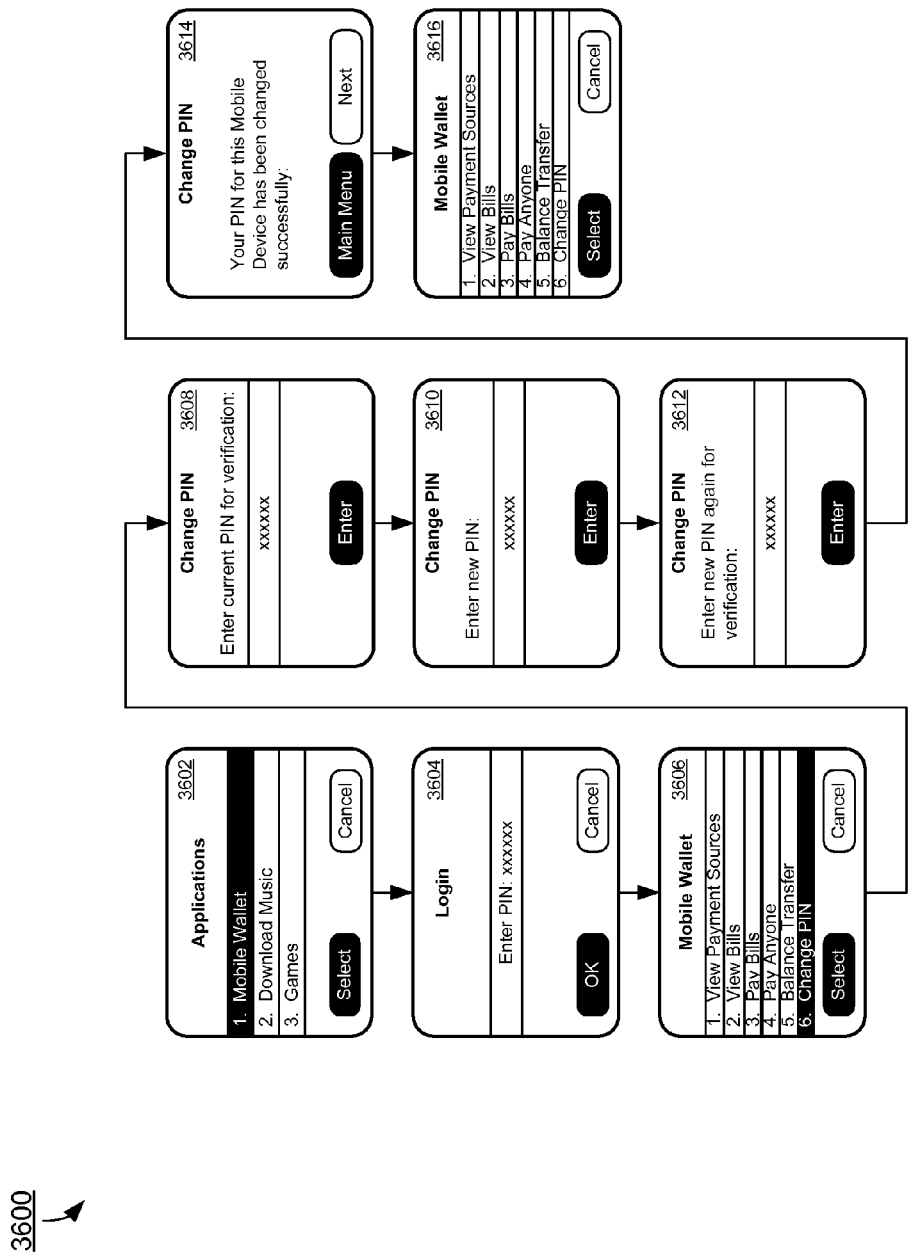

FIG. 36 is a sequence of mobile device screen views from a user's perspective of changing a personal identification number (PIN) according to an exemplary aspect of the invention.

FIG. 37, consisting of FIGS. 37A-37D, comprises screen displays of the web application input/output interface illustrating how a user enrolls for use of a mobile financial transaction system through a web application user site according to a preferred embodiment of the present invention.

FIG. 38, consisting of FIGS. 38A-38D, comprises screen displays of the web application input/output interface illustrating how a user manages financial accounts of a mobile financial transaction system through a web application user site according to a preferred embodiment of the present invention.

Figure 39A:
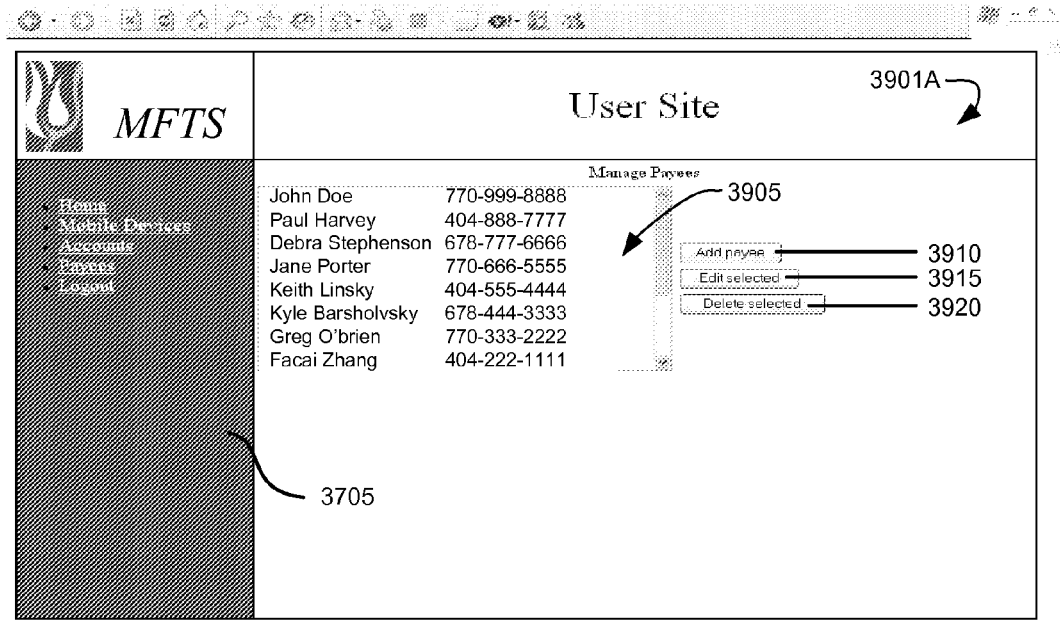
Figure 39B:
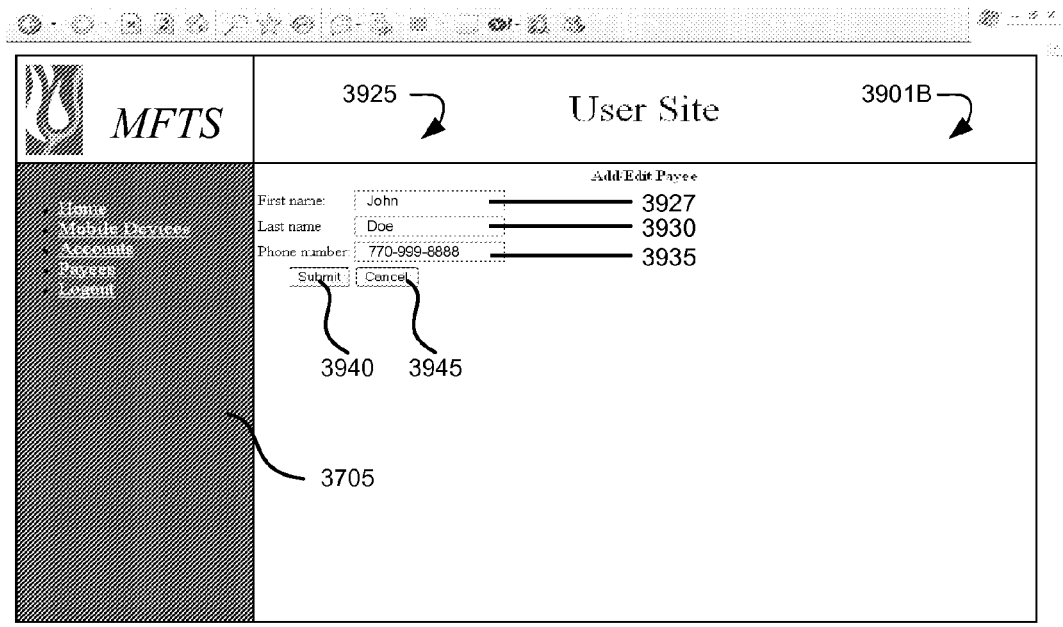

FIG. 39, consisting of FIGS. 39A-39B, comprises screen displays of the web application input/output interface illustrating how a user manages payees of a mobile financial transaction system through a web application user site according to a preferred embodiment of the present invention.

FIG. 40 is a web application account summary display screen in accordance with alternative exemplary aspects of the invention.

Figure 41:
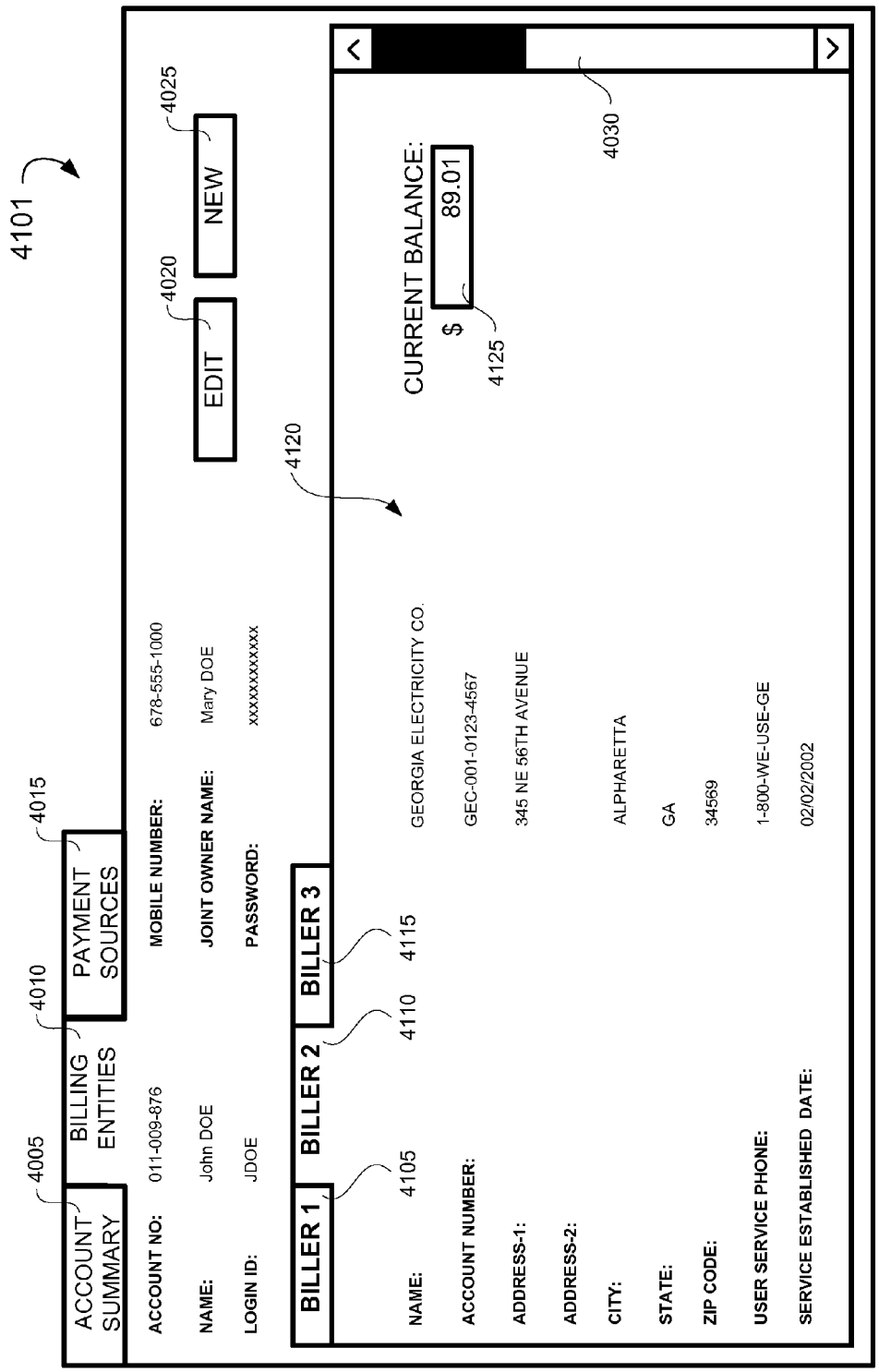

FIG. 41 is a web application billing entity details display screen in accordance with alternative exemplary aspects of the invention.

FIG. 42 is a web application payment source details display screen in accordance with alternative exemplary aspects of the invention.

DETAILED DESCRIPTION OF THE PREFERRED EMBODIMENT

Prior to a detailed description of the invention(s), the following definitions are provided as an aid to understanding the subject matter and terminology of aspects of the present invention(s), are exemplary, and not necessarily limiting of the invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

Definitions/Glossary

ACH: an acronym for "Automated Clearing House," an electronic banking network that processes volumes of credit and debit transactions in accordance with by rules and regulations established by the National Automated Clearing House Association (NACHA) and the U.S. Federal Reserve (Fed).

Application: a computer program that operates on a computer system, e.g., but not limited to, a computer program operated within the MFTS, or a computer program operated within a cellphone or mobile device (a mobile application). Further examples of applications include programs that perform a search in a database, receive and store information in a temporary memory of a mobile device, display selected information on a mobile device, etc., and virtually any other type of program that generates transactions or is responsive to transactions.

Bill information: information provided by a billing entity, or a bill aggregator, relating or corresponding to a bill to be paid; typically consists of all information provided by the billing entity that would appear on a bill to be paid and provided to a user or a billing aggregator. (See "summarized bill information.")

Billing entity: a payee; an individual person, business, or entity that provides a bill that can be paid to a user. The term generally includes any payee, whether or not a bill is sent to prompt payment, although a billing entity typically may be expected to provide a document or message (a bill) indicating an amount due to the billing entity, whereas a "pay anyone" type payee, while generally considered a billing entity for purposes of aspects of the invention, may not necessarily require a bill prior to sending a payment.

Billing (bill) aggregator: an entity that provides a service of collecting information relating to bills to pay or other payment obligations to an entity with whom a user or consumer maintains a financial relationship, and in the context of the invention, provides information about one or more bills to pay to a mobile financial transaction system constructed as described herein, and optionally serves as a financial service provider that handles bill payment for a user.

Bill presentment: the presentation or presentment of one or more of payment obligations of an entity (such as bills to pay or payments to make), e.g. by a bill aggregator, and the electronic communication of one or more such payment obligations, to the entity for review and provision of payment instructions. Bill presentment may be provided on a bill by bill basis from a billing entity, or may be a grouping or aggregator of bills by a billing aggregator that provides a service of collecting bills to pay an entity.

Consumer: an individual person or other entity that accesses or uses a mobile device to perform certain functions of a mobile financial transaction system (MFTS), in accordance with exemplary aspects of the inventions. Generally synonymous with user, below.

DBMS: database management system.

Enterprise: an organization or business entity that utilizes the present invention. An Enterprise can be a business, a government agency, a person, or virtually any other organization that conducts business transactions reflective of its business activity.

Entity: something that has a separate and distinct existence or conceptual reality outside the present invention. One example is a billing entity, which sends out billing information about a payment obligation.

Financial Service Provider (FSP): an entity that provides financial services on behalf of its customers, such as a bank, credit card company, credit union, debit card company, gift card company, payment service company, or other financial institution, and especially serves as a Payment Source (PS). As used herein, an FSP is an entity that provides financial services on behalf of users with mobile devices in accordance with exemplary aspects of the invention. A FSP may also be a payment instruction recipient and effect a payment.

I/O: input/output.

LAN: local-area network, a collection of computers that are connected for electronic communications, typically located geographically close together (that is, in the same building).

Mobile Communication Service Provider (MCSP) (generally synonymous with wireless service provider): an entity that provides for communication services for mobile devices to the MFTS, and perhaps to other network-connected entities. For example, a cellphone service provider typically can serve as a MCSP.

Mobile client (generally synonymous with mobile application): a computer program that runs on a mobile device, to provide services and operations as described in this document, in accordance with exemplary aspects of the invention.

Mobile device: any device used for communication over a wireless communication networks, such as a cellular phone, a walkie-talkie, a personal digital assistant (PDA), a pager, a smart phone, or any combination thereof. Mobile devices operative in the present invention typically run a mobile client software program to effect the functionality described herein. Generally synonymous and used interchangeably with mobile phone, but a mobile device need not necessarily be a telephone-type instrument.

Mobile Financial Transaction System (MFTS): a system constructed as described in this document, that facilitates financial transactions by use of mobile devices.

MFTS payment instruction (MFTSPI): a form of Payment Instruction (PI)(see below) that comprises a communication initiated by the MFTS and transmitted to a payment instruction recipient such as a financial institution to instruct that institution to make a payment to an identified selected entity.

Mobile Payment Instruction (MPI): a form of Payment Instruction (PI)(see below) that is generated and provided from a mobile device in accordance with exemplary aspects of the invention.

Mobile Wallet: a name given to a mobile device application that provides functionality for viewing and selecting bills to be paid or other payments to make, viewing and selecting payment sources for making such payments, viewing balances, etc., in accordance with exemplary aspects of the invention.

PayAnyone: a feature of aspects of the present invention that allow a user to pay a person having a wirelessly connected mobile device, without regard to whether that person is physically present, mainly by way of communicating messages to the payee's wireless device, soliciting instructions, and determining a preferred method for receipt of the payment by the payee.

Payee: a person or an entity receiving payment. A payee may also be a payment instruction recipient.

Payer: a person or an entity making a payment. A payer is also a person or an entity sending out a payment instruction.

Payment Instruction (PI): a collection of information that typically includes one or more selected payments to make, at least one payment source for use in making the payment, and other information. A mobile payment instruction (MPI) is initially generated and provided from a mobile device in accordance with exemplary aspects of the invention. An MFTS payment instruction (MFTSPI) is a communication initiated by the MFTS and transmitted to a payment instruction recipient to instruct that recipient to make a payment to an identified entity.

Payment Instruction Recipient (PIR): an entity to whom a payment instruction is given for purposes of making a payment; a payment instruction recipient may itself make a payment, or may provide an instruction to another entity to make the payment, such as a financial service provider. For example, a payment instruction recipient may be a financial service provider, a bill aggregator, or a billing entity (e.g. a company that has authorization from a payer to draft a payment directly from a payer's bank).

Payment method: the manner in which a payment is provided to a payee by a payment instruction recipient or its agent, i.e. a financial instrument of some sort provided to a payee; a payment can be made by various means including but not limited to paper check, stored value card, ACH funds transfer, crediting a credit card account, wire transfer, money order, credit to a PayPal or other online financial account, another type of financial instrument, etc. In accordance with aspects of the invention, a payment method may be chosen by a payer in certain embodiments, or may be chosen by a payee in other embodiments. A payment source differs from a payment method in that a payment source provides funds for an instrument of a chosen payment method.

Payment to Make (PM): A payment obligation of a mobile device user, for which an instruction to make a payment is made using aspects of the invention. Such obligations include any bills that a person or a family receives on a regular basis such as water bills, electric bills, gas bills, mortgage payments, automobile payment, insurance payments, telephone and/or mobile phone bills, credit card bills etc. These payment obligations also include any payments that a person needs to make occasionally such as gasoline purchase, movie theater tickets, any cash-only purchases as well as payment to any individuals.

Payment Source (PS): funds or money available to a person or family, usually through an account that can be accessed by aspects of the present invention. These sources include credit card accounts, debit card accounts, checking and/or saving accounts, department store credit card accounts, etc.

Payment source information: information relating to a payment source that is stored at the MFTS, and a portion of which (summarized payment source information) is communicated to user's mobile device.

Protocol: A set of formal rules describing how to transmit data, especially across a network. Low level protocols define the electrical and physical standards to be observed, bit- and byte-ordering and the transmission and error detection and correction of the bit stream. High level protocols deal with the data formatting, including the syntax of messages, the terminal to computer dialogue, character sets, sequencing of messages etc.

Stored Value (SV) card: a payment card, typically including a magnetic stripe or other electrical, magnetic, or electronic information carrying medium, that is accepted as a form of payment by certain commercial enterprises; money can be "loaded" onto a SV value card through various different mechanisms and systems and then can be used to pay bills, purchase goods, etc. A stored value (SV) card is not a debit card or a credit card, although a SV card bears certain physical resemblance to such other types of cards.

Summarized bill information: a reduced subset of bill information that is displayed to a user via a user's mobile device.

Summarized payment source information: a reduced subset of information relating to an account and/or a financial institution that is displayed to a user via a user's mobile device.

Transaction: a set of system actions that result in a completed business activity, for example, the following are exemplary transactions: the transfer of a certain amount of money (funds) from one person to another; the debiting of a credit card account of one person (e.g. a payer) and the corresponding crediting of a bank account of another person (e.g. a payee); the payment of a bill; the issuance of an instruction to issue a stored value (SV) card.

SMS: short message service, a text communication service available on many digital mobile devices or phones that permits the sending of short messages (also known as text messages, messages, or more colloquially SMSes, texts or even txts) between mobile devices or phones.

User: an individual or other entity that accesses or uses a mobile device to perform certain functions of a mobile financial transaction system. See also Consumer. As used herein, these terms are generally synonymous. A user may also use a web interface to access the MFTS for configuration and use, as described herein.

User/payee: an MFTS system user and also a payee who receives payments.

User/payer: an MFTS system user and also a payer who makes payments.

User identifier (user ID): a code used to identify a user to the MFTS, or to a financial service provider, or to another component that requires information identifying a user for some purpose in connection with the invention.

UI: User Interface. Typically means a software application with which a User interacts for purposes of entering information, obtaining information, or causing functions of an associated system to execute; includes a mobile device user interface.

WANs: wide-area networks, a collection of computers that are connection for electronic communications, typically where the computers are further apart than a LAN and are connected by telephone lines, fiber optic cables, satellite transmission, or radio waves.

WLAN: wireless local area network, e.g. a technology that is used to connect devices, including mobile devices, laptops, desktop computers, entertainment equipment, etc. through a wireless radio signal. Examples include the known WiFi and WiMAX data communication standards.

System Overview

In a best mode contemplated by the inventors, aspects of the present invention are preferably implemented using mobile devices coupled for electronic (preferably wireless) communications with a mobile financial transaction system (MFTS). Mobile devices include such items as cellphones and PDAs that are connected for data communications via a wireless network to an MFTS. The MFTS is in turn connected to allow remote network access (e.g. Internet access) by users for account setup, configuration, editing, monitoring of transactions, etc. As will be known by those skilled in the art, such mobile devices are essentially small, hand-held computing devices that include features such as microphones and speakers (to enable telephone usage), a wireless signal circuit such as a digital radio, a microprocessor as a central processing unit (CPU), a color or other display, a keyboard or keypad, a stylus, a scroll wheel, control buttons, Bluetooth wireless signaling, infrared data signaling, etc. The MFTS is similarly a general purpose computing device containing one or more processors and/or central processing units (CPU), data storage in the form of disk drives and random access memory (RAM), communication interfaces such as LAN connections, WAN connections, Internet connections, Ethernet connections, etc.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to a mobile device through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multiprocessor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN) and a wide area network (WAN) that are presented here by way of example and not limitation. Such networking environments are commonplace in office-wide or enterprise-wide computer networks, intranets and the Internet.

When used in a LAN networking environment, the main computer system implementing aspects of the invention is connected to the local network through a network interface or adapter. When used in a WAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

Consolidation of Payment Obligations

Figure 1:
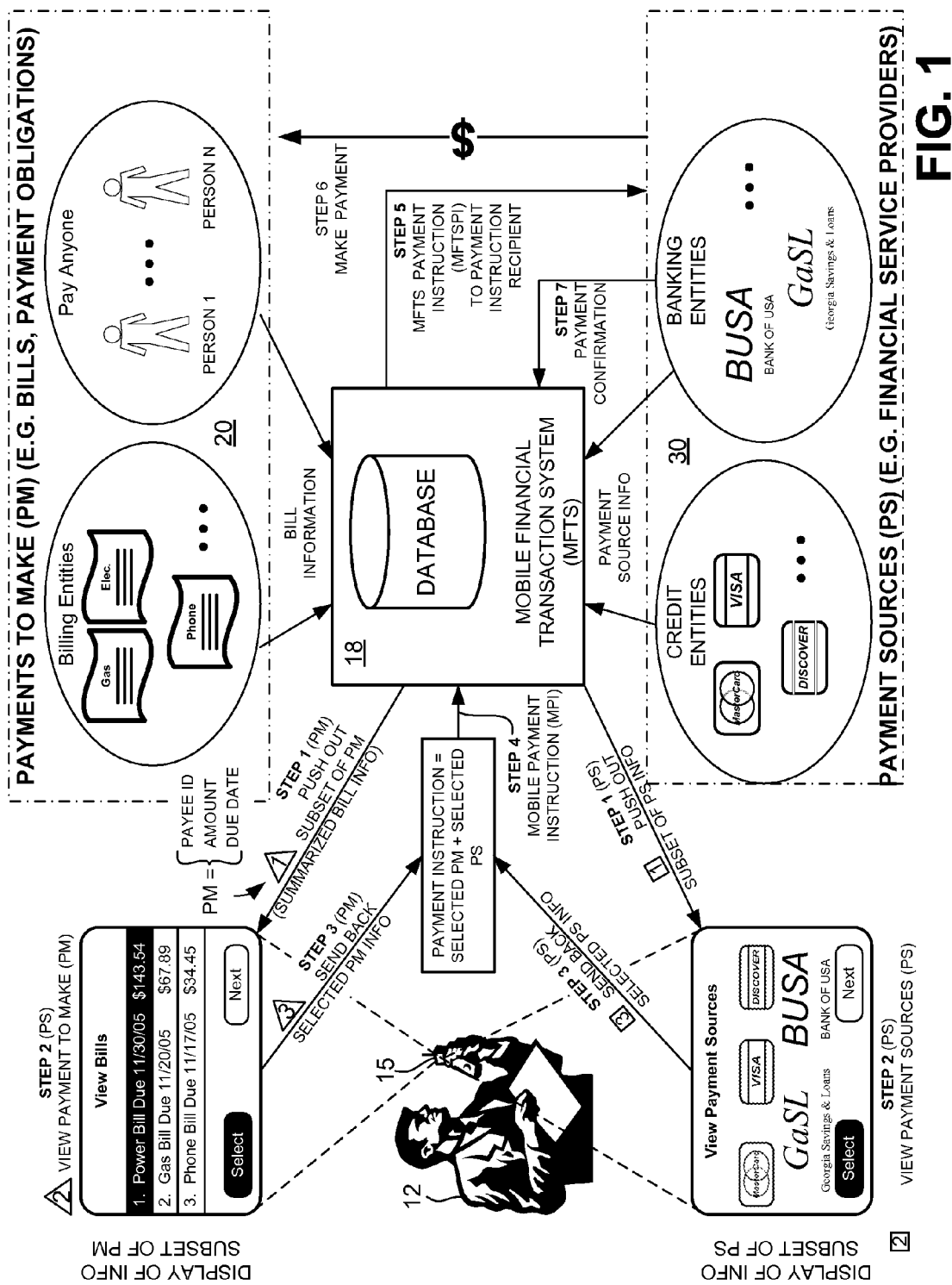
FIG. 1 is a high level overview of exemplary aspects for a mobile financial transaction system (MFTS) that embodies aspects of the present invention.

With the foregoing implementation architecture in mind, please refer now to FIG. 1, which provides an overview of a mobile financial transaction system (MFTS) 18 and certain features according to an exemplary aspect of the invention. A user 12 of a mobile device 15 (such as a cellphone or wireless PDA) accesses the MFTS 18 to select payments to make ("PM") and to select payment sources ("PS") for making such payments, in the manner that will be described. The major inputs to the MFTS 18 comprise payments to make 20 (hereinafter "PM") and payment sources 30 (hereinafter "PS").

Payment to Make (PM):

A payment to make (PM) 20 comprises any and all payment obligations and/or instructions, whereby money or credits are transferred from one person or entity to another. These obligations include bills that a person or a family receives on a regular basis such as water bills, electric bills, gas bills, mortgage payments, automobile payment, insurance payments, telephone and/or mobile phone bills, credit card bills, etc. These payment obligations may also include any payments that a person or a family initiates such as gasoline purchases, movie theater tickets, any cash-only purchases, other retail payments at point-of-sale, as well as payment to an individual. Accordingly, PMs may occur either by presentment of a bill by a billing entity or in response to initiation by a user.

Certain PMs 20 that constitute household bills may be communicated to the MFTS through a bill presentment channel of the MFTS. In accordance with an exemplary aspect of the invention, regular household bills are communicated to the MFTS at a predetermined interval or on request of the user by communication with an electronic bill aggregator, such as CheckFree Corporation, that provides a service of "bill presentment" electronically.

PMs 20 that constitute "occasional" purchases (e.g. at retail establishments) or payments to individuals are typically initiated by the user, as opposed to provided in the first instance to the MFTS by an aggregator or by a specific billing entity. Such user-initiated transactions are typically sent to the MFTS via wireless communications devices through the services of a mobile communication network (not shown in this figure). Such PMs may be characterized as "PayAnyone" transactions as they contemplate the making of a payment to any identified entity including an individual person as well as a commercial entity, at the initiation of the user.

Generally speaking, information associated with a PM 20 typically includes the name(s) of the account owner(s) (i.e. the person who is responsible for making the payment, if a typical household bill), a mobile device number associated with the account and/or account holder, account numbers, account balances, due date, minimum payments, electronic payment account numbers, addresses of the billing entities, etc. This information is generally the same whether the PM is the result of bill presentment or from user initiation.

Payment Sources (PS):

The payment sources (PS) 30 comprise any and all funds available to a person or a family for use in making payments. These fund sources include credit card accounts, debit card accounts, bank checking and/or saving accounts, department store credit card accounts, etc. These funds are usually divided into two major categories: banking entities and credit entities. Entities that provide and/or maintain such funds are typically financial service providers (FSPs), which are often financial institutions (FI). Banking entities usually include checking and/or savings accounts where the money available to a person or a family is kept. The credit entities usually include all credit facilities available to a person or a family.

Generally speaking, information associated with a payment source (PS) 30 includes the name(s) of the account owner(s) (i.e. the person who owns or controls the funds), account numbers, account balances, credit available and credit limits for a credit card or other credit facilities, available cash advance amount, names of other authorized users or co-owners of the account, special personal identification numbers (PIN), restrictions on use of the account, etc.

Still referring to FIG. 1, the major output from the MFTS system 18 comprises a subset of information related to one or more payments to make (PM), a subset of information related to one or more payment sources (PS), both of which are provided from the MFTS 18 to an individual mobile device 15 and displayed and/or presented to a user 12 for reaction and response. In response to presentation of a PM (or initiation of a PM), the mobile device 15 provides a payment instruction to a payment instruction recipient such as a financial service provider or financial institution to make a payment, in accordance with the information in the payment instruction.

The overall methodology for making a payment in accordance with exemplary aspects of the invention involves seven primary steps. Interactions between the MFTS 18 and mobile devices 15 are established through communication services provided by a mobile communication service provider (MCSP, not shown in FIG. 1) and involve the first four steps of the methodology. The seven primary steps are as follows:

1. A first step is to push out PM information (step 1 shown in a triangle) and a PS information (step 1 shown in a square) from the MFTS 18 to a mobile device 15, as shown at Step 1.
2. A second step is for a user 12 of a mobile device 15 to view available payments to make (step 2 shown in a triangle) and payment sources (step 2 shown in a square) available for use in making selected payments, as shown at Step 2.
3. A third step is for a user to activate a pay bill function, as one example, using the mobile device application on a mobile device 15, which results in construction of a mobile payment instruction (MPI) based on the information input by the user 12, as shown at Step 3.
4. A fourth step is the communication of the mobile payment instruction (MPI) from the mobile device 15 to the MFTS for handling, as shown at Step 4.
5. A fifth step in the overall methodology, but which does not involve the mobile device or communications with the MCSP, is the construction of an MFTS payment instruction utilizing information from the mobile payment instruction, and communication of that MFTS payment instruction to a payment instruction recipient, as shown at Step 5.
6. A sixth step in the overall methodology of the invention is the transfer of funds to selected payee by a payment instruction recipient, typically through a financial service provider, using a selected payment source, as shown at Step 6.
7. A seventh step in the overall methodology of the invention is for the financial service provider to send a payment confirmation message back to the MFTS upon successful processing of the MFTS payment instruction.

More details regarding these steps will now be provided.

With regard to Step 1, the information pushed out to the mobile device includes a subset of payment to make information as shown at Step 1 (PM) and/or a subset of payment source information as shown at Step 1 (PS). The information pushed out does not include all available information received by the MFTS from the payment to make and/or payment sources. Rather, a reduced subset of the payment to make information and/or the payment source information is pushed out to the mobile device to facilitate a mobile payment or payment source view. In accordance with exemplary aspects of the invention, the information is reduced so as to provide quicker and more concise information to a user that facilitates a decision about making payment and what fund source to utilize. For bills, this reduced information typically only includes the name(s) of the billing entities, a balance due or payment due, and a due date for the payment to make. For payment sources, the consumer's account name(s), current balance, funds available etc will be shown.

With regard to Step 2, a user 12 of a mobile device 15 views payments to make as shown at Step 2 (PM) and views payment sources for use in making a payment as shown at Step 2 (PS). In accordance with an exemplary aspect of the invention, the mobile device user 12 is notified via a text message (SMS) when a new payment to make is received by the MFTS 18 and/or an update is received by the MFTS from a financial institution for an account associated with a mobile device through other communication means. According to another exemplary aspect, the mobile device 15 retrieves information from the MFTS relating to new payments to make or updated financial account information, upon activation of selected functions on the mobile device such as "view bills," "pay bills," "pay anyone," as will be described in detail in connection with various functional software modules, herein.

In accordance with another exemplary aspect of the invention, when a mobile device user 12 is ready to review the payments to make, he/she can launch a "mobile wallet" application that runs on the mobile device to review the PM and PS. A PM is viewed through a "View Bills" (also called "View Payment to Make") function and a PS is viewed through a "View Payment Sources" function. An exemplary display screen of information displayed through these functions is shown in FIG. 1. With the "View Bills" function, the mobile device user can review bills received to date and decide which bill(s) to pay at what time. Through the "View Payment Sources" function, a mobile device user can view and decide what fund source(s) to use for paying a bill of his/her choice. The selection made in this step is not transmitted to the MFTS until a "Pay Bills" function is activated. It should be understood that viewing payments to make and payment sources does not necessarily require that the user select a bill for payment, although that is one of the primary intended functions of the invention.

With regard to Step 3, the user invokes a "Pay Bills" function in the mobile device application on the mobile device 15 to select a payment to make and a corresponding payment source, which causes the mobile application to construct a mobile payment instruction (MPI). This step includes selecting a payment to make, selecting a payment source, and constructing the mobile payment instruction. The mobile payment instruction typically includes billing entity information, an amount to pay, the date and/or time to pay, and a selected payment source for this payment.

With regard to Step 4, the mobile application provides the mobile payment instruction (MPI) via the wireless connection from the mobile device to the MFTS for handling.

With regard to Step 5, the MFTS processes the MPI and constructs an MFTS payment instruction to a payment instruction recipient, which in some cases is a selected financial service provider or financial institution associated with the selected payment source. The complete MFTS payment instruction typically includes information contained in the mobile payment instruction, together with selected other information stored in the database of the MFTS associated with the mobile device users such as the mobile device user's account number, the appropriate account to use for payment, the amount of the payments, the date and/or time to pay, account credentials, etc.

With regard to Step 6, the payment instruction recipient effects the payment by various means, for example it can make the payment itself, or provide instructions to a selected financial institution to use the selected payment source (PS) identified in the MFTS payment instruction to transfer funds to an account or other payment vehicle of the identified entity associated with the payment to make (PM).

With regard to Step 7, the financial service provider (FSP) communicates a confirmation message back to the MFTS upon successful processing of the MFTS payment instruction.

It should be particularly appreciated that because the information provided to the mobile device is a selected and reduced subset of the information that is typically associated with a financial transaction for making an electronic payment using a selected payment source, the mobile device user only sees the minimally required information he or she needs to decide to make a particular payment, and what source to use. The more detailed and comprehensive information required to consummate a transaction is stored in the MFTS, transparently to the user, but retrieved and utilized to make the payment using the selected payment source. Advantageously, the user is presented with the required but limited information needed to make payments quickly, concisely, and efficiently, using his or her mobile device, at a place and time of his or her convenience. Yet, the full details of the transaction are preferably captured and stored by the MFTS, and may be accessed and viewed by the users at their convenience, for example through a web interface, as will be described in greater detail later.

More details on the implementation of these general steps will be provided below.

Referring now to FIG. 2, as system 200 in accordance with aspects of the invention includes the MFTS 18, a mobile communication service provider (MCSP) 110, a communications network 120 such as the Internet or private network, a bill presentment system 190, a web interface for users 140, mobiles device(s) 15, connections or interfaces to billing/payment entities 180 and payment sources 30, and other components for certain purposes.

The MFTS 18 includes a computer system comprising a database 158, telecommunications interfaces 152, and software. The MFTS 18 supports three major interfaces or communication methods: a financial service provider (FSP) communication interface 156, a wireless or mobile device (mobile client) interface 152, and a world wide web (WWW) or Internet user interface (UI). As known to those skilled in the art, an "interface" is a means or method for interaction between machines, devices, computer programs or other complex tool, and a user interface (UI) is a means or method by which a user interacts with a particular machine, device, computer program or other complex tool. A user interface provides a means of input (allowing a user to send information to a system such as the MFTS) and a means of output (allowing the MFTS system to display information to the user). These inputs and outputs are transported via the Internet and viewed by the users using a web browser program such as Netscape Navigator, Internet Explorer, Firefox, or any other web browsers. According to aspects of the invention, users provide personal information to register for service, input personal and financial information to the MFTS, and verify such information through a display on the user's computer system.

The financial service provider (FSP) communication interface 156 is an interface to financial entities 30 that provide payment sources (PS) and a bill presentment interface 155 to billing/payment entities 180 for payments to make (PM). The computer system of the MFTS connects to the computer systems of financial entities through various types of computer networks, such as a frame secured dedicated path 160, local-area networks (LANs), wide-area networks (WANs), etc. as well as the known Internet 120.

The wireless or mobile device (mobile client) interface 152 provides connections to a user's mobile device 15. The computer system of the MFTS has a plurality of interfaces to communicate to users' mobile devices through various wireless telecommunication service providers providing voice/data service with CDMA, GSM, GPRS, other 2G wireless data communication services, and newly emerging 3G wireless data services. As known to those skilled in the art, in addition to the standard voice function of a mobile telephone, many mobile devices support many additional services such as SMS for text messaging, packet switching for access to the Internet and MMS for sending and receiving photos, sound, music, and/or video. The system 18 thus preferably includes an SMS generator 151 for generating SMS message. The mobile device communication interfaces 150 allow the users to receive financial and other information wherever they are (provided that they are within the coverage area of their MCSP), interact with the MFTS 18, and complete various financial transactions.

The world wide web (WWW) or Internet user interface (UI) comprises one or more web applications 154 for a user to access the MFTS for registration for service, configuration and account setup, maintenance of accounts, viewing of payments to make and payment sources and status, etc. Preferably, user account financial information could be submitted to the MFTS from enrollment for service, for example through a business arrangement with a selected financial institution that has a relationship with an operator of the MFTS. Alternatively, the user can also user a web user interface to enter user account financial information.

Still referring to FIG. 2, in certain aspects of the invention the MFTS 18 communicates with a user 12 via his or her mobile device(s) 15 and/or his or her associated computer 140, a mobile communication service provider 110, a data communication network such as the Internet 120, a secured dedicated network path 160, financial service providers (FSPs) 30, that provide payment sources 30, billing entities 180, and/or a bill presentment system 190.

The mobile devices 15 communicate with the MFTS 18 via a wireless connection (illustrated as antenna 112), using a wireless communication service provided by a mobile communication service provider (MCSP) 110. The mobile devices 15 comprise any devices that are connected for data communications with a mobile communication network via the MCSP 110. Such devices 15 may include a pager 15a, a personal digital assistant (PDA) 15b, cellular or mobile phone 15c, or any other electronic device that includes functionality of a PDA or mobile phone, with the capability of receiving information via a wireless link, receive user input, and transmit data (e.g. a payment instruction) to the MFTS.

The present invention will be described in terms generally applicable to various types of mobile communication services provided by an MCSP 110. Those skilled in the art will understand and appreciate that the invention is not limited to any particular type of mobile, or wireless, communication standard, but may be implemented using any of a number of different but functionally equivalent wireless data communication standards. At the present time in the United States, digital cell phone networks are primarily based on two underlying standards: GSM (Global System for Mobile communications) and CDMA (Code Division Multiple Access). Some MCSPs use GSM, while others use CDMA. Yet others use a standard called PCS, which is based on CDMA but uses different frequencies. Furthermore, so called "broadband" wireless data communication standards know as WiFi and WiMAX, which are currently used for WLAN implementations, are also usable for implementing embodiments of the invention, but such standards are not at the present time widely deployed in handheld mobile devices.

These and other, perhaps not yet created, wireless data communication standards may be employed in constructing embodiments of the inventions described herein, without undue experimentation as those skilled in the art will understand how to employ such technologies in making embodiments of the inventions.

It will also be understood that presently-contemplated upgrades to both GSM and CDMA mobile wireless standards, as well as upgrades to other data communication standards, will be useful in constructing embodiments of the inventions. For example, to better handle data traffic (in addition to voice traffic), many GSM networks now operate using a standard called GPRS (General Packet Radio Service) that can carry data at up to 56 Kbps—about the same speed as a dial-up connection—together with the GSM signals that carry the voice traffic. More recently, the networks that use GSM have added an enhancement called EDGE (Enhanced Data rates for GSM Evolution) that increases the data transmission speed to 144 Kbps. CDMA networks have also upped their data speeds using a standard known as 1×RTT (Radio Transmission Technology) measuring throughput at 144 Kbps. A further recent upgrade for CDMA networks is called 1×EV-DO (Evolution-Data Only) which can carry data at a theoretical maximum of several megabits per second—as fast as present day DSL or cable Internet connections. Further still, some MCSPs now provide a service called UMTS (Universal Mobile Telecommunications System), an upgrade to GSM networks that speeds connections to a maximum of 384 Kbps and allows for simultaneous voice and data, a desirable feature for users to make and receive voice calls while simultaneously using data services such as wireless laptop use.

It is expected that as demand for wireless data communications increases, MCSPs will introduce even faster standards and enhancements to their networks. For example the contemplated Rev A EV-DO will speed up EV-DO networks to 1.8 Mbps upstream and 3.1 Mbps downstream, and HSDPA (High-Speed Down Packet Access), an upgrade to UMTS that promises speeds of 1.8 Mbps and also allows for simultaneous voice and data.

Further still, it should be understood that the technologies for short text messaging (e.g. SMS) are typically implemented using the above-described data communication technologies to carry text messages. Such wireless data communication technologies are also used to support functions such as wireless Internet browsing on mobile devices; downloading of music, ringtones, videos, photographs; and protocol support for wireless applications (e.g. a mobile application constructed as described in this document).

Accordingly, those skilled in the art will understand that numerous equivalents for the elements of the invention that provides the wireless connection between the mobile devices 15 and the MFTS 18, for supporting the mobile application and facilitating transactions the manner described herein, are contemplated for use in constructing embodiments of the invention.

The data network 120, which includes the well-known Internet, offers accessibility to the MFTS 18 through wired or wireless connections. Users 12 can access the Internet 120 through their home/office connection as well as through their mobile devices 15. A user's computer, shown at 140, is connected to the Internet 120 through their home/office connection, or wirelessly connected through a mobile communication service provider. According to aspects of the invention, users have the flexibility to access billing information and payment information either with a computer online with web view access or via a mobile device 15 with mobile views.

It will be appreciated that, in general, a mobile view will provide less information to the user than a web view, because mobile devices typically have smaller display screens (to facilitate mobile use) and users are often desirous of using certain basic functionality quickly and efficiently in a mobile environment, provided that they have more detailed information available via other means, at a later time. However, the present invention specifically contemplates modes of operation where further transaction details may be obtained through a function of the mobile device, as well as through web views using a computer 140 connection for Internet usage.

The MFTS 18 includes several software components, described in greater detail later in this document, that execute on a computer server associated with the MFTS. Such components include an SMS generator 151, MFTS mobile device communication interfaces 150, one or more web applications 154, a plurality of partner financial service provider (FSP) interfaces 156, and a user database 158.

The mobile device communication interfaces 152 are preferably an HTTP Remote Procedure Call (RPC) interface that provides mobile clients with access to financial services available on the MFTS. The mobile client interface is preferably designed to facilitate communications between the MFTS 18 and the mobile users, including all data transmissions and receptions, as well as SMS transmissions and receptions through the SMS generator 151. The SMS generator is a software component that receives a message for communication to a mobile device and converts the message into SMS format, which is usually purely textual information, and transmits the message to a MCSP in the SMS format as specified by the MCSP. Details of the required SMS format for a particular MCSP may be obtained by inquiry of the applicable MCSP.

The web applications 154 reside on the server of the MFTS, and comprises one or more of the following major components: a User Site 153, and an Administration (Admin) Site 157.

A User Site 153 is a web application (HTML) whose purpose is to allow users to enroll or register for services provided by the MFTS 18, manage their mobile clients, and perform other user-related functions such as account maintenance, adding a new payee, verifying account information for payment sources or payments to make, etc. A User Site 153 is used for a user to enroll to receive services by providing appropriate information such as name, address, mobile number, etc., to obtain a username and a password for security purposes, and to provide the MFTS 18 with detailed information about a user's billing entities and their payment sources such as account number, access/authentication methods etc.

An Administration Site 157 is an application (typically web or HTML) used by the MFTS Production Operation personnel to administer the system. It is typically used by information technology (IT) administrators of the MFTS 18, troubleshooting, answer inquiries, account maintenance, view transaction history, general system monitoring, etc.

The MFTS 18 also comprises multiple financial service provider communication interfaces 156 to partner Financial Service Providers (FSPs) 30, which are entities that provide functions such as payment source detail, bill aggregation or bill payment connectivity, or are entities to whom payment instructions are sent on behalf of a user. The financial service provider communication interfaces 156 facilitate electronic data communication information transfer between the MFTS and individual financial service providers such as banking entities, credit entities, etc. The technical requirements for these interfaces vary in their implementation and may need to be customized to accommodate each individual financial service institution. Such interfaces are typically implemented as real time web services interfaces or batch mode file transfer protocols, depending on the capabilities and requirements of the participating partner financial service providers. Details of the data communication requirements of specific FSPs may be obtained from the FSP directly.

A special secured dedicated network path 160 such as a frame relay, a private network, an internet virtual private network (VPN), or a web service is preferably used for data communications between the MFTS 18 and various FSPs to ensure the security of the financial information transmission. Details about the particular forms of security, protocols, requirements, etc. will be established between the MFTS 18 and each financial institution that participates in the system and methods described herein.

Still referring to FIG. 2, a user database 158 associated with the MFTS 18 stores information related to all users, financial service providers that serve users, billing entities that serve the users, payees and how to make payments to them, and other related information. Details about the information stored in the user database 158 are provided in connection with FIG. 6 and the associated discussion.

As previously described, FSPs that provide payment sources (PS) 30 include banking entities such as banks, credit unions, savings and loans, brokerage firms that provide savings/checking/money market accounts, and other financial institutions; credit entities such as credit card issuing companies, banks and/or department stores, gasoline companies, etc.; and any other financial institutions with whom the users of the MFTS do business. Payment sources 30 provide payments 194 to selected billing entities 180, in the manner described herein.

Billing entities 180 include service companies that serve the users such as gas 185, water, electricity 181, phone/cell phone 183, satellite/cable/Internet providers, credit card companies, and any other entities that send a bill to a user for products purchased or services rendered. As will be understood, many billing entities 180 send bills 192 on a regular basis (often monthly). Bills can also come from billing entities that provide services to users such as insurance companies, homeowner associations, trash pickup, pest control, auto repair, lawn & garden, landscaping, cleaning, etc. Some entities do not send bills on a monthly basis, but on a semi-annual, quarterly, or annual basis, or on demand when a service is rendered. Occasionally, people have the need to pay others individually such as co-workers, friends, family members, etc. All of these bill or non-bill payment obligations are referred as a payment to make (PM).

According to one exemplary aspect of the invention, a bill presentment system 190 can be utilized to receive bills from billing entities 180 and aggregate them into a package for presentment to a user, electronically or otherwise. A bill presentment system 190 can be either a service or component of the MFTS 18 or an independent service entity. For example, CheckFree Corporation, Norcross, Ga., provides a billing aggregation and bill presentment service. A bill presentment system retrieves bills from one or more individual billing entities and presents the bills to the MFTS system; information relating to the collected/retrieved bills is stored in the user database 158 of the MFTS 18.

It will be understood and appreciated that a billing aggregator and the MFTS 18 may be constructed as a separate systems, operated by the same or by different entities, or may be constructed as an integrated system wherein the aggregator functions and the MFTS functions are carried as complementary and intercommunicating computer processes. Thus, although FIG. 2 shows the MFTS 18 and the aggregator/bill presentment system 190 as separate entities, those skilled in the art will understand that such functionality can be provided in an integrated system.

According to an exemplary aspect of the invention, the mobile devices 15 may be configured to operate in conjunction with a billing entity such as a retail establishment by receipt of a payment to make (PM) from a radio frequency identification (RFID) device 187. Various forms of RFID-based payment terminals are now becoming available in the realm of commerce. As will be known to those skilled in the art, RFID-based payment terminals are operative to detect the presence of an RFID electronic circuit, perhaps contained in a mobile device, in proximity to an RFID-based payment terminal, and automatically transmit a wireless (WiFi, Bluetooth, infrared, etc.) signal constituting payment information in return to the associated device. It is contemplated that a mobile device 15 can be configured to receive a payment obligation (a PM) from a merchant at point-of-sale (POS) via a wireless communication in a direct manner, and thereby provide the user the capability and opportunity to pay a billing entity for the goods or services provided, as described herein.

Also shown in FIG. 2 is a special financial service provider (FSP) 175 that provides a special holding account on behalf of the MFTS 18, for purposes of holding funds in connection with transactions on a temporary or interim basis. The holding account FSP 175 provides an FDIC-insured account for holding funds in connection with escrow-type transactions wherein release of payment to a billing entity 180 is conditioned on some event such as delivery of particular goods or services, or specific authorization from a user, or other purposes. The holding account FSP 175 may be utilized in the following exemplary manner: upon selection of a payment source (PS) by a user for making a payment, the selected payment source can be instructed, with a payment instruction, to transmit the funds to the holding account 175, where such funds will be held on behalf of the user until a release event (e.g. delivery of goods, execution of an agreement, or other predetermined event), at which time the holding account 175 will transmit the funds to the indicated billing or payment entity.

General Operation of MFTS

Prior to discussing the software architecture of the preferred embodiments of the invention, the overall operation of the disclosed MFTS 18 will be briefly described. As will be understood, much of the functionality of the embodiments of the invention are implemented in computer software and involves user interaction with his or her mobile device, creation of data records, communications between mobile devices and the MFTS 18, and communications between the MFTS 18 and various other parties and their systems such as financial institutions, billing entities, person to whom payments are made, etc. Still referring in this regard to FIG. 2, the overall operation of the MFTS 18 according to certain aspects of the invention includes the following exemplary steps:

1. A customer or user 12 first registers with the MFTS 18 and creates an account with the MFTS service. This registration is completed via the user web site interface 154 either through a computer 140 with a internet connection, or through a mobile device 15 that has Internet access capabilities. The account owner (user) chooses or is given a username and a password for security and authentication purposes. A user profile is created for the account and necessary information such as a mobile device identification number or phone number associated with the account is entered and saved to the user database 158 in a user record. All billing entities for payments to make (PM) that the user wishes the MFTS to serve are entered by the user into the user database, including account number, name and address of the account owner, billing cycles, and any other related information. Likewise, one or more payment sources (PM) are also entered into the user database, including the bank routing number(s) and account number(s), name(s) and address(es) of the account owner(s), access codes such as PIN, access methods, credit card number(s), expiration date(s) of the credit card(s), etc. Alternatively, the FI information can be pulled into the MFTS through the FSP communication interface 156.

2. According to one exemplary aspect of the invention, the user 12 downloads to his/her mobile device 15 a mobile client (also called a mobile application or a "Mobile Wallet") from the MFTS main website, as shown at 215. The downloaded mobile application may be (a) downloaded to the user's computer 140 for later synchronization and/or loading into with the mobile device for situations where a mobile device's software must be loaded from a PC, or (b) alternatively directly downloaded via the wireless network into the mobile device for situations where a mobile device is capable of direct application download. The mobile client or application is configured and certified for the brand and model of mobile device 15 possessed by the user 12. For example, the mobile application in the disclosed embodiment is an application that resides on the user's mobile device. It will be understood that, according to a preferred exemplary aspect of the invention, because the mobile client is an application that runs independently on the mobile device and does not require an active communication connection to the MFTS 18, it can operate in an offline mode when or where the mobile device is out of its coverage area by utilizing local storage on the mobile device. The ability to utilize local storage on the devices allows data caching, which speeds up end user interactions and the ability to queue user-initiated transactions until connectivity is restored. Additionally, offline support allows for eliminating intermittent signal activity that could impact the user experience seen in WAP-based solutions in the marketplace today.

3. At predetermined intervals, the MFTS sends requests to a billing aggregator (e.g. bill presentment system 190) or to the billing entities 180 to retrieve the bills 192 of MFTS users. Alternatively, the MFTS may receive bills from billing entities at certain billing cycles, from a billing aggregator or directly from a billing entity.

4. The MFTS receives the bills and notifies the user of the due bill via SMS (according to one aspect). The user then launches the mobile client software on the mobile device 15, which communicates with the mobile device communication interface 152 to see the bill that is payable. The SMS message preferably only contains brief and abbreviated information as simple as the name of the billing entity and amount due; additional information may be obtained by the mobile device (see next step).

5. The user opens the Mobile Wallet application on his/her mobile device(s) to view received bill(s) via a request to all applicable billing entities.

6. If the user decides to pay a bill, the user can select one of the available payment sources (PS) and select one of possible plurality of bills (PM) to make a payment. A payment instruction is formed by the user by selecting a PM and selecting the PS for the PM.

7. The user is preferably presented with a confirmation screen on the mobile device that presents the basic information about the bill to pay, the timing on the payment, the balances available, etc., before committing the payment to the system. If the user confirms the payment, the mobile device 15 sends an abbreviated mobile payment instruction to the MFTS 18.

8. In response to receipt of the mobile payment instruction from a mobile device, the MFTS 18 appends other related information to form a complete payment instruction (MFTS payment instruction) that instructs a selected financial service provider to complete the payment transaction by transferring funds from a selected PS to the payee, using a payment method that has either been preselected or selected as a part of the PM and PS selection process.

Further details about specific communications between the mobile device 15, the MFTS 18, FSPs with payment sources 30, billing entities 180, bill presentment system 190, etc. are provided in various flow charts and diagrams, elsewhere in this document.

Software Architecture

The software architecture of the mobile financial transaction system (MFTS) is shown in FIG. 3. According to one embodiment of the present invention, the software of the MFTS comprises two major components: a mobile device application 400 ("Mobile Wallet") and MFTS software 500. The mobile device application 400 resides on a mobile device and is accessed by the owner of the mobile device. The MFTS software application 500 resides on a server computer connected to the Internet and it is accessed by users through their Mobile Wallet application and web browsers.

Referring now to FIG. 3A, a software architecture diagram of a mobile device application 400 ("Mobile Wallet") is shown according one embodiment of the present invention. The mobile device application 400 comprises: a mobile device main program 335 for controlling the operation of the mobile device application 400; a mobile device input/output interface 331 for displaying messages, receiving user selections or inputs, and facilitating the user's operation; a security manager 333 for providing security measures for wireless communication; a mobile device storage interface 337 for storing and retrieving data to/from a local storage device 341 such as a non-volatile memory device within the mobile device; and a mobile device communication interface 339 for communicating with the mobile device radio hardware 343 on the mobile device, which in turn communicates with the mobile communication service providers (MCSPs) 110 according to their specific protocols.

FIG. 3A also illustrates a number of routines or functions 301, 303, 305, 307, 309, 311, 313, 315, and 321 that are provided by the mobile device software or mobile wallet application 400. Such routines or functions provide user functionality on the mobile device, as shown. A View Payment Sources routine 301 provides a display of payment sources on the user's mobile device; details of this routine are provided in FIGS. 13 and 14. A View Bills routine 302 provides a display of bills or payments to make on the user's mobile device; details of this routine are provided in FIGS. 15 and 16. A Pay Bills routine 305 provides for selecting of a bill to pay or a payment to make on the user's mobile device; details of this routine are provided in FIGS. 17 and 18. A Pay Anyone by Name routine 307 provides for making a payment to a person by name on the user's mobile device; details of this routine are provided in FIGS. 19-22 and 26-28. A Pay Anyone by mobile number routine 309 provides for making a payment to a person by mobile number on the user's mobile device; details of this routine are provided in FIGS. 23-25 and 29-31. A Balance Transfer routine 311 provides for moving funds between a user's accounts via the user's mobile device; details of this routine are provided in FIGS. 32 and 33. A Download Application routine 313 provides for downloading a Mobile Wallet application to a user/payee's mobile device from the MFTS, in connection with receiving a payment to allow use of aspects of the invention by payees in connection with receiving a payment; details of this routine are provided in FIGS. 34 and 35. A Change PIN routine 315 allows a user to change his or her personal identification number (PIN) via the mobile device; details of this routine are provided in FIG. 36. A Receive SMS (text message) routine 321 provides for sending a text message (SMS) to a payee, to advise a payee that a payment has been received; details of this routine are provided in FIGS. 15 and 20.

Referring now to FIG. 3B, a software architecture diagram of the MFTS software 500 is shown according one embodiment of the present invention. The MFTS software 500 comprises: an MFTS main program 350; an MFTS mobile device communication interface 150 for communicating with mobile communication service providers 110; a web application interface 154 for receiving user's enrollment, registration, retrieving and updating information through a user web site over the Internet 120; a P2P service 375 for facilitating person to person financial transactions; a storage/database (DB) interface 377 for storing and retrieving data to/from a MFTS user database 158; a financial account service 379 for facilitating user authentication; a financial service provider (FSP) communication interface 156 for communicating with financial service providers 30, as well as MFTS bank holding account 175 (if applicable); and a bill presentment interface 155 for receiving bills from various billing entities 180 through a bill presentment system 190.

The MFTS main program 350 interacts and coordinates with the other modules and services in the MFTS, and acts as a "traffic cop" for information routed between the various storage and communication interfaces.

The preferred web application input/output interface 154 allows users to enroll or register with the MFTS system, to add/edit/view/delete mobile clients, add/edit/view/delete credit card/bank accounts, and add/edit/view/delete payees or billing entities. The web application interface 154 further allows user to initialize a mobile client, and to unlock a locked mobile device after a series of failed logins. Exemplary displays associated with the preferred web application interface 154 are shown and described in connection with FIGS. 10-12.

The preferred web application interface 154 provides a number of functions or routines for users to access via an Internet (web) connection, if desired. It will be appreciated that users may prefer to conduct certain types of functions such as enrollment, adding a payee, changing configurations of the operations, etc. via an Internet web interface instead of via a mobile interface. For example, and in accordance with aspects of the invention, functions that are provided in the preferred embodiment via a web interface include enrollment 351 (see e.g. FIG. 37); editing a mobile client 353 (see e.g. FIGS. 37B, 37D); editing credit card and/or bank accounts 355 (see e.g. FIGS. 38A-38D); editing or adding a payee 357 (see e.g. FIGS. 39A, 39B); initializing a mobile client 359 (see e.g. FIGS. 37A, 37C); and unlocking a mobile client 361 (see e.g. FIG. 37A). Details of the preferred software routines are provided in connection with the referenced figures.

The preferred input/output interface 154 may be replaced with an alternative embodiment of the interface 154', which provides a different web user interface functionality and display, as described in connection with FIGS. 40-42.

Mobile Device Software

FIG. 4 is a flowchart of the main program 335, which is one of the software modules of the mobile device or "Mobile Wallet" software 400 that runs on a mobile device 12 in accordance with aspects of the invention. It will be understood from FIG. 3A that the mobile device main program 335, in the disclosed embodiment, is the main program loop of the mobile wallet software 400 that coordinates the operations of the other mobile device software modules including the mobile device input/output interface 331, a security manager module 333, a mobile device storage module 337, and a mobile device communication interface module 339.

In typical use, a mobile device user turns on his/her mobile device, reviews any recent text messages (in some embodiments), navigates to or "launches" the mobile device application 400 by initiating the operation of the mobile device main program 335, views the displays generated by the program, and interacts with the program to provide commands and inputs, e.g. to view a bill, or select a payment source, or make a payment. In accordance with aspects of the invention, a user may launch the mobile device application 400 in response to receipt of a text message indicating that a new bill is available to be paid (or other message from the MFTS), or may independently launch the mobile device application to invoke a function of viewing a bill, paying a bill, etc.

In FIG. 4, a first step 405 involves the mobile device checking whether a text message (SMS) has been received. For example, according to an aspect of the invention a text message is sent by the MFTS to a mobile device to inform the user that a new bill has been received and can be paid, or that a payment has been received from another user. See FIGS. 15 and 20 in this regard.

It will be understood that a received text message may or may not be related to the MFTS or any functions thereof. However, any unrelated text messages will be ignored for the purpose of discussion here and it is assumed that all messages received are related to the MFTS and its operations. It will also be understood that in some mobile devices text messages are received by an independent process or module and stored in memory for access by other processes, while text message receipt and processing could be optionally incorporated as an integrated function within the mobile device software 400. If a text message relating to an MFTS function has been received, whether by an independent process in the mobile device or integrally within the application, at step 460 the user may open the text message and determine what to do in response to the message.

At step 470 the user may elect to download the mobile device software (e.g. download the Mobile Wallet software), if they are not currently an enrolled user. The user will be provided with information as to how to access and download the software. More information is provided about enrollment elsewhere in this document. The user would be required to download the Mobile Wallet software and execute it on his/her mobile device before any of the other functionality in FIG. 4 can be invoked.

After step 460, the program loops to step 490 to look for an exit (terminate) command or event, and can loop back to step 405 in a continuous loop and repeat the operations.

Returning to step 405, if no text message is received, the program control passes to step 410, where the user may elect to activate the mobile wallet software 400 and utilize the functions provided thereby. If not (i.e. there is no user command to enter the mobile wallet software at step 410), control loops back to test for text messages and/or activation of the mobile wallet software.

If at step 410 the user has launched operation of the mobile wallet software 400, control passes to step 415 where the user may choose from a list of functions provided by the software on the mobile device. Those functions will be described below. The program loops continuously awaiting user input of a selected function, which includes an "exit" command as shown at step 490.

In accordance with one embodiment of the invention, at step 415 the user may choose to invoke or run the following functions provided by the mobile device main program 335:

1. View payment sources and balances as shown in step 420 (see FIGS. 13 and 14 for further discussion);
2. View bills as shown at step 425 (see FIGS. 15 and 16 for further discussion);
3. Pay bills as shown at step 430 (see FIGS. 17, 18A and 18B for further discussion);
4. Invoke a "Pay Anyone" function as shown in step 435 (see FIGS. 19-31 for further discussion);
5. Request an account balance transfer as shown in step 440 (see FIGS. 32 and 33 for further discussion); and
6. Change the personal identification number (PIN) as shown in step 445 (see FIG. 36 for further discussion).

Other functions are also provided according to an aspect of the invention, if provided with an "inbox" and "outbox" function for viewing incoming and outgoing payments:

7. View Inbox payments as shown at step 450 (see FIGS. 20, 22-24 for further discussion); and
8. View Outbox payments as shown at step 455.

It should be understood that the functions of view inbox payments (step 450) and view outbox payments (step 455) are optional functions for an embodiment where a listing of incoming payments from other users (inbox payments) is maintained in the mobile device, and/or a listing of outgoing payments that have been generated and sent from the mobile wallet software is maintained in the mobile device while the payment is pending, for viewing independently of the operation of the mobile wallet software.

Still referring to FIG. 4, after the user invokes a particular function, appropriate program instructions for effecting those functions are executed by the mobile device. Exemplary displays and discussion of such functions is provided in connection with the referenced figures in FIG. 4, and the reader is referred to such discussions elsewhere. After each function is performed, the mobile device application proceeds to step 490 and either loops back to test for input of another user function or exit. The user can either continue further operation of the mobile device application or terminate the application. If the user decides to continue, the mobile device application returns to step 405 to check text messages or continue operation of the mobile wallet application.

FIG. 5 is a flowchart of the MFTS main program 350, which is one of the MFTS software modules 500 that runs on a computer system or server in an MFTS 18 in accordance with aspects of the invention. This main program 350 coordinates the other programs and functions of the MFTS as shown in FIG. 2, e.g. MFTS mobile device communication interface 150, SMS generator 151, web applications 153, FSP communication interface 156, bill presentment interface 155, accessing and maintenance of the user database 158, etc. It will be understood from FIG. 3B that the MFTS main program 350, in the disclosed embodiment, is the main program loop of the MFTS software modules 500 that coordinates the operation of other software modules associated with and forming a part of the MFTS 18.

In typical use, the MFTS 18 operates continuously to monitor for inputs from various sources. The primary inputs come from user enrollment, where a user inputs information to establish an account or relationship with the MFTS system operator, from mobile devices as users view and pay bills, from communications with billing entities, financial institutions, and/or FSPs to receive bills to pay, provide payment instructions to such institutions and partners, and receive information such as account balances and payment confirmations. Those skilled in the art will understand that the software 500 is preferably constructed to run on a computer server in a multi-threaded, multi-tasking, web-enabled, secure, real-time 24/7 computing environment, that is message-driven by the various entities with which the system communicates.

In FIG. 5, the process for the MFTS main program 350 starts with determining that an input from an associated entity (e.g. user via mobile device, user via web interface, FSP, etc.) has been received and must be processed. The system determines at step 505 if an input has been received from the mobile device communication interface 152, at step 510 if an input has been received from a web application 154, at step 515 if an input has been received from the bill presentment system interface 155, and at step 520 if an input has been received from a financial service provider (FSP) interface 156. At step 530, the program 350 then branches to or executes to an appropriate routine or interface to carry out the specific function associated with the incoming message. Specifically in accordance with aspects of the invention, such routines or interfaces comprise (a) handling communications and messages with a bill presentment service via the bill presentment interface 155; (b) handling communications and messages with a web-accessing user or administrator via the web application interface 154; (c) handling communications and messages with mobile devices via the mobile device communication interface 152; (d) handling communications and messages relating to a person to person (P2P) type payment through a person to person payment service 375; (e) handling communications and messages relating to financial accounts of a user via a financial account service 545; and (f) handling communications and messages relating to financial service providers (FSPs) via the FSP communication interface 156.

As described above briefly in connection with FIG. 3B, a mobile device user may wish to enroll as a registered member of the MFTS, after receiving a payment from a registered user, or at his/her own will. The user may access a web site designated by the MFTS using his/her computer connected to the Internet and web browser to use the web application. The web site may contain information related to the services and benefits the MFTS provides and a specific page for user enrollment. If the user decides to enroll, he/she then accesses the web application, which is effected by the web application interface 154, and selects a function to perform.

As shown generally in FIG. 3B, typical web-accessible functions provided to a user include the following:

1. Enrolling a new mobile client to the MFTS (see FIG. 37A for a preferred embodiment and FIG. 40 for an alternative embodiment);
2. Editing a mobile client including adding, editing, viewing and deleting a mobile client (see FIGS. 37B and 37D for a preferred embodiment and FIG. 40 for an alternative embodiment);
3. Editing credit card and/or bank accounts including adding, editing, viewing and deleting credit card and/or bank accounts (see FIGS. 38A-D for a preferred embodiment and FIG. 42 for an alternative embodiment);
4. Editing a payee including adding, editing, viewing and deleting a payee (see FIGS. 39A-B for a preferred embodiment and FIG. 41 for an alternative embodiment);
5. Initializing a mobile client including downloading software to a designated mobile device, setting up a password, and activating the mobile device (see FIGS. 37A and 37C for a preferred embodiment); and
6. Unlocking a mobile client after the mobile device is locked (perhaps accidentally or to prevent fraud) after a predetermined number of failed logins (see FIG. 37A for a preferred embodiment).

Returning to FIG. 5, after each function is performed, the MFTS main program 350 continues to run by looping back to test for new input at steps 505, 510, 515, and 520.

User Database and Schemas

Although not shown specifically as an independent step or process in FIG. 5, but shown in FIG. 3B, those skilled in the art will understand that the MFTS 18 includes a storage/database (DB) interface 377 for storing and retrieving data to and from the MFTS user database 158. This database 158 stores two primary categories of data: user data and transaction data. User data comprises information about individual users of the system including their respective payees, financial institutions, and accounts. Transaction data comprises information that is specific to a particular transaction of a particular user, e.g. when a user provides the system with an instruction to pay a particular bill. The transaction information is a record of each transaction that is initiated by a user. Both the transactions data and user data are stored in tables in the user database 158 arranged in a particular format or schema in accordance with aspects of the invention.

FIG. 6 illustrates database schemas (data table layouts) for the user database 158 in a mobile financial transaction system (MFTS) according to an exemplary aspect of the invention. The user database 158 comprises several data tables that are related: a master user table 610, a user financial accounts table 620, a financial service provider (FSP) table 630 and a payees table 640. These tables store data associated with users, accounts of users, financial service providers (payment sources) associated with users, and payees associated with users. As is known to those skilled in the art, database tables typically comprise a plurality of records, each record containing one or more fields or items of data that are associated. Further, those skilled in the art will understand that a "record," in database parlance, is a single instance or data item, usually consisting of a collection of one or more fields or sub-items of information, each field or sub-item typically having a field identifier in a schema that identifies what the information in the field represents; an array or collection of multiple records is often referred to as a "table" or a "database." Databases or tables often include one or more index fields or items that allow rapid access to a particular record so that the record may be identified, retrieved, and utilized in a transaction or updated with new information as needed.

The master user table 610 comprises a set of information (a record) for each registered MFTS user. In one aspect of the invention as shown in FIG. 6, the set of information comprises a user identifier or user ID, a name (e.g. the full name of a user), a user name (e.g. a login name associated with a user), and other information that allows a particular user of the system to be identified as enrolled for use of the system. Further information that can be included in the user table 610 comprises an account number (e.g. an account number of a user with an entity that operates the MFTS), the user's contact information such as mailing address, residential phone number and mobile phone number, phone number for the mobile device associated with the MFTS, email address and password, etc. As will be understood, a mobile device will typically provide a user identifier in some form to the MFTS, upon login of the user, so as to allow the system to authenticate the user for purposes of using the system to make payments, view bills, obtain real time account balances, etc. in accordance with various aspects of the invention.

The set of information in the master user table 610 preferably further comprises pointers to entries in a user financial accounts table 620, a financial service provider table 630, and a payee table 640 associated with the user. As known to those skilled in the art, a "pointer" in a database is information that allows a computer program module to locate and retrieve related information in another table in the database.

In accordance with an aspect of the invention, each user may have a plurality of financial accounts and a plurality of financial service providers for such accounts. For each user, the user financial account table 620 comprises information about one or more accounts of a user with at least one financial institution or financial service provider (FSP), which information includes the user's account number with a particular financial institution, the financial account type (e.g. checking, savings, credit card, money market, etc.), the account number of the user in his/her financial institution, an index or pointer to a particular financial institution (shown as "FSP ID" (provider number) or provider in the financial service provider table 630, etc. Other information relating to identification and/or utilization of a user's financial accounts may also be stored and is contemplated.

The financial service provider table 630 comprises information corresponding to one or more financial service providers associated with a user. For each financial service provider entry in the table 630, the table includes information including but not limited to an index number and/or identifier (ID) associated with an associated financial account in the user financial account table 620, the provider's name and/or nickname, type of service provided (e.g. a bill presentment service, a bank, a credit facility, etc.), an account number with the financial service provider (not shown), associated password (not shown), account holder's contact information, verification data, etc. Other information relating to identification and/or utilization of a user's financial service providers may also be stored and is contemplated.

Payee information is stored in a payee table 640. Payee information is information that is needed to identify a particular payee to whom a payment is or may be sent, and how that payee should be paid. A plurality of payees can be set up for each user of the MFTS. Payees may be billing entities that provide services such as water, gas, electrical power, communication services such as local phone or mobile phone services, mortgage, credit card, and/or other companies providing monthly bills or otherwise providing bills on a regular basis. On the other hand, payees may also be an individual (e.g. a user's peer, colleague, acquaintance, relative, etc.) to whom a user may have an occasional payment obligation. The payee table 640 comprises information relating or associating a particular user to one or more payees, including an account number or identifier associated with the user of the MFTS that ties that payee to a particular user, a payee number or identifier (e.g. payee ID) that identifies the payee, an account number associated with the payee, payment periods, payment authorization, etc. Other information relating to identification and/or utilization of a user's payees may also be stored and is contemplated. In accordance with aspects of the invention, a particular payee associated with a user is identified in the payee table 640, through provision of information to the MFTS through a mobile payment instruction, which causes the MFTS to access the table 640 to obtain information about the payee so that a payment can be made to that payee.

Referring now to FIG. 7, a transaction table 710 is maintained in a transaction database 705 for storing information relating to mobile transactions such as payment source balance inquiries, payment to make inquiries, and payments made by a user. Those skilled in the art will understand that each payment or each inquiry transaction from a mobile device results in creation of at least one record that is stored in the transactions table, for purposes of creating an audit trail, a dated record of transactions, and facilitating database commit and rollback operations. Each transaction record comprises information including but not limited to: a transaction identifier (a unique identifier), date and time stamp for the start and end, user name or ID, or both, selected one or more transaction-related financial institutions, their names, or nicknames, or coded identifiers, selected account, the nature of the transaction, timers for synchronized responses, balance amounts for each account related to an inquiry, balance due amount related to a bill inquiry, payee name or coded identifier, or both, payee phone number, amount paid, status flag relating to a payment as pending/complete. It will be appreciated that a transaction is typically initiated at a mobile device, but can also be initiated by the user 12 using the web application. The transaction is sent to the MFTS. The MFTS processes the inquiry or payment, creates a transaction record 715 corresponding to the transaction in a transaction table 710 of the transaction database 705, stores the record in the transactions table 710, creates a MFTS payment instruction (MFTSPI) for a selected particular financial institution or payment source (PS), and transmits the MFTSPI to that financial institution or PS. Upon completion of the payment by the PS and receipt of a payment confirmation message back from the PS, the corresponding transaction record 715 in the table 710 is updated to indicate that the payment has completed, e.g. by changing a status flag from pending to complete. According to one embodiment of the present invention, the record for a completed transaction is moved to a log file according its completion time for archive. Other information relating to transactions and their status may also be stored and is contemplated.

Mobile Device Application Flowcharts

The mobile device application flowcharts are shown in FIGS. 8-9 according to embodiments of the present invention. In FIG. 3A, a mobile device communication interface 339 is used to facilitate the communication between the mobile device main program 335 and the mobile device radio hardware 343. The mobile device communication interface 339 communicates with the MFTS mobile device communication interface 150 in the MFTS 18 via wireless communications through the MCSP 110.

A flowchart of the MFTS mobile device communication interface 150 is shown in FIG. 8. It will be understood that this process 150 on the MFTS side communicates with similar processes in the mobile device, via the mobile device communication interface 339 in a mobile device. In this flowchart, the MFTS mobile device communication 150 interface first establishes communication link to the mobile communication service provider (MCSP) the user subscribed in step 805. The mobile device communication interface is set up between a mobile device and the MCSP and the interface receives data communication from both sides. The mobile device communication interface 150 comprises a continuous loop shown in step 810 to check if any new message is received from either the MCSP or a mobile device. If no message is received, the loop continues until a new message is received. When the mobile device communication interface 150 receives a message, it checks in step 815 to determine where the message comes from by checking the sender/receiver information. If the message comes from a mobile device that is requesting information from the MFTS server, the mobile device application proceeds to step 840 to add a task to processing queue and set a timer to wait for a response from the MFTS server through the MCSP in step 845. The mobile device communication interface waits until it receives a response from the MFTS server or the timer times out, whichever comes first. If the mobile device communication interface receives a response within a predetermined timeout period, the message is sent to the mobile device in step 850. Otherwise, if the MFTS mobile device communication interface 150 does not receive any response in time, then an error message is sent to the mobile device notifying the user a failure occurred. Both step 850 and step 820 converge in step 825 to extract a subset of information from the message or the response received from the MCSP. The information extracted in step 825 is sent to the user's mobile device for display in step 830. After the message is displayed, the mobile device communication interface goes back to wait for next message in step 860 until the user turns off the mobile device and terminates the mobile device application.

Mobile Client Security Aspects

In order to use the MFTS 18, a user 12 with a suitable mobile device 15 must register for service with an entity that operates an MFTS 18 constructed in accordance with exemplary aspects of the invention. This registration process necessarily involves the input and storage of important personal and financial information about the user either manually or via external system. Safety and security of the personal and financial information mandates that the MFTS 18 provide security guarantees and measures from MFTS administrators. According to an exemplary aspect of the invention, the disclosed MFTS 18 implements strong security measures on both ends of the mobile communication: (1) at the mobile client, and (2) at the MFTS server system itself. In accordance with exemplary aspects of the invention, one or more of the following security measures are implemented in the MFTS 18 with respect to communications with mobile devices:

Secure Mobile Client Delivery:

In accordance with one aspect of the invention, the mobile application is delivered (e.g. by downloading) into a mobile device via a secure wireless delivery method. In accordance with this aspect, the mobile application is constructed as a wirelessly-deliverable or downloadable application or "applet" that is downloaded into a mobile phone from a central site, e.g. from the MFTS 18. Those skilled in the art will understand that a number of different but generally equivalent programming environments currently exist to develop applications for various types of mobile phones and wireless data communication technologies.

One known secure delivery methodology is the BREW™ wireless content delivery platform for CDMA communication technologies provided by Qualcomm, Inc. Details of the application development and delivery methodology for Qualcomm-compatible mobile devices are available from the manufacturer.

Another delivery method is via a JAVA™ Archive file, also called a JAR, the platform for which is available from Sun Microsystems, Inc. In this case, the mobile application is constructed as a downloadable JAVA™ application that is downloaded into a JAVA-compatible mobile phone. Those skilled in the art will understand that the Java 2 Micro Edition (J2ME) programming environment may be used to develop applications for certain types of mobile phones (e.g. Motorola). Such applications are also called "applets" or "midlets", but essentially are computer programs that run within the specific operating environment of the particular type of mobile phone. Details of the J2ME application development environment are available from the manufacturer.

Preferably, the JAR file used to distribute the mobile client application is digitally signed with a code signing digital key issued to the MFTS 18 by an authentication process, e.g. a digital key process provided by VeriSign, Inc. This allows users to verify the authenticity of the mobile client application. Details of the mobile security techniques provided by VeriSign are available in the literature and web site of VeriSign, Inc.

SSL Communication to MFTS Server:

Those skilled in the art will understand the significance of security for communications between users and the MFTS 18 via either a mobile device or via the web interface. Accordingly, preferably all HTTP communications to the server in the MFTS 18 are via HTTPS, i.e. secured via the known Secure Sockets Layer (SSL) protocol. As will be known to those skilled in the art, SSL is a protocol developed by Netscape Communications Corporation for transmitting private documents via the Internet. SSL uses a cryptographic system that uses two keys to encrypt data—a public key known to everyone and a private or secret key known only to the recipient of the message. Details of the SSL security protocol are available from the manufacturer.

Alternatively, a lesser level of security may be implemented for wireless communications by use of the known Wireless Transport Layer Security (WTLS). However, it will be understood that WTLS may not be as secure as the SSL protocol, because it uses weaker encryption algorithms and several exploits have been identified for the protocol. In addition, data communicated with WTLS is decrypted at the WAP gateway and re-encrypted via SSL to the destination host, which provides an opportunity for compromising the WAP gateway to intercept sensitive transmissions.

The MFTS mobile client application preferably makes a direct SSL connection to the MFTS server and is not as susceptible to the security issues plaguing WTLS and WAP applications. It will therefore be appreciated that if HTTPS is used for all communications between the mobile client and the MFTS server, the underlying mobile data transmission technology such as GPRS and CDMA between the mobile device and the MFTS should have no significant bearing on the security of the data for transactions.

Digital Keys on Client:

According to another exemplary aspect of the invention, a unique digital key is issued to each client (mobile device) for use in digitally signing all communications to the MFTS server. This strongly authenticates the mobile client to the server and dissuades attempts to impersonate or spoof the mobile client. It will be appreciated that such a methodology affords stronger security than online banking sites that require only a username and password for access, which are much easier to compromise than digital keys. It is believed that use of the MFTS mobile client to access financial services is equally if not more secure than commonly used browser based online banking systems that require only a password for authentication.

PIN Required to Unlock Client:

According to another aspect of the invention, further security for the mobile device 15 is provided by requiring the user to enter a PIN to unlock the mobile client each time it is launched. This prevents use of the application if the phone is stolen or "borrowed". PIN lockout is also preferably implemented on the mobile client so that the client will lock down after several failed login attempts and not permit further attempts until the client is unlocked by the user contacting support or logging into the MFTS system (e.g. via the web application) and invoking a procedure to unlock the mobile client. This prevents efforts to use "brute force" to guess the PIN. It will be appreciated that the combination of a PIN and the digital certificate creates a two-factor authentication mechanism for use of the mobile wallet software 400 on a mobile device.

Mobile Client Deactivation in Event of Theft or Loss:

If the user's mobile device is stolen or lost, the user can access the MFTS 18 via the web application to deactivate the mobile client. This will prevent further communication between the mobile client and the MFTS and delete all demographic information from the mobile client about the user's mobile wallet.

Encryption of Data Placed in Local Storage:

All data placed into local storage on the mobile device 15 is preferably encrypted. This insures that if the mobile device is lost or stolen, the data stored in the mobile client in local storage is unreadable. However, it will be appreciated that, because the mobile device does not store full information regarding the user's accounts, banks, account numbers, etc., but only stores a reduced set of information, represented by codes, the risk of compromise of the user's confidential information is reduced. For example, the mobile device only stores information indicating that a user has an account e.g. My Checking or xxxxxx2125), but the user's account number is stored in the MFTS 18, not in the mobile device. This aspect is believed to be a particular advantage of the architecture of a mobile financial transaction system constructed in accordance with the present invention—providing and storing a reduced subset of information in the mobile device, with more complete information stored in a secure server, enhances the overall security for mobile transactions.

Verification of Phone Number Possession:

In accordance with yet another aspect, further security is provided by verification that a payment instruction originates from a particular mobile number associated with a user. This security measure is implemented in the disclosed embodiment by providing the mobile number associated with the mobile device as a part of the mobile payment instruction (MPI) to the MFTS 18, preferably encrypted together with other information of the MPI. The MFTS is responsive to the MPI to parse out the mobile number and determine if the payment instruction has originated from a mobile number that is consistent with both the account identified as a payment source (PS), as well as the name of the payee as having already been entered and stored in the payee table in the user database.

According to yet another exemplary aspect of the invention, during an enrollment process, an SMS containing a predetermined verification code is sent to the phone number entered when setting up the mobile client. This code must be entered by the user when online at the user site web application 153 to successfully initialize a mobile client for operations. This prevents a person from registering a phone number they do not have possession of with the intent of committing fraud.

One Time Password Used to Initialize Mobile Client:

Still further security is provided by requiring entry of an initialization code or password the first time the mobile client is run to trigger the generation and installation of the client's digital certificate. This initialization code is a one-time expiring one time password that is presented to the user at the user site web application 153 during the initialization process for the mobile client. This process establishes a difficult-to-forge link between a user account and an instance of the mobile client on the user's mobile device.

Mobile Client Initialization:

The following steps describes the best mode currently contemplated for a process of user enrollment in a system constructed in accordance with exemplary aspects of the invention and installing the mobile client:

1. A user with an Internet-accessible computer (e.g. computer 140 in FIG. 2) navigates to the Internet-accessible user site web application 153 in their browser and completes the enrollment form displayed by the web application. (NOT SHOWN.) The user provides the requested information by entering information into appropriate fields in the data form displayed. Alternatively, enrollment could be implemented by a third party enrollment system with whom the MFTS system operator maintains a relationship, e.g. an associated financial service provider.
2. When enrollment is complete, the user accesses a mobile client management section of the user site web application 153 and adds a new mobile client. Alternatively, addition of a new mobile client could be implemented by a process provided by a third party with whom the MFTS system operator maintains relationship, e.g. an associated financial service provider or mobile communication service provider.
3. The user then enters the phone number of the mobile device on which he/she wishes to install the mobile client and clicks an initialize button.
4. Another step involves generation of a verification code to activate the mobile client on the mobile device:
    (a) In accordance with one exemplary aspect of the invention, the MFTS 18 sends an SMS to the phone number specified; this SMS contains a verification code. The user is then prompted by the mobile application to enter the verification code to activate the mobile client to conduct transactions.
    (b) In accordance with another aspect, the user views the verification code in the SMS and enters the verification code into a browser verification screen at the user site web application 153. Presumably, the mobile phone with verification code will be in the user's immediate possession during enrollment. The user then clicks a "verify" button to activate the mobile application.
5. Another step involves generation of an initialization code and downloading of the mobile application into the mobile device (for a new installation of the mobile device software):
    (a) According to one exemplary aspect of the invention, a user with Internet access to the user site web application is next presented with an initialization code for the mobile client. This initialization code is later entered into the mobile device (see below) upon prompting, for activating the mobile client.
    (b) According to another exemplary aspect of the invention, on the mobile device, the MFTS 18 sends the mobile device a second SMS that contains a clickable link for downloading the mobile client. The user then clicks the link and downloads the application into the mobile device.
6. After the mobile client is finished downloading into the device and activated by the user, it will present a screen prompting for the initialization code. The user will then key in the initialization code into the mobile client.
7. The initialization code is then communicated from the mobile device 15 to the MFTS 18, to be used for device and mobile client authentication. When a valid initialization code is received by the MFTS 18, a unique digital key is placed onto the mobile client.
8. Upon receipt of a digital certification from the MFTS 18, the mobile client then prompts the user to enter and confirm a PIN.
9. After the PIN is received and stored, the mobile device is ready for use, and displays a main menu screen that allows entry of billing entities, payment sources, viewing of balances in accounts that were previously entered by the user via the user site web application 153, etc.

MFTS Server System Security Aspects

In accordance with exemplary aspects of the invention, various security measures are implemented in the MFTS 18 by various software routines appropriate for the various entities with which the MFTS communicates. One or more of the following security measures are implemented in the preferred MFTS 18:

Web Applications Require SSL:

Preferably, all externally accessible web applications that run at the MFTS 18 (e.g. the web applications 154 including User Site 153 and the Admin Site 157) only permit SSL secured connections. If a user tries to initiate a plain HTTP connection to one of the web applications, it will be redirected to an HTTPS connection.

Password Complexity Requirements:

Passwords for web application logins preferably must meet stringent complexity requirements. Password protection can be implemented at various stages of the operation.

Account Lockout and Password Reset:

Preferably, but optionally, accounts will be locked out after several failed login attempts to the user site web application 153. Users whose accounts have been locked out will have to activate an Account Unlock function provided at the user site 153 and enter the correct reply to a password reset question they established during enrollment to unlock the client and reset their password. If the user is unable to remember the correct reply, they will have to contact a customer service facility (web site, representative, etc.) to have their account unlocked and password reset.

Security of FSP Interfaces:

Interfaces to FSPs are preferably secured with mechanisms appropriate to the nature of the interface and/or as required by the particular FSP. Any interface using the public Internet for data transmissions is preferably secured via encryption and authentication requirements that are acceptable in the financial services industry. Details of security requirements for communications with particular FSPs should be obtained from the FSP.

From the foregoing, it will be understood and appreciated that various mechanisms may be employed, singularly or in combination, to ensure security in an equivalent manner as described above for communications with the MFTS 18, whether via mobile devices 15 or via the user site 153. Other security measures and techniques may occur to those skilled in the art, while remaining within the scope of the invention.

MFTS Interface Software Routines

As described above in connection with FIG. 3B and FIG. 5, the MFTS software 500 comprises various program modules including the main program 350 (FIG. 5) and various communication interfaces for handling communications and functions associated with the various entities involved in a system constructed in accordance with the disclosed aspects of the invention. Other software or program modules include an MFTS mobile device communication interface 150, a web application interface 154, a financial service provider communication interface 156, and a bill presentment interface 155. Further software routines include a P2P service 375, an SMS generator 151, and a financial account service 379.

Turn next to FIG. 8 for a description of the MFTS mobile device communication interface software or routine 150 in accordance with an aspect of the invention. The MFTS mobile device interface software 150 preferably runs as a continuous independent process on the MFTS server computer, asynchronous to other processes, and provides for handling of communications and messages between the MFTS 18 and the mobile devices of users. By use of the term "interface," we mean a computer program or routine 150 and associated hardware such as a communications component or storage element that is driven by the program. The interface 150 handles messaging between the various processes in the MFTS 18 and mobile devices, for example, when a user at a mobile device generates a command to "View Bills" or "Pay Bills," that command is received over a wireless network and processed by the MFTS mobile device communication interface 150 as described herein, to cause the MFTS 18 to carry out functions in accordance with the invention.

Starting at step 805, the first step taken is for the interface to establish communication with a mobile communication network, that is, with particular mobile communication service providers (MCSP), so that communications between the MFTS 18 and mobile devices that subscribe for service with particular networks may be established. Essentially, this is an initialization process that involves determination of appropriate protocols for communications with a specific MCSP and establishing contact with an MCSP by exchanging messages in a manner corresponding to the communication protocol. After establishing communications, the interface tests at step 810 for receipt of a message either incoming from a mobile device or from another process within the MFTS 18, for example, if a billing entity or bill presentment system provides information about a new bill for a particular user.

At step 815, the interface determines whether an incoming message is a task-initiating message (for example, from a mobile device in an affiliated mobile network) or is a message from another MFTS process (for example, a response message from the FSP interface 156). If the incoming message is a task-initiating message, the interface process proceeds to step 840, where a new processing task is created and added to a processing queue for the interface 150. For example, a processing task derived from a mobile device incoming message may be a mobile payment instruction (MPI), or a "View Bills" instruction, or a "Balance Transfer," or other of the various functions of the mobile wallet. Typically, a processing task will generate a new transaction record that is stored in the transaction table in the user database 158. Thus, at step 842, a new transaction record (if appropriate for the incoming message) is created and stored in the transaction database.

At step 845, the interface sets a timer (a predetermined time period) appropriate for the particular task and process, and initiates a timing loop. Control then passes to step 850, where the interface tests for expiration of the predetermined time period. If the timer has expired, an error condition has occurred (the task added to the queue has not been properly processed in time), and at step 855 an error message is generated and sent to the user's mobile device that triggered the task.

If an appropriate response from the queued task is received within the predetermined time, control from step 850 passes to step 860, where the transaction record created in conjunction with the incoming message is updated with any information that resulted from processing the queued task. For example, if the task involved making a payment using a particular payment source to a particular payee, and the payment is accepted and timely handled by the selected financial service provider, the transaction record is updated to indicate confirmation of the payment.

After the transaction record is updated (if applicable), control passes to step 870, and a corresponding message relating to the task-initiating message is sent out to the requesting user's mobile device or other task-initiating process. For example, if a payment instruction was received from a mobile user and that payment instruction was duly and timely processed, a payment confirmation message is sent to the user's mobile device.

Returning to step 815 in FIG. 8, if the MFTS mobile device communication interface 150 determines that an incoming message is from another MFTS process (e.g. a response message or other non-task-initiating message), control passes to step 820, where the message is processed. For example, a message from another MFTS process could be a message provided by a billing presentment system that a new bill for payment has been received for a particular user, or a message provided by a financial service provider with information as to balances available in particular accounts for a particular user. In accordance with aspects of the invention, a message from various other processes and associated entities may include information that is not required by the mobile device interface, i.e. only a reduced set of information is to be provided to the mobile device. Specifically, a financial service provider (FSP) 30 may provide information about a user's financial accounts that is more comprehensive (i.e. "excessive") than required for display and handling on a mobile device, in that all of the information from the FSP is not needed or desired for display on the mobile device. In such cases, a reduced set of information appropriate for display on the mobile device, as shown in various exemplary mobile device displays shown elsewhere in this document, is prepared for sending to the mobile device as a message. In such a case, at step 825 a subset of information that was received and/or stored in the MFTS is prepared for transmission to a selected user's mobile device.

Control passes from step 825 to step 860, where any corresponding transaction records associated with the message (if any) are updated with information from the message of the MFTS process. Then, at step 870, an appropriate message to the mobile device corresponding to information in the message processed (step 810) is prepared for transmission to the mobile device. The process 150 then loops back to process any other messages that may have arrived.

After step 870, the process 150 loops back to step 810 to process another incoming message. From the foregoing, those skilled in the art will understand and appreciate how the MFTS mobile device communication interface 150 is operative to process messages from either mobile devices or from other MFTS processes, communicate relevant information in the form of tasks for processing by other MFTS processes, update any corresponding transaction or user database records, and/or communicate appropriate return messages to a user's mobile device or other message-delivering sources.

Turn next to FIG. 9 for a description of the financial service provider (FSP) interface software or routine 156 in accordance with an aspect of the invention. The financial service provider (FSP) interface 156 preferably runs as a continuous independent process on the MFTS server computer, asynchronous to other processes, and provides for handling of communications and messages between the MFTS 18 and the financial service providers of users.

Although FIG. 9 shows exemplary steps of an interface for communications between the MFTS 18 and one or more FSPs 30, it should be understood that a similar methodology is employed for the bill presentment interface 155, the financial account service 379 (for third party user authentication), the P2P service 375. All are similar continuous, independent asynchronous computer-implemented processes that receive messages from either another MFTS process or from a third party connected for communications with the MFTS, process those messages by determining an appropriate destination (e.g. storage of data in the user database 158 to update user information or to create or update a transaction record, communication to a mobile device, etc.), and forwarding processed information to such destinations. Accordingly, the discussion of FIG. 9 will be understood as generally applicable to other communication interface processes, except as noted.

Starting at step 905, the first step taken is for the interface 156 to establish communication with a financial service provider (FSP) 30 so that communications between the MFTS 18 and the FSP may be established. Essentially, this is an initialization process that involves determination of appropriate protocols for communications with a specific FSP and establishing contact with an FSP by exchanging messages in a manner corresponding to the communication protocol. After establishing communications, the interface tests at step 910 for receipt of a message either incoming from a mobile device (via MFTS the mobile device communication interface 150) or from another process within the MFTS 18, for example, if a user has initiated a transaction via the web application interface 154.

At step 915, the interface determines whether an incoming message is a task-initiating message or is a return/response message from an FSP 30. A task-initiating message is a message that causes the interface to initiate a communication to a particular FSP 30, for example from a mobile device (MFTS mobile device communication interface 150) or from another MFTS process such as a web application initiated payment instruction. If the incoming message is a task-initiating message such as from a mobile device, the interface process proceeds to step 940, where a new processing task is created and added to a processing queue for the interface 156. For example, a processing task derived from a mobile device incoming message may be a mobile payment instruction (MPI), or a "Pay Bill" instruction, or a "Balance Transfer," or a "View Payment Sources," or other of the various functions of the mobile wallet. For the FSP communication interface 156, a typical new processing task is in the form of a MFTS payment instruction (MFTSPI) that is communicated to a selected FSP 30, so as to instruct that FSP to make a payment on behalf of a user, using a selected account as payment source (PS).

As mentioned in connection with FIG. 8, and in accordance with an exemplary aspect of the invention, a processing task derived from a mobile device incoming message generates a new transaction record that is stored in the transaction table in the user database 158. It will be understood that information from this transaction record is utilized in the processing task for the queue in interface 156, for example, in assembling the information required for the MFTSPI to the selected FSP 30. Further, it will be understood that the transaction record is updated if necessary with information from the FSP upon receipt of a response.

At step 945, the interface sets a timer (a predetermined time period) appropriate for the particular task and process, and initiates a timing loop. Control then passes to step 950, where the interface tests for expiration of the predetermined time period. If the timer has expired, an error condition has occurred (the task added to the queue has not been properly processed in time), and at step 955 an error message is generated and sent to the process that triggered the task.

If an appropriate response from the queued task is received within the predetermined time (e.g. a response from the FSP containing information about the user's account balance, a payment confirmation, or other information), control from step 950 passes to step 960, where the transaction record created in conjunction with the incoming message is updated with any information that resulted from processing the queued task. For example, if the task involved making a payment using a particular payment source to a particular payee, and the payment is accepted and timely handled by the selected financial service provider, the transaction record may be updated to indicate confirmation of the payment. As discussed in connection with FIG. 8, the MFTS mobile device communication interface 150 may be responsible for updating the corresponding transaction record, but it will be appreciated that other circumstances may require that the FSP communication interface update a transaction record. Other information associated with the task and received from the FSP may also result in updating other records in the user database 158, e.g., the addition of a new account of a user with a selected FSP will require addition of a record in the user financial accounts table 620 (FIG. 6), or a closed account status of a particular FSP with a user will require updating (or deletion) of a record in the financial service provider table 630 (FIG. 6).

After a transaction record or other user database table is updated (if applicable) at step 960, control passes to step 970, and a corresponding message relating to the response from the FSP is sent out to the process that initiated the communication, e.g. to the requesting user's mobile device. For example, if a payment instruction was received from a mobile user and that payment instruction was duly and timely processed by a selected FSP, a payment confirmation message is sent to the user's mobile device. In accordance with an exemplary aspect of the invention, messages of this type such as a confirmation message is in the form of a message passed to the MFTS mobile device communication interface 150.

Returning to step 915 in FIG. 9, if the FSP communication interface determines that an incoming message is from the FSP (as opposed to the mobile device communication interface or other task-initiating interface), control passes to step 920, where the message is processed and any response information from the FSP is received. After step 920, control passes to step 970, where information corresponding to the message from the FSP is forwarded to the intended destination, e.g. to the mobile device communication interface or to a web application interface that initiated a payment instruction.

After step 970, the process 156 loops back to step 910 to process another incoming message. From the foregoing, those skilled in the art will understand and appreciate how the FSP communication interface 156 is operative to process messages from various MFTS processes (such as from the MFTS mobile device communication interface 150), communicate relevant information to a selected FSP, receive a response message, update any corresponding transaction or user database records, and/or communicate appropriate return messages to a user's mobile device or other message-delivering source.

Turn next to FIG. 10 for a description of the web application interface software or routine 154 in accordance with an aspect of the invention. The web application interface 154 preferably runs as a continuous independent process on the MFTS server computer, asynchronous to other processes, and provides for handling of communications and messages between the MFTS 18 and users who access the MFTS via the Internet 120 using a web browser on a computer 140 (FIG. 2), as opposed to a mobile device. As will be understood by those skilled in the art, the web application interface serves as the main program loop for displaying an Internet-accessible web page (such as the User Site shown in FIG. 37) for user access to the MFTS 18 via the Internet to conduct transactions, view account history, add payees, add financial institutions and accounts, etc. It will be recalled from FIG. 3B that, in accordance with exemplary aspects of the invention, the web application interface 154 provides for several primary web-accessible functions including enrollment of a new user, editing a mobile client, editing credit card or banks accounts, adding a new payee or editing information about a payee, initializing a mobile client, unlocking a mobile client, and other operations.

Starting in FIG. 10 at step 1005, the first step taken by the web application interface software 154 is to initialize the interface so that it is ready to communicate with users via the Internet. Those skilled in the art will understand that such initialization operations entail initializing any associated hardware so that it can send and receive TCP/IP packets that are conventional for Internet communications. Control then passes to step 1010 where the process loops awaiting receipt of TCP/IP packet(s) from a web browser of a user or prospective user who navigates to the User Site. In response to receipt of packet(s), control passes to step 1015, where the packets are received and parsed to determine their contents.

After step 1015, control passes to inquiry step 1020, where in the inquiry is made whether the user sending the packets has been authenticated and established a communications session. If not, control passes to step 1025, where a login operation (i.e. user authentication and session establishment) is carried out, in the manner that will be known to those skilled in the art. If the user cannot be authenticated, other processes (not shown) are carried out to allow a new user to enroll or register, or the entity attempting to communicate with the MFTS is refused access (i.e. the packet(s) are ignored or dropped). If at step 1020 the user was previously authenticated in a prior operation and a session established, or after the login/authentication step 1025, control passes to step 1030 for display of appropriate information corresponding to the current status of the session.

Figure 37A:
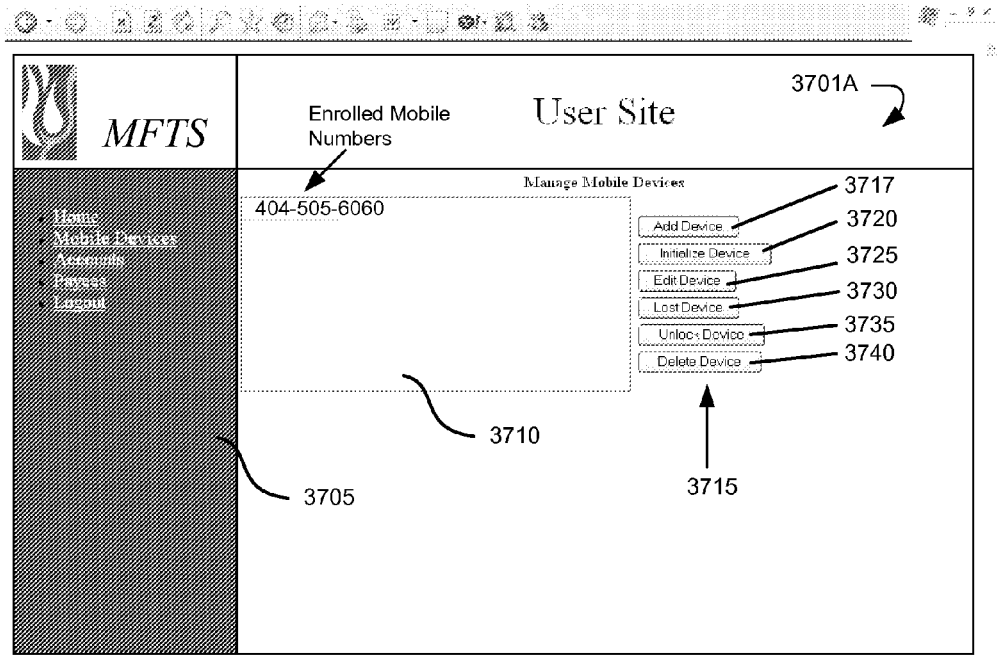
Figure 37B:
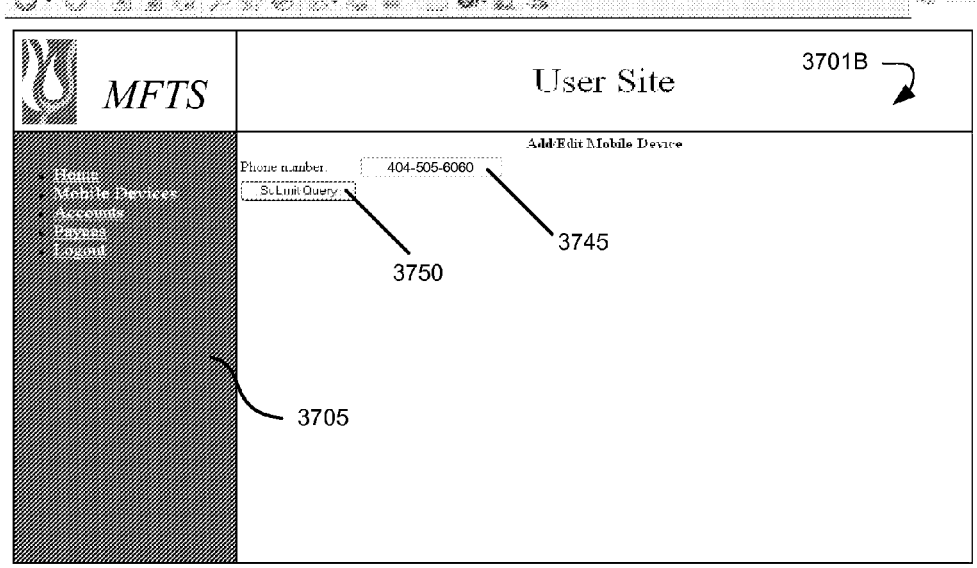

At step 1030, the web application interface 154 provides return packets to the user corresponding to display of a web page appropriate for the state of the current session with the user. For example, if the user is initially logging in for authentication, a conventional user login screen for entry of username and password (not shown) is provided. As another example, if the user is in the process of managing information about their mobile device, a User Site screen such as shown in FIG. 37A is displayed. As another example, if the user is adding or editing information about a mobile device, a User Site screen such as is shown in FIG. 37B is displayed.

After the display step 1030, control passes to step 1040, where the interface receives and processes any packet(s) that include information input by the user in response to the displayed web page. Afterward, at step 1045, the interface stores any received information from the user and generates any message(s) that would be required for delivery to other processes or interfaces in the MFTS 18. For example, the user's input may require updates to certain tables in the user database 158, or may require generation of a payment instruction or a "View Bills" command that requires a communication to a financial service provider 30.

Control then passes to step 1050, where the interface determines if any messages have been received from any process or interfaces in the MFTS. For example, if the user's input required generation of a payment instruction or a "View Bills" command that required a communication to a FSP, a return or response message will eventually be returned to the web application interface containing the requested information. If such a message is received, control passes to step 1055, where the message is processed, which may include updating the web page with any information in the received message. From step 1050 (if no message from another process has been received) or from step 1055 (after processing any message), control returns to step 1010 to await further user web application interaction, i.e. receipt of additional packets.

From the foregoing, those skilled in the art will understand and appreciate how the web application interface 154 is operative to process web interactions from users via the Internet or from other MFTS processes.

As will be recalled from the discussion above, the web application interface 154 provides for several web-accessible functions such as enrollment of a new user, editing a mobile client, editing credit card or banks accounts, adding a new payee or editing information about a payee, initializing a mobile client, unlocking a mobile client, and other operations. One of these exemplary functions is the enrollment of a new user, i.e. a person must be registered or enrolled to use the service provided by the operator of the MFTS. According to an aspect of the invention, a new user can access the MFTS 18 via the Internet and provide information to the system for enrollment for service.

Turn in this regard to FIG. 11 for a discussion of a web application 1100 for enrolling a new user to use the MFTS 18 in accordance with exemplary aspects of the invention. The new user web application 1100 is exemplary of a process that is subsidiary to the general web application user interface 154 of FIG. 10, in that the process of FIG. 11 utilizes the web interface 154 for interactions with the user via the Internet, but the steps of FIG. 11 are specific to the process of enrolling a new user. Specifically, it will be understood that a new user will not pass the authentication step in FIG. 10, and will typically be presented with a "new user" web page that includes controls that allow a user to input personal information and configure an account.

Starting at step 1105 in FIG. 11, the MFTS generates an "enroll new user" web page (not shown) that includes information needed by the new user and provides for controls and data entry fields for entry of information required by the MFTS to enroll a new user. At step 1110, the new user enters information prompted on the "enroll new user" web page, for example, name, address, telephone number, email address, and other information. The enrolling user must also enter certain information about billing entities (i.e. payees), financial institutions or financial service providers (FSP) 30 with whom the new user maintains a relationship and accounts, and information about specific accounts maintained with such financial institutions or FSPs that can be selected as a payment source. At step 1115, the system test for a user command to edit information about a billing entity or a payment source. If the command is associated with a billing entity, control branches to step 1120, where the system tests for a command to enter a new billing entity or to edit information about an existing billing entity (for example, if one or more billing entities have already been entered for this enrolling new user at this point in the processing).

At step 1120, if a command has been received to enter information about a new billing entity, control passes to step 1125 for receipt and storage of information about new billing entity or payee. It will be understood that information about a billing entity is stored in the payees table in the user database 158 (see FIG. 6). If no command is received to enter information about a new billing entity, control passes to step 1130 to test for a command to edit an existing billing entity. At step 1130, if a command has been received to edit information about an existing billing entity, control passes to step 1135 for receipt and storage of edited information about the existing billing entity or payee. Upon completion of any billing entity input or editing, control passes to step 1160 and either loops back to step 1115 or tests for user logout.

Returning to step 1115, the system tests for a user command to edit information about a billing entity or a payment source. If the command is associated with a payment source such as a financial institution or financial service partner, control branches to step 1140, where the system tests for a command to enter a new payment source or to edit information about an existing payment source (for example, if one or more payment sources have already been entered for this enrolling new user at this point in the processing).

At step 1140, if a command has been received to enter information about a new payment source, control passes to step 1145 for receipt and storage of information about new payment source. It will be understood that information about a payment source is stored in the user financial accounts table and/or the financial service provider table in the user database 158 (see FIG. 6). If no command is received to enter information about a new payment source, control passes to step 1150 to test for a command to edit an existing payment source. At step 1150, if a command has been received to edit information about an existing payment source, control passes to step 1155 for receipt and storage of edited information about the existing payment source. Upon completion of any payment source input or editing, control passes to step 1160 and either loops back to step 1115 or tests for user logout.

Turn next to FIG. 12 for a discussion of a registered user web application 1200 that allows a registered or enrolled user to access and use the MFTS 18 in accordance with exemplary aspects of the invention. The registered user web application 1200 is exemplary of a process that is subsidiary to the general web application user interface 154 of FIG. 10, in that the process of FIG. 12 utilizes the interface 154 for interactions with the user via the Internet. However, the steps of FIG. 12 are specific to the process whereby a registered user uses the Internet to add or edit information about billing entities or payees, and/or information about payment sources. Specifically, it will be understood that a registered user will log in and be authenticated at the authentication step in FIG. 10, and will typically be presented with a registered user web page that includes controls that allow a user to input and edit information about billing entities and payment sources. Thus, at step 1205, the registered user first logs in to the web application and provides his or her login and password information, and is presented with a "registered user" web page containing information specific to the billing entities and payment sources associated with that registered user.

It will be appreciated from reviewing FIGS. 11 and 12 that the overall structure of the processes 1100 and 1200 are similar. Accordingly, those skilled in the art will understand and appreciate that the remaining steps in FIG. 12 are similar to those in FIG. 11 and need not be discussed further herein.

Mobile Device Operation

FIG. 13 and the figures that follow accompany the following discussion of exemplary display screens generated on a mobile device 15 by a mobile client application, in connection with viewing payment sources and account balances, in accordance with exemplary aspects of the invention. Before the presentation of exemplary sequences of screen views of a mobile device 15, it should be noted that in the drawings which follow, a payer's view is represented by a rectangular screen view with four rounded corners, while a payee's view is represented by a rectangular screen view with four square corners. A payee's view is provided in connection with certain payment sequences and methods in aspects of the invention, for example certain types of "PayAnyone" payments involve sending a message to a user of a mobile phone (a second user, a user other than the user who is making the payment), display of a text message, and (if selected) downloading of the mobile application into the second user's mobile device. Such payee views have the squared corners in the drawing figures.

It will be understood that different mobile devices typically have different screen appearances, different screen sizes, different screen layouts and fonts, etc. However, the main messages for display are presented in the following drawings. The message texts, fonts, lines of text display may vary depending on the mobile devices. Alternative embodiments will become apparent to those skilled in the art.

Viewing, selecting a payment source, and viewing the account balance of each available account are basic functionalities of the MFTS mobile application.

It will also be understood from the following description that various methods for selecting a payee (e.g. select payee by name, select by mobile phone number, etc.) are contemplated in various aspects of the inventions, that various methods for communicating the fact of a payment to a payee (e.g. by text message, by display of a message on a payee/user's mobile device, etc.) are contemplated in various aspects of the inventions, that various methods for effecting the payment (e.g. paper check, ACH transfer, stored value card, etc.) are contemplated in various aspects of the inventions, and that various methods for selecting an applicable payment method (e.g. payer selects, payee selects) are contemplated in various aspects of the inventions. Those skilled in the art will therefore understand and appreciate that the foregoing various aspects may be combined in various ways to provide flexibility and choice in payee identification and selection as well as payment method selection, as will be described in connection with the various exemplary mobile device user screen views for various embodiments and aspects of the inventions.

Mobile Device Operation—Viewing Payment Sources and Account Balances

Referring now to FIG. 13, a series of user screen views 1300 of a mobile device as the user views the Payment Sources (PS) is presented according an exemplary aspect of the invention. Typically, a user is presented with a selection screen on their mobile device, for example screen 1302, allowing selection of an application for execution on the mobile device. As shown in the screen view 1302, "Mobile Wallet" is one of the options of applications. The user can use a stylus, multifunction button, trackwheel, or other navigation input device or control to highlight the selection, or use the numeric keypad to make the selection by numeric entry. For example, the user can use arrow keys on the mobile device to navigate and highlight the "Mobile Wallet" and press "Select" Key to go to the "Mobile Wallet" application. Alternatively, the user may press the numeric "1" key to go directly to the "Mobile Wallet" application.

It should be understood that a similar entry and selection mechanism, as described for selecting an application, is used for selection of data items on the various mobile device display screens in the several views discussed. These details will not be repeated to avoid needless repetition.

In response to selection of the Mobile Wallet application in screen 1302, a login screen 1304 is displayed. In this screen, the user is prompted to enter a predetermined number of digits as a PIN or pass-code to enter the "Mobile Wallet" as a security measure. In alternative embodiments, a login screen 1304 or equivalent functionality can be placed at other locations of the screen or in other situations, as when a user turns on the mobile device, chooses applications, selects "Mobile Wallet", views bills, pays bills, or other appropriate location and/or circumstance. In the descriptions of other drawing figures of other payment scenarios, the application selection screen 1302 and login screen 1304 are omitted, but it will be understood that such functionality can be provided if desired.

In response to entry of a valid login or PIN, screen 1306 is displayed on the mobile device. This screen 1306 preferably comprises a menu of available options of the Mobile Wallet application according to an exemplary aspect of the invention. In this embodiment, the available applications include: (1) View Payment Sources, (2) View Bills, (3) Pay Bills, (4) "PayAnyone", (5) Balance Transfer, and (6) Change PIN. Other functions can also be provided for selection here for various embodiments or implementations.

When the user highlights the "View Payment Sources" option and presses the "Select" button or enters "1", a new screen view 1308 displaying one or more registered payment sources available to the user is shown. A scrolling bar (not shown) may be included on the screen if the screen is not large enough to display all payment sources. The user activates a navigation tool to highlight a payment source and presses "Select" to select a particular payment source. Selection of a particular payment source results in a display of information 1310 relating to the selected payment source, for example the balance(s) of various accounts of the user. For example, screen 1310 shows a current balance, available credit, and available cash advance amount for the user, in connection with the financial service provider's logo to facilitate brand recognition. Display of the financial institution's logo is optional; some model mobile devices may not have graphic capability and may only display the name of the payment source rather than the logo.

Screen 1310 also shows exemplary "Back" and "Next" keys or buttons on the screen view that may be used to navigate the available payment sources. When the "Next" key is pressed, other payment source views, for example screens 1312, 1314, and 1316 are displayed in a sequence, until a "Select" key is pressed. In this example, the Discover Card is displayed as selectable payment source as shown in screen view 1312. Other selectable payment sources "Georgia Savings & Loans" and "Bank of USA" are displayed in screen views 1314, 1316 respectively. The account balances and other related information of these payment sources are also displayed with these screen views.

According to an exemplary aspect of the invention, the balances available to the user are retrieved from by the MFTS 18 during a communication session between the MFTS 18 and the mobile device 15, so that real time (when mobile device is within the range of wireless service) account balances are displayed to the user, the last known balance stored in the memory of the mobile device may be displayed. It will be appreciated that as the user is viewing the payment sources and their account balances in the various payment sources screens 1300, the mobile device 15 is communicating with the MFTS 18 and receiving real-time balance information from the corresponding financial institutions. According to another exemplary aspect of the invention, in the event that wireless signal is not available to the mobile device, or MFTS 18 is unable to communicate with a particular financial service provider/payment source 30, the last (most recent) balance information, will be pulled from the mobile device 15, as such information is cached in local memory of the mobile device. In the event that the mobile client retrieves the balance from offline storage, the date/time of the last successful request to the server will be displayed.

Still referring to FIG. 13, in accordance with an exemplary aspect of the invention, the mobile client application is configured so that one particular payment source is automatically selected as a default payment method, for use automatically and by default by the user unless overridden. Screen 1318 reflects selection of a particular payment source (e.g. Bank of USA) as a default payment source. Thus, when the "Select" key is pressed as shown in screen view 1316, the user elects the specific payment source displayed on the screen as a default payment method. In screen 1316 the default payment source selected is "Bank of USA". Screen 1318 preferably provides a prompting message "Use as Default Payment Source?" for confirmation by the user. Other payment sources, such as different credit cards, are also available for selection as the default payment source. Preferably, the selected default payment source will remain until it is changed by the user upon a subsequent execution of the View Payment Sources screen 1308. According to a variation of this aspect, the system also includes code for the mobile application and/or the User Site that allows a user to change the default payment method on the fly.

According to an aspect of the invention, the user's selection and activation of a View Payment Sources command on the Mobile Wallet application causes the generation of a mobile payment instruction to the MFTS, which responds by requesting real time updated account balance information from the payment sources available to the user and provides such updated account balance(s) to the user's mobile device. It will be appreciated that such updated account balance information includes all types of payment sources including bank accounts, credit cards, credit unions, or any other financial account that can be accessed by a system and with methods as described herein.

FIG. 14 is a sequence diagram illustrating a method 1400 for viewing payment sources and account balances according to one exemplary aspect of the invention. In FIG. 14 and other sequence diagrams, it will be understood that the oblong objects across the top of drawing represent entities that communicate electronically via the exchange of signals, messages, data packets, TCP/IP, etc.; that the rectangular boxes along a line extending vertically downwardly from a communicating entity represent steps taken by that entity; that lines with arrows extending between rectangular boxes represent communications directed from one entity to another entity; and that time proceeds in a direction from top to bottom of the drawing figure. This convention is utilized in all sequence diagrams illustrating embodiments and aspects of the invention, unless otherwise noted.

Several entities are illustrated in FIG. 14: a user's mobile device 15, the MFTS server 18, and various financial institutions (FI) with which a user 12 (not shown) has business relationships such as (FI-1) 30A and (FI-N) 30N. Usually, communications between the mobile device 15 and the MFTS 18 are provided by a wireless carrier network, not separately shown in the drawing. Communications between the MFTS 18 and a payee, or a payee's financial institutions, or any third party service providers, are typically provided by a telecommunication network, an Internet service provider, a dedicated communication path, or any other available secure communication networks, although not separately shown in the drawing.

Starting in FIG. 14 at step 1402, the user opens a "Mobile Wallet" application on the mobile device 15; he/she is preferably required to log in by providing a password or PIN for verification as indicated at step 1404. The password or PIN is entered by the user, is validated locally and the signed, encrypted messages are sent to the MFTS for authentication via an authentication message (AM) 1406. At step 1408, the MFTS 18 validates the login and allows the Mobile Wallet application to execute, for example, by providing a communication or authentication confirmation message (ACM) 1410 back to the mobile device 15 that includes a signal or validation code that allows the Mobile Wallet application to execute on the mobile device 15. If the user enters an incorrect password or PIN a predetermined number of times in a row, preferably he/she is denied service and the mobile device is locked. In this case the user is required to take steps (not shown) to access the User Site 153 or contact a customer service representative to unlock the mobile device.

If password or PIN is entered correctly, the authentication confirmation message 1410 from the MFTS 18 informs the mobile device 15 that the login is valid and launches the "Mobile Wallet" application on the mobile device 15, as shown at step 1412. At step 1414, the user is presented with a screen (e.g. FIG. 13) that allows viewing and selection of payment sources and account balances.

Also at step 1412, the user can make a selection on screen 1306 (as shown in FIG. 13) to View Payment Sources. According to one exemplary aspect of the invention, the MFTS 18 automatically retrieves account balances for various payment sources (and retrieves bills to be paid), upon login at step 1412. According to another exemplary aspect of the invention, the MFTS retrieves such information in response to specific activation of the corresponding function, e.g. selection of View Payment Source (screen 1306 in FIG. 13) sends a message to the MFTS to cause retrieval of payment source information such as account balances, and selection of View Bills (also screen 1306) sends a message to cause retrieval of payments to make.

In an exemplary embodiment, the mobile device 15 communicates a request to view payment sources and account balances to the MFTS 18, and the MFTS corresponding interacts with the available payment sources to retrieve their respective account information as shown at step 1418 by sending out requests 1420A or 1420B to their corresponding financial institutions 30A, or 30B. In accordance with a preferred embodiment of certain inventions, real-time information of all payment source accounts available to the user is collected and sent back to the MFTS as shown at steps 1422 and 1424 through messages 1426 and 1428. Although only two financial institutions are shown in FIG. 14 for illustration purposes, it will be understood that the system is operative to communicate with some or all available and registered financial institutions associated with the user.

At step 1430, the MFTS 18 collects and accumulates account balance information from the various financial institutions associated with the user, and sends one or more messages 1432 containing this information to the mobile device 15. According to one aspect of certain inventions, a collection of account balance information is accumulated and communicated to the mobile device in a single communication. According to another aspect, account balance information for a particular financial institution is communicated to the mobile device as quickly as possible after it is received, as the various systems of financial institutions are independent and operate asynchronously with respect to other systems.

At step 1434, upon receipt of the account balances from financial institutions, information of all registered accounts is provided for the user to view. He/she can then use the navigation controls to view selected payment sources and account balances. The user can also perform other functions such as selecting a default payment method as described in connection with FIG. 13.

According to an exemplary aspect of the present invention, after the user enters a valid password or PIN, the login is validated by the MFTS system 18. At this point, the MFTS can start to gather information for the user prior to the selection of any Mobile Wallet options. In one embodiment, the MFTS system 18 sends out balance requests to part or all of user's billing entities to retrieve up to the minute balance information from these billing entities. In another embodiment, the MFTS system 18 sends out payment source information requests to part or all of user's financial service providers to retrieve up to the minute (real time) balance information from these entities. These operations are completed before the user even starts to make any Mobile Wallet selections. The information retrieved from the billing entities and financial service providers is stored (cached) in a temporary database or memory in the use's mobile device, and/or is cached in the MFTS system. The user is likely to make some selection of the mobile wallet operation after he/she logs into the mobile wallet. When he/she makes any selection of the mobile wallet operation such as view bills, view payment sources, etc., the user will receive updated information from the temporary database or cache in the MFTS system immediately. Therefore the MFTS provides a prompt response to the user with information received prior to the user's selection of the mobile wallet operation. It will be appreciated that an advantage of this approach is a quick response and virtually "real time" updating of account balance information in a user's mobile device.

Viewing Bills

FIG. 15 is a series of user screen views 1500 of a mobile device as the user views bills to pay according aspects of the invention. The user has at least two ways to view his/her bills according to such aspects. A first method 1500a start with user activation of the "Mobile Wallet" application and a second method 1500b starts with receipt of an SMS text message from the MFTS 18.

The first method 1500a starts at screen 1502. When the user uses the "Mobile Wallet" application to view the bills, he/she selects the "Mobile Wallet" option from the mobile device screen view 1502 and is presented with a login screen view 1504. After the user logs in and provides a valid password (or is otherwise authenticated to the mobile device 15), he/she is presented with a number of choices as shown in screen 1506, e.g. View Payment Sources, View Bills, Pay Bills, etc, "PayAnyone", Balance Transfer, Change PIN, etc. In accordance with this exemplary aspect of the invention, the user selects the "View Bills" option or presses the numeric key "2". In response to selection of the View Bills option by either method, the user is presented with a View Bills screen 1512.

According to another aspect, a second method 1500b involves receipt of an SMS text message, instead of in response to user activation of the mobile wallet application. Screen 1522 shows an exemplary text message display screen that includes a number of text messages that the user has received, e.g. Power Bill Due, Get Milk & Juice, Gas Bill Due, Phone Bill Due, etc. In this example, several of the SMS messages in the user's text message display screen relate to payment of bills, but not all messages are bill payment related. As is known, a user may receive a number of different text messages relating to a number of different subjects. In accordance with certain aspects of the inventions, the receipt of an SMS message relating to payment of a bill can prompt the user to activate the Mobile Wallet application, or the reading of an SMS message relating to a bill due can activate the Mobile Wallet application, or the receipt of an SMS message containing predetermined codes can automatically activate the Mobile Wallet application under certain predetermined circumstances.

In accordance with one exemplary aspect of the invention, a bill aggregator (e.g. an operator of a bill presentment system 190 as shown in FIG. 2) receives a number of bills to pay on behalf of a user, and presents information regarding those bills to the user via a text message, so that the user is notified that a new bill has been received and can obtain more information about the bill, or can activate the Mobile Wallet application to pay the bill. In accordance with this exemplary aspect of the invention, when a new bill is received at the MFTS server from a bill presentment system, the user is notified by a short text message. This short message is preferably brief and only informs the user that a new bill has arrived. In one embodiment, the message is limited to the name of the billing entity (e.g. power company, gas company, etc.), the total amount due, and the due date. Other information may be provided in the SMS message, if desired, but in accordance with this exemplary aspect of the invention the information is limited to the foregoing information so that the user may quickly and efficiently be notified of only the most important information.

In the example of FIG. 15, assume that the user has selected the message Power Bill Due, as shown at screen 1524. When the "Read" key is pressed, in accordance with this exemplary aspect of the invention, a text message relating to a bill to pay (e.g. "XXX Bill Due") is automatically detected by the mobile application as relating to a bill to pay and launches the Mobile Wallet application on the mobile device. In response to launching of the Mobile Wallet application, the user is presented with a login screen 1526 to allow user to enter a password or PIN. After the user logs in and provides a valid password (or is otherwise authenticated to the mobile device 15), he/she is presented with the View Bills screen 1512.

Either of methods 1500a, 1500b lead to the View Bills screen 1512. Due to the limited size of the mobile device screen, it will be understood that content of the "View Bills" screen is not as detailed as paper version of bills that users receive regularly. However, in accordance with exemplary aspects of the invention, some or all of following information are displayed in some embodiments of the invention: (1) the name of the billing entity; (2) the date when the bill was received; (3) the amount due, and (4) the due date. Other related information such as minimum payment amount, outstanding balance, billing cycle, last payment amount and date etc. may also be displayed depending on the size of the mobile device screen. An optional scrolling bar may be added for a larger display.

Display screens 1512, 1514, 1516 illustrate a succession of different bills that user sees when using the navigation controls (e.g. the Next button), to cause display of bills that can be paid in accordance with exemplary aspects of the invention. When the user presses the "Next" key as shown in mobile device screen view 1512, the next bill is shown in the next mobile device screen view 1514. The user may use the "Back" and "Next" keys to view each individual bill until the "Select to Pay" key is pressed as shown in mobile device screen view 1516.

FIG. 16 is a sequence diagram illustrating a method 1600 for viewing bills according to an exemplary aspect of the invention. The method or process 1600 involves communications or messages between a mobile device 15, the MFTS 18, and at least one billing entity. In accordance with a currently contemplated best mode, a bill presentment system 190 receives bills from a number of different billing entities on behalf a user, and provides information to the MFTS 18 relating to a plurality of bills from a plurality of billing entities. FIG. 16 therefore illustrates this mode or embodiment, but it will be understood and appreciated that the MFTS 18 may communicate separately and independently with billing entities, without requiring that all bills or payments to make be provided by a bill presentment system 190.

In one preferred embodiment, the user views bills by opening his/her/mobile device's mobile wallet option as shown in step 1612. In accordance with an alternate exemplary aspect of the inventions, a billing entity provides information to a bill presentment system 190, as shown at step 1602. The bill presentment system 190 communicates a message 1606 to the MFTS 18 as shown at step 1604. At step 1608, the MFTS 18 sends a short text message (SMS) 1610 containing selected abbreviated information to the user through the SMS generator 151 (FIG. 2) and wireless network service provider 110. As discussed earlier, the user opens the Mobile Wallet or reads the text message when it is convenient to him/her as shown at step 1612. He/she is prompted to login and the password or PIN is validated step 1614. In response to validation by the mobile application of the user via login of password or through other authentication means, the mobile application sends an authentication message (AM) 1616 to the MFTS 18. At step 1618, the MFTS 18 validates the login from the authentication message 1616 and communicates an authentication confirmation message (ACM) 1620 back to the mobile device 15 that allows the Mobile Wallet application to execute. At step 1622, the mobile device opens the Mobile Wallet application, which allows the user to view more detailed information about a bill to pay or payment to make. At step 1624 the user selects the "View Bills" option (a shown and described in connection with FIG. 15). At step 1626, the user selects one bill to view. In response to selection of a bill to view, the mobile device 15 communicates a request message 1628 to the MFTS 18 to request information relating to the selected bill.

At step 1630, the MFTS 18 receives the request for information relating to the selected bill and generates a message 1632 to the bill presentment system 190. At step 1634, the bill presentment system retrieves information relating to the selected bill (or optionally, for one or more bills associated with the particular user) and retrieves detailed billing information. Preferably, therefore, all bills associated with the user are forwarded to the MFTS via a message 1636. At step 1638, the MFTS 18 receives the detailed billing information from the bill presentment system 190 and stores the detailed billing information in the MFTS database in a table of detailed billing information (see FIG. 6). The MFTS 18 then prepares a message 1639 with selected reduced information appropriate for the mobile device (i.e. a subset of detailed billing information) and forwards the message containing a subset of the detail billing information to the user's mobile device 15. At step 1640, the user views his/her due bills, via screens as shown in FIG. 15.

Although FIG. 16 shows a sequence of steps for obtaining bill information from a bill presentment system, it will be understood that the steps are similar for obtaining information from a billing entity independently. From the foregoing, it will be appreciated that an aspect of the present invention involves a method for obtaining selected reduced information relating to payments to make (bills to pay) and this information is obtained from one or more billing entities, either independently or from a bill presentment system 190.

Paying Bills

FIG. 17 is a series of user screen views 1700 of a mobile device that relate to a user paying his/her bill(s). As in other aspects of the invention described elsewhere, a user is preferably required to activate the Mobile Wallet application on their mobile device and be authenticated (i.e. log in) for use of the application on that particular mobile device. Thus, screen 1702 shows a number of selectable applications such a Mobile Wallet, Download Music, Games, etc., and screen 704 shows a login screen that is generated upon initial execution of the Mobile Wallet application upon selection in screen 1702. After the user logs into the "Mobile Wallet" application as shown as screens 1702, 1704, a Mobile Wallet screen 1706 is displayed. In accordance with exemplary aspects of the invention, the Mobile Wallet screen includes a number of selectable options that provide for various functions relating to mobile financial transaction viewing, monitoring, and payment. For example, screen 1706 shows options for View Payment Sources, View Bills, Pay Bills, "PayAnyone", Balance Transfer, and Change PIN. In accordance with the aspect of paying bills, the Pay Bills option is shown highlighted (selected), indicating that the user has elected to activate the Pay Bills function of the mobile application. The user can activate this function by selecting Pay Bills from the menu on screen 1706 or may press the "3" key on the keypad. In response, the Mobile Wallet application presents a display screen Pay Bills as shown at 1708.

In accordance with exemplary aspects of the invention, the Pay Bills screen 1708 provides a list of selectable pending bills. In one embodiment, the list can be arranged so that the latest bill is listed at the top and oldest bill is listed at the bottom, as shown in screen view 1708. Other arrangements such as the oldest bills are listed first can also be implemented. According to one exemplary aspect of the invention, and as shown in screen 1708, when the "Pay Bills" function is selected, the oldest bill is automatically highlighted for the user to pay first, e.g. "Phone Bill Due Nov. 17, 2005 $34.45". In this as in other exemplary aspects of the invention, a user navigates the list by using up and down navigation controls and selects the one that he/she wishes to pay by pressing the "Select" Key when an appropriate bill is highlighted.

In response to selection of a particular bill, information about the selected bill is displayed to the user, as shown in screen 1710. In accordance with exemplary aspects of the invention, selected information relating to the selected bill is displayed, for example the name of the billing entity, the date the bill was received, the amount of the bill, optionally a minimum payment, and the due date, as shown in screen view 1710. Optionally, but not shown in screen 1710, the overall balance due on an account may be shown. The exemplary screen 1710 also preferably includes a Pay, Back, and a Next button as navigation controls that permit viewing other bills in a sequential list of bills. As will be appreciated, the Pay button or control is used to pay the bill currently on display.

According to exemplary aspects of the invention, when the "Pay" key is pressed, the Mobile Wallet application provides a screen view 1712 that allows the user to select the amount to pay. In a preferred embodiment, the user is offered following options: (1) to pay the minimum amount due; (2) to pay the full amount due; or (3) to pay a user specified amount. The first two options are self-explanatory and lead to proper payment based on the information on the record. The third option provides the user with flexibility to specify a desired amount. If the third option is selected, the Mobile Wallet application provides a screen view (not shown) that allows entry of a desired amount to pay. The exemplary screen 1712 also preferably includes a Pay, Back, and a Next button as navigation controls that permit viewing other bills in a sequential list of bills, or proceeding with payment of the selected bill. As will be appreciated, the Pay button or control is used to pay the amount currently selected.

Continuing with screen 1712, when the user has decided the amount to pay and the "Pay" key is pressed, a screen view 1714 is displayed that shows a default payment source (Bank of USA, in this case) and its related information. In the exemplary screen 1714, the default payment source Bank of USA has three selectable accounts, e.g. a Savings Balance, a Checking Balance, and Other (e.g. a money market account or perhaps a borrowing account). According to an exemplary aspect, a particular default account is shown highlighted (e.g. the Checking Balance), to indicate to the user that the Checking Account for this payment source is the default payment source that will be utilized unless overridden by the user by other means.

According to an exemplary aspect of the invention, the screen 1714 further includes text prompting the user to confirm the currently displayed default payment source, e.g. the text reads "Pay with default payment source?" If the user presses the "Select" key in screen view 1714, indicating confirmation that the current bill is to be paid with the default payment source, then the Mobile Wallet application generates a screen view 1716 that includes information confirming the payment and updating the payment source information. At this point, the user can either press the "Done" button to complete the mobile payment transaction or press "Next" to make other payments. In accordance with exemplary aspects of the invention, the amount of the current payment ($34.45 in the example shown) is subtracted from the balance shown on the default payment source (the Checking Balance), so that the user's payment source information is instantaneously updated to reflect the payment (i.e. the Checking Balance is reduced by $34.45, as shown between screens 1714 and 1716. This occurs in exemplary embodiments even though the amount of the bill has not yet actually been debited from the user's bank account.

FIG. 18A is a sequence diagram illustrating a method 1800 for paying a bill according to a preferred embodiment of the present invention. The method or process 1800 involves communications or messages between a mobile device 15, the MFTS 18, at least one billing entity (e.g. a bill presentment system 190 or a separate billing entity), and a selected financial institution 30 that serves as a selected payment source (PS). In this example, the user's default financial institution (FI) 30A is described as the selected payment source.

It is assumed in FIG. 18A that the user has previously viewed payment sources and account balances, and has selected a particular bill to be paid. Thus, the initial step of the process 1800 is step 1802, where the user has received information about all bills to pay and is ready to select a particular bill to pay, e.g. via screen 1708 in FIG. 17. When the user is ready to pay a bill, at step 1804 he/she selects a particular bill to pay. As shown in the exemplary screen views 1712 and 1714, the user selects a payment source and decides/enters an amount to pay in the step 1806. In response to entry of an amount to pay, a mobile payment instruction (MPI) message 1808 is communicated from the mobile device 15 to the MFTS 18 that includes the desired amount and identifies the financial institution selected for making the payment. At step 1810, the MFTS 18 receives the MPI message, and prepares an MFTS payment instruction (MFTSPI) message 1812 to the selected financial institution 30A. The MFTSPI message 1812 is preferably an inquiry message to the financial institution to verify whether the selected payment source has sufficient funds for making the payment, and/or an instruction to make the payment if sufficient funds are available.

Further at step 1814, the MFTSPI message 1812 is communicated to the financial institution 30A, and received at step 1814. If sufficient funds are not available to cover the payment, the FI 30A generates and communicates a reply message 1816' (not shown) to the MFTS 18 to advise that funds are not available and in turn, the MFTS sends an acknowledgement message (not shown) to the user that the requested payment failed. Otherwise, the FI prepares a funds available message (FAM) 1816 indicating that sufficient funds are available and transmits this message to the MFTS. At step 1818, the MFTS 18 receives the funds available message and prepares a corresponding funds available message 1820 to the mobile device 15 that permits the Mobile Wallet application to proceed with generating a payment instruction message. This funds available message is received at the mobile device at step 1822, where the Mobile Wallet application proceeds with processing the payment. Step 1822 includes actions such as generating a payment confirmation display for the user, e.g. screen 1714 (FIG. 17), which requests that the user confirm "Pay with default Payment Source?" It will be of course appreciated that the user could decline payment with the default payment source and use the navigation controls to select a different payment source, in which case further and correspondingly appropriate messages from the Mobile Wallet application are generated and returned to the MFTS 18.

In response to the user confirmation of the payment source, e.g. via confirmation of the default payment source, the Mobile Wallet application generates and transmits a message 1824 indicating confirmation of the payment to the MFTS 18. The payment confirmation message from the mobile device 15 is received at the MFTS 18 at step 1826. At step 1826 the MFTS 18 receives the confirmed payment instruction from the mobile device 15 and constructs a payment source payment instruction message 1828. According to an exemplary aspect of the invention, as shown in FIG. 18A, a payment source payment instruction message 1828 is communicated to the bill presentment system 190. In the event of utilization of a bill presentment system 190, at step 1830 the system 190 receives the payment source payment instruction 1828, generates a corresponding payment instruction message 1832 to the financial institution 30A, and processes the payment internally, e.g. by clearing the bill due from the user's queue of unpaid bills.

At step 1834 the financial institution 30A receives the payment source payment instruction, from a bill presentment system 190 and responds accordingly. As will be appreciated, the financial institution takes steps internally to withdraw funds or enter a debit on behalf of the user from the selected account, and generate an appropriate payment instrument to the billing entity. The generation of an appropriate and selected payment instruction, for example a paper check, an ACH funds transfer, a stored value card, etc. is described elsewhere herein.

Upon completion of appropriate steps to generate and transmit a payment to the billing entity at step 1834, a payment confirmation message 1836 is generated by the financial institution 30A and transmitted to the Bill Presentment System 190. At step 1831, the Bill Presentment System 190 receives the payment confirmation message, clears the bill on record, generates a mobile payment confirmation message 1837, and communicates this message 1837 to the MFTS 18 as shown in step 1838. The MFTS 18 receives the confirmation message 1837 and forwards another confirmation message 1840 to the mobile device 15. At step 1842, the mobile device 15 receives the mobile payment confirmation message 1840 and displays payment confirmed information, e.g. display screen 1716 in FIG. 17.

Referring now to FIG. 18B, an alternate embodiment of the present invention is shown. Here the steps/messages 1802 through step 1826 and the step/message after 1838 are the same or similar to the steps/messages shown in FIG. 18A. At step 1826 the MFTS 18 receives the confirmed payment instruction from the mobile device 15 and constructs a payment source payment instruction message 1828'. A payment source payment instruction message 1828' is communicated to the bill presentment system 190. In the event of utilization of a bill presentment system 190, at step 1830' the system 190 receives the payment source payment instruction 1828', generates a corresponding payment instruction message 1832' to the financial institution 30A, and processes the payment internally, e.g. by clearing the bill due from the user's queue of unpaid bills.

At step 1834' the financial institution 30A receives the payment source payment instruction, from a bill presentment system 190 and responds accordingly. Upon completion of appropriate steps to generate and transmit a payment to the billing entity at step 1834', a payment confirmation message 1836' is generated by the financial institution 30A and transmitted to the MFTS 18.

From the foregoing, it will be appreciated that variations on the above-described process will occur to those skilled in the art.

PayAnyone Payment Method

FIG. 19 and FIG. 20 illustrate exemplary display screens on a mobile device 15 of a user/payer and a second user/payee, respectively, in connection with a "PayAnyone" payment process. A "PayAnyone" payment process is a payment method for paying an entity other than a user's preregistered regular billing entities or service providers. Examples include making payments at point of sale, with the identity of the payee determined at the time of making the payment; making a payment to an individual that possesses a mobile device capable of running the Mobile Wallet application (but perhaps not yet downloaded and operational); making a payment to an individual or other entity that does not possess a mobile device but requests a certain form of payment such as a paper check, electronic funds transfer, stored value card, etc. Numerous variations on the "PayAnyone" payment method will occur upon consideration of the following display screens and process steps.

It will thus be appreciated that certain options of the "PayAnyone" payment method contemplate payment to an entity that has registered with the MFTS 18, and other options contemplate payment to an entity that was not previously registered. The "PayAnyone" payment method allows users to send other registered or non-registered people payments as an alternative to cash. The method also contemplates making payments anywhere—at point of sale, locally, across country, and across national borders (of course within the confines of applicable currency regulations) without physically handling of cash or checks. The method also contemplates receipt of a payment by the recipient and relatively fast (virtually instant) availability of the funds.

Key issues in a "PayAnyone" payment method include (1) identification of a payee and (2) the manner and/or form of making the payment. According to one exemplary aspect of the invention, a user is given a choice of either selecting a payee from a list provided by the MFTS through the mobile device, or selecting/entering a payee by entering/selecting a mobile phone number associated with a payee. Similarly, and according to an exemplary aspect of the invention, there are several different ways for the payee to receive payments. For example, the user/payer can select a payment method from following payment methods: (1) "Recipient Defined", (2) "Bank Draft" (or ACH electronic transfer), (3) "Paper Check" and (4) "Stored Value Card". The "Recipient Defined" method allows the payee to choose one of the three remaining methods, i.e. "Bank Draft", "Paper Check" and "Stored Value Card".

It is to be noted that the payee selection and payment method selection are entirely independent. The following descriptions of preferred embodiments of a "PayAnyone" illustrate that various payee selections and payment method selections are contemplated as exemplary aspect of the inventions. For example, in FIG. 19 and FIG. 26, a payee is chosen by selecting a name from a list, while in FIG. 23 and FIG. 29, a payee is chosen by entering a payee's mobile phone number. In FIG. 19 through FIG. 31, all four different payment methods are discussed. Any combinations of payee selection and payment method selection are possible in light of the following teaching. The description of the exemplary embodiments of the invention has been presented only for the purpose of illustration and description and is not intended to be exhaustive or to limit the invention to the precise forms disclosed.

PayAnyone with Recipient Defined Payment Method:

FIG. 19 shows a sequence of payer's mobile device screen views 1900 as a user uses "PayAnyone" option, selects a name from a list, and uses a "Recipient Defined" payment method according to an exemplary aspect of the invention. Screens 1902, 1904, 1906 are exemplary screens for displaying selectable applications, login, and selection of Mobile Wallet applications that have been described elsewhere herein and will not be repeated. It will, however, be seen in screen 1906 that one of the selectable options is a "PayAnyone" option, shown highlighted and therefore selected. In response to selection of the "PayAnyone" option in screen 1906, in accordance with one exemplary aspect of the invention the user is presented with a short menu shown in screen view 1908 to allows selection of a payee by name or by mobile phone. In accordance therewith, the user can either select a payee's name from a list or select/enter a payee's mobile phone number.

In this example, assume that the user selects the "Paying by Name" option from the menu. In response to selection of this option, a screen is displayed on the mobile device comprising a list of pre-entered payees, e.g. screen 1910, with names Jane Bennett, John Doe, Robert Johnson, Carol Jones, etc. As shown in screen 1910, the payee name John Doe is shown highlighted and therefore selected for action. Information relating to the names on the list in the screen 1910 may be stored locally in the mobile device and/or in the MFTS 18 user database.

Although not discussed in connection with FIG. 19, it will be understood that that the user may select the "Paying by Mobile Phone" option in screen 1908 and enter a mobile phone number for a different form of payment, as discussed elsewhere herein.

As in other mobile device screen displays described herein, a scroll bar navigation control on the right of the display screen indicates that the name list is larger than the mobile device can display and allows scrolling down the list. Likewise, the user can activate the "Back" or "Next" keys or navigation control to navigate the name list and a payee is selected on the list by using a "Select" key.

Continuing with the example, in response to selection of a particular payee in screen 1910 (e.g. John Doe), a screen 1912 is presented that allows the user to enter an amount to pay. In the example, the user has entered $123.45. The user then presses the "Next" button, which results in a display screen 1914 that requests confirmation of the default payment source. At this point, the user can also use the "Back" key to make further changes or press the "Cancel" key to abandon the payment.

In response to user entry of an amount to pay, the Mobile Wallet application presents the exemplary screen view 1914, that, as in previous examples, permits the user to select an account from several available accounts of the default payment source. As in a previous example, the Bank of USA account is shown as a default payment source, and the checking account is shown selected/highlighted as the default account for use. After the selection of a particular account, the user presses the "Select" key to continue the process for making a payment.

In response to selection of an account in screen 1914, and according to one exemplary aspect of the invention, the user is presented with a display screen 1916 that allows selection of one of a plurality of different payment instruments or methods for making the payment to the payee. In this example, four choices are provided: (1) Recipient Defined, (2) ACH (e.g. bank draft), (3) Paper Check and (4) Stored Value Card. The user can use the "Back" and "Next" keys to navigate the menu and use the "Select" key to make selection of a particular payment method or instrument. In this example, the "Recipient Defined" payment method is chosen, i.e. the recipient can select the method of receiving payment when information relating to the payment is received by the payee. The selection by the payee of the payment instrument is described in connection with other figures, e.g. see FIG. 20. As will be seen in FIG. 20, the payee is given the choice of selecting from ACH, Paper Check, or Stored Value Card; such steps and displays for the recipient/payee are discussed in connection with FIG. 20.

Continuing with FIG. 19, in response to user selection of the payment method or instrument, the Mobile Wallet application generates a display screen 1918 that allows user confirmation of the payment. According to one exemplary aspect of the invention, the screen view 1918 displays a confirmation of the payment and the remaining balance of the payment source used in this transaction, for example, the Checking Balance of the default payment source is debited by the amount of the payment $123.45 from that shown in screen 1914. At this point, the user may press the "Done" button to finish the "PayAnyone" application, or the "Next" button to initiate another transaction.

Turn next to FIG. 20 for a discussion of the payee's view of the recipient defined payment method. It should be understood that the display screens shown in FIG. 20 assume that the payee/payment recipient possesses a mobile device that is capable of running the Mobile Wallet application, is configured for operation with a system and methods as described herein, and is a registered use of the MFTS 18. In the event that the payee/recipient is not so configured and registered, he or she may receive a text message (SMS) indicating that the payer wishes to make a payment, and providing instructions to the payee/recipient as to how to download and execute the Mobile Wallet application on his or her mobile device, or take other action to receive the payments. Discussion of such operations and features for a non-registered payee/recipient is provided elsewhere herein.

Generally, and according to one exemplary aspect of the invention, on the payee side, an SMS text message is received by the payee from the MFTS SMS generator 151 (FIG. 2). If the payee has the Mobile Wallet application installed on his/her mobile device, he/she can directly invoke the application while reading the SMS text message to receive the payment. Accordingly, FIG. 20 shows a sequence 2000 of user/payee's mobile device screen views in response to receipt of messages and communications generated by a user/payer that has invoked a "PayAnyone" option, selects a name from a list, and uses a "Recipient Defined" payment method.

Display screen 2002 is an exemplary mobile device display that a payee sees in response to receipt of a message from the MFTS 18, e.g. an SMS message or a message in a format especially adapted for communications between the MFTS 18 and the Mobile Wallet application. As shown in screen 2002, information is displayed to the payee indicating that a person with an identified mobile number (e.g. 404-404-4040) is sending the payee/recipient a payment in the amount of $123.45, and prompting the payee/recipient to select a payment receipt method from a list of several different payment receipt methods. According to an exemplary aspect of the invention, the message from the MFTS 18 either (a) automatically launches the Mobile Wallet application or (b) prompts the payee/recipient to activate the Mobile Wallet application. In either case, the payee is notified that someone (either with a name or a phone number) has sent a payment and the amount of the payment. The payee is requested/prompted to select a payment method from a list of possible payment delivery methods: ACH, Paper Check or Stored Value Card. The payee then makes the selection according to the instruction as shown in screen view 2002.

ACH:

In response to selection by the payee of the ACH method, according to one exemplary aspect of the invention, the Mobile Wallet application provides a display screen 2010 to effect this method. In accordance with this aspect, the payee is shown a default ACH account with a default bank routing number and account number as shown in screen view 2010. The screen preferably includes controls for Confirm, Change Account, and Cancel. The Confirm control effectively confirms the displayed default payment receipt method. If the payee confirms the default payment receipt method, another screen view 2012 is displayed that informs the payee the ACH transfer is completed. On the other hand, the payee has the ability to change to another ACH account by selecting the Change Account control, which displays a separate display screen (not shown) for entering a new bank routing number and account number. The Mobile Wallet application then preferably displays another screen similar to that at 2010 upon entry of an alternative bank routing number and account number, followed by a confirmation such as screen view 2012 after the transaction is completed and confirmed.

Paper Check:

In response to selection by the payee of the paper check payment receipt method from screen 2002, according to one exemplary aspect of the invention, the Mobile Wallet application provides a display screen 2020 to effect this method. In accordance with this aspect, the screen view 2020 displays a default mailing address to which a paper check should be mailed. The exemplary screen also includes selectable controls for Confirm, Change Address, and Cancel. The screen effectively prompts the payee to confirm the displayed default mailing address which is stored in the MFTS 18. If the payee confirms the default mailing address by pressing "Confirm" control, an exemplary screen view 2022 is displayed to inform the payee that a paper check will be mailed to the default mailing address. On the other hand, the payee has the ability to change to another mailing address by entering a new mailing address by selecting the Change Address control, which displays a separate display screen (not shown) for entering a different mailing address. The Mobile Wallet application then preferably displays another screen similar to that at 2020 upon entry of an alternative mailing address, followed by a confirmation such as screen view 2022 after the transaction is completed and confirmed.

Stored Value Card:

In response to selection by the payee of the Stored Value Card payment receipt method from screen 2002, according to one exemplary aspect of the invention, the Mobile Wallet application provides a display screen 2030 to effect this method. In accordance with this aspect, the screen view 2030 displays a default stored value card account into which the funds would be deposited. The exemplary screen also includes selectable controls for Confirm, Change Account, and Cancel. The screen effectively prompts the payee to confirm the displayed stored value card account which is stored in the MFTS 18. If the payee confirms the default stored value card account by pressing "Confirm" control, an exemplary screen view 2032 is displayed to inform the payee that the indicated amount will be deposited in the default stored value card account. On the other hand, the payee has the ability to change to another stored value card account by entering a new account by selecting the Change Account control, which displays a separate display screen (not shown) for entering a different stored value card account number. The Mobile Wallet application then preferably displays another screen similar to that at 2030 upon entry of an alternative stored value card account, followed by a confirmation such as screen view 2032 after the transaction is completed and confirmed.

According to one exemplary alternative aspect of the invention, the payee/recipient is not required to have the Mobile Wallet application installed on their mobile device, especially for the paper check and stored value options. In accordance with this aspect of the invention, one or more text messages (SMS) containing information essentially as shown in FIG. 20 can be generated by the MFTS 18 and communicated to a mobile device possessed by a payee/recipient, with instructions to the payee/recipient to return a text message (SMS) containing information indicated, e.g. to confirm a default mailing address for a paper check or stored value account, or provide an alternative mailing address or stored value account. It will thus be appreciated that aspects of the invention can readily be constructed using SMS messaging techniques, for payees with mobile devices that do not have the Mobile Wallet application installed or where the payee has not elected to use and run the Mobile Wallet application.

FIG. 21 is a sequence diagram illustrating a method 2100 for a "PayAnyone" payment method according to an exemplary aspect of the invention. The method or process 2100 involves communications or messages between a mobile device 15 and the MFTS 18, and allows selection by the user of a particular form of payment for making a payment to a person identified during interactions with the system. This process is in contrast to the previously described method for making a payment to a pre-identified billing entity.

Starting at step 2102, the user activates the Mobile Wallet application and logs in or otherwise provides authentication information at step 2104. An authentication message (AM) 2106 is generated and communicated to the MFTS 18, which at step 2108 authenticates the user. Upon authentication of the user by the MFTS at step 2108, an authentication confirmation message (ACM) 2110 is returned by the MFTS 18 to the mobile device 15, which permits the Mobile Wallet application to execute on the mobile device, as shown at step 2112. According to one exemplary aspect of the invention, at step 2112 the MFTS 18 also retrieves a predefined payee list associated with the user from the user database and sends this user's payee list back to the mobile device, where it is displayed to the user (see exemplary screen in FIG. 19).

After the Mobile Wallet application is opened at step 2112, assume that the user selects the "PayAnyone" option in step 2114. He/she then selects a name from the predetermined payee list or enters a mobile phone number to choose a payee as shown in step 2116, and enters the amount in dollars and cents to pay in step 2118. At step 2120, the user selects one of the available payment methods, e.g. Recipient Defined, ACH, Paper Check, or Stored Value Card, as shown in FIG. 19. In this example, assume that the user has selected to pay with the Recipient Defined payment method. Information corresponding to the selected payment method is provided in a mobile payment instruction (MPI) message 2122 and forwarded to the MFTS 18 for further processing by the MFTS 18 and other related parties as shown in step 2124.

FIG. 22 is a sequence diagram illustrating a recipient defined "PayAnyone" method 2200 according to an exemplary aspect of the invention. The method or process 2200 involves communications or messages between a user/payer's mobile device 15 (not shown here), the MFTS 18, a payee's mobile device 2202, a user/payee's financial institution 30A, a payee's financial institution 2260, the payee 2270, and stored value card issuing company 2280. In this example, assume that in FIG. 21 the user has selected the Recipient Defined payment method at step 2120 and this decision has been communicated to the MFTS 18. According to one exemplary aspect of the invention, the MFTS sends the payee a text message (SMS) 2206 such as the one shown in screen view 2002 of FIG. 20, as indicated at step 2204. This message 2206 informs the payee that a payment of a certain amount is pending and that the payee should make a selection from a list of selected payment methods as shown in step 2208. The payee then preferably uses his/her mobile device 2202 to make a selection from three payment methods offered in step 2210. Such a selection may be made by return text message, or by use of the Mobile Wallet application if installed on the payee's mobile device. In any case, a mobile payment instruction (MPI) message 2212 including information relating to a selected payment method is returned to the MFTS 18, e.g. a message 2212A for selecting the ACH payment method, a message 2212B for selecting a paper check, or a message 2206C for selecting a stored value card payment method.

ACH Payment Method:

If the payee chooses an ACH payment method, a payment method selection message 2212A including the payee's ACH account information and payment amount are forwarded to the MFTS 18 through the wireless carrier networks as shown in step 2214. A corresponding request 2220A is then sent to the user/payer's financial institution 30A (the payment source) for payment to a specified bank account of the payee from an account specified by the user, as indicated at step 2222. Once the user/payer's financial institution 30A verifies that the user has sufficient funds to cover the payment, the payer's financial institution sends an ACH draft to the specified account of payee's financial institution 2260 as indicated at step 2226.

Paper Check Payment Method:

if the payee chooses a paper check payment method, a payment method selection message 2212B including the payee's mailing address information and payment amount are forwarded to the MFTS 18 through the wireless carrier networks as shown in step 2216. A corresponding request 2220B is then sent to the user/payer's financial institution 30A for generation of a paper check drawn on the specified account of the user/payer and mailing of that check to the payee, as indicated at step 2222. Once the user/payer's financial institution 30A verifies that the user has sufficient funds to cover the payment, the payer's financial institution mails a check 2224B to the payee, the receipt of which by the payee is indicated at step 2228.

Stored Value Payment Method:

if the payee chooses a stored value card payment method, a payment method selection message 2212C including the payee's stored value card account information and payment amount are forwarded to the MFTS 18 through the wireless carrier networks as shown in step 2218. A corresponding request 2220C is then sent to the user/payer's financial institution 30A for crediting the payee's identified stored value card account, drawn on the specified account of the user/payer, as indicated at step 2222. Once the user/payer's financial institution 30A verifies that the user has sufficient funds to cover the payment, the payer's financial institution credits the identified stored value card account (through 2224C) in the designated amount, the receipt of which by the payee is indicated at step 2230. It should be understood that step 2230, indicating receipt of loaded stored value card, reflects both (a) the crediting of a preexisting stored value card account associated with the payee, or (b) the issuance of a new loaded stored value card to the payee, for example by providing the payee with information indicating a location at which an unloaded stored value card may be obtained and also providing information such as a validation code that would permit the payee to present the unloaded card to a terminal or representative so as to "load" the card with the payment amount. Such details of loading and delivering stored value cards to individuals are known to those skilled in the art and do not form a separate part of the invention.

It will be understood that, for a payment, these three methods can be used independently or combined so the payee may have the flexibility of allocating a portion of the payment with ACH, and the remaining portion of the payment to paper check and/or stored value card.

Pay Anyone by Phone Number

FIG. 23 shows a sequence of payer's mobile device screen views 2300 for a "PayAnyone by phone number" payment method according to an exemplary aspect of the invention. In this particular method, the payer/user selects/enters a mobile device phone number to identify a payee. Specifically illustrated is an "ACH" payment method according to an exemplary aspect of the invention. It will be understood that the payer can alternatively select a paper check or stored value card payment method, and that the particular payment method described is merely exemplary.

As in previously described embodiments and aspects, the user first selects the Mobile Wallet application in screen 2302, provides authentication information (e.g. a login) via screen 2304, and is authenticated by the MFTS before being presented with options for making a payment at screen 2306. Assume that in screen 2306 the user selects the "PayAny-one" option. In response to this selection the user is provided with a short menu of options as shown in screen view 2308 to select a payee, either by name or by mobile phone number. According to this exemplary aspect of the invention, in response to selection of the option "Paying by Mobile Phone" by either entry of the numeral "2" or activating the Select control, the user is presented with a screen 2310 for entry of the payee/recipient's mobile phone number.

According to this exemplary aspect of the invention, an exemplary payee's phone number 404-555-2121 is entered as shown in the screen view 2310. The screen 2310 further includes controls for Next, Back, and Cancel, which operate in the manner as previously described to continue the process, return to a previous screen, or cancel the transaction. In response to the user's activation of the Next control after entry of the payee's phone number, the user is presented with a payment amount data entry screen 2312 for entry of the amount to pay. The user then enters the amount to pay. In this example, the user has entered $123.45. As in other exemplary screens, the amount entry screen 2312 includes a Next, Back, and Cancel control. In response to the user's activation of the Next control, the user is presented with a screen 2314 that displays the default payment source (e.g. Bank of USA), available balances in the default accounts of the default payment source, and prompts the user to confirm the selected default. As in previous examples, the user can activate the "Select" control to select the default account and payment source, or navigate to an alternative payment source.

After selection and/or confirmation of the payment source via screen 2314, the user is presented with a screen 2316 that allows selection of a payment method. The user uses the "Back" and "Next" keys to navigate the menu and uses the "Select" control to make a selection. In this example, the "ACH" payment method is shown highlighted and therefore chosen. In response to activation of the Select control in screen 2316, the user is presented with a screen 2318 that displays a confirmation of the payment, the selected payment method, and the remaining/updated balance of the payment source used in this transaction. At this point, the user may activate the "Done" control to finish the "PayAnyone" application or the "Next" control to initiate another transaction.

FIG. 24 shows a sequence of mobile device screen views 2400 from a payee's perspective, via a payee's mobile device, for a "PayAnyone" option where a user selects/enters a mobile device phone number and uses an "ACH" payment method according to an exemplary aspect of the invention. As in other embodiments and aspects, the information shown may be presented to the payee either by a sequence of text messages (SMS) or by displays generated by the Mobile Wallet application if loaded and activated on the payee's mobile device.

As shown in screen 2402, an SMS text message is received from the SMS generator 151, or similar information generated by the Mobile Wallet application running on the payee's mobile device. In accordance with this message, the payee is notified that someone with a phone number 404-404-4040 has sent a payment in the amount of $123.45 for delivery via an ACH funds transfer. According to one exemplary aspect of the invention, the message to the payee includes a default payment receipt method, for example, deposit to a predetermined bank (as identified by bank routing number) and account. If generated by the Mobile Wallet application, the screen 2402 preferably includes a "Confirm" control, a "Change Account" control, and a "Cancel" control. By activating the "Confirm" control the payee/recipient can confirm that the displayed ACH bank routing number and account number stored in the MFTS database is correct for the payment. On the other hand, the payee has the ability to change to another ACH account by entering a new account number and bank routing number by activating the "Change Account" control. As in other examples, if the payee activates the "Change Account" control in screen view 2402, a separate screen (not shown) is displayed at which the payee is allowed to enter another ACH bank routing number and account number.

If the payee confirms the payment delivery method by activating the "Confirm" control in screen 2402, a screen view 2404 is shown that prompts the payee to confirm the deposit to the identified ACH account. The screen 2404 also preferably includes a "Done" control, a "Change Account" control, and a "Cancel" control. The "Change Account" control works in the manner described elsewhere. Activating the "Done" control causes display of a screen 2406 that prompts the user to set the currently selected bank account as a default ACH account for the payee. If the payee activates the "Yes" control in screen 2406, then the default ACH account information is sent back to the MFTS 18 for storage in association with other information relating to this particular payee. Otherwise, the default ACH account is not changed.

Upon confirmation of the bank account as a default ACH account by activation of the "Yes" control or by activation of the "No" control to leave the identified account intact, a screen 2408 is displayed that prompts the payee/recipient to confirm the deposit of the payment to the currently selected account. A "Yes" and a "No" control are provided to confirm or reject the deposit to the account. If the answer is "Yes", the payee's answer is sent to the MFTS 18 for further processing of the transaction. In response to processing of the transaction by making the ACH payment, according to one exemplary aspect of the invention the payee receives a confirmation message or display 2410 indicating that the received payment will be deposited into the ACH account the payee specified previously. At this point, the payee may activate a "Done" control to finish receiving payment or a "Next" control process another transaction, if applicable.

FIG. 25 is a sequence diagram of a "PayAnyone" with ACH payment method or process 2500 according to an exemplary aspect of the invention, showing the interactions among a payer/user's mobile device 15, a payee's mobile device 2521, the MFTS 18, a third party payment provider 2560, and a payee's financial institution 2580. The third party payment provider 2560, as in previous aspects, is a payment instruction recipient that effects a payment to the payee, in this case by transferring funds to the payee's financial institution 2580.

As in previous methods described elsewhere, steps 2502, 2504 involve authentication of the user/payer to the MFTS 18 through message 2506, authentication by the MFTS 18 in step 2508, and sending an authentication confirmation message 2510 and user's payee list to the user's mobile device 15. In response to authentication, the user opens the Mobile Wallet application in 2502 and enters the password or PIN in 2504, the MFTS authenticates the login and sends user's current payee list (2510) to the user's Mobile Wallet of his/her mobile device in step 2508. This action allows the user to proceed with use of the Mobile Wallet application at step 2512. The user then selects "PayAnyone" in step 2514 and selects a payee name from the payee list received during the login, or enters a phone number to specify a payee in step 2516. The user then enters a payment amount with the mobile device in step 2518 and selects the ACH payment method in step 2520.

In response to the foregoing steps, a mobile payment instruction (MPI) message 2522 is generated by the Mobile Wallet application and communicated to the MFTS 18. The MPI 2522 will typically include the payment amount, payment method (in this case an ACH payment), and payee information including the payee's phone number. At step 2524, the MFTS 18 examines the payment instruction and generates a message 2526 to the payee's mobile device 2521 to request the payee to specify or confirm the ACH method for the payment. This message 2526 is sent to the payee's mobile device and received at step 2528. According to an exemplary aspect of the invention, the payee can receive the message 2526 via one or more text messages or by a communication that activates an appropriate routine of the Mobile Wallet application (not separately shown). At step 2528 the payee selects an account into which the funds should be deposited. A return payment account selection message 2530 is generated (e.g. a return text message or communication from the Mobile Wallet on the payee's device) that indicates the account into which the payee wishes to deposit the payment. This return payment account selection message 2530 is transmitted back to the MFTS 18 and received at step 2532.

At step 2532, the MFTS 18 receives the payment account selection message 2530 and determines the identity of a third party payment provider (i.e. a payment instruction recipient) that generates the ACH payment transaction. An MFTS payment instruction (MFTSPI) 2534 is generated and communicated to third party payment provider 2560. This MFTSPI 2534 is received at step 2536. At step 1562, the third party payment provider generates an ACH funds transfer (2538) and communicates this electronically in the known ACH funds transfer manner to the payee's financial institution 2580. Receipt of this ACH funds transfer at the payee's financial institution is shown at step 2540. A payment confirmation message (not shown) is preferably generated either by the payee's financial institution 2580, or the third party payment provider 2560, and provided back to the MFTS 18 so that the data records associated with this payment can be updated and any appropriate payment confirmation messages provided to the payee's mobile device and/or the payer's mobile device.

Pay Anyone by Name (Paper Check)

FIG. 26 shows a sequence of payer's mobile device screen views 2600 for a "PayAnyone by name" payment method according to an exemplary aspect of the invention. In this particular method, the payer/user selects/enters a name to identify the payee. Specifically illustrated is a "paper check" payment method according to an exemplary aspect of the invention. It will be understood that the payer can alternatively select an ACH payment method (as described above) or stored value card payment method, and that the particular payment method described is merely exemplary.

As in previously described embodiments and aspects, the user first selects the Mobile Wallet application in screen 2602, provides authentication information (e.g. a login) via screen 2604, and is authenticated by the MFTS before being presented with options for making a payment at screen 2606. Assume that in screen 2606 the user selects the "PayAnyone" option. In response to this selection the user is provided with a short menu of options as shown in screen view 2608 to select a payee, either by name or by mobile phone number. According to this exemplary aspect of the invention, in response to selection of the option "Paying by Name" by either entry of the numeral "1" or activating the Select control, the user is presented with a screen 2610 comprising a list of selectable pre-entered payees.

According to this exemplary aspect of the invention, an exemplary payee's name "John Doe" is shown highlighted in screen 2610 and therefore selected. The screen 2610 further includes controls for Select, Up, and Down, which operate select a particular name or navigate the list of pre-entered names. In response to the user's activation of the Select control after a particular payee's name, the user is presented with a payment amount data entry screen 2612 for entry of the amount to pay. The user then enters the amount to pay. In this example, the user has entered $123.45. As in other exemplary screens, the amount entry screen 2612 includes a Next, Back, and Cancel control. In response to the user's activation of the Next control, the user is presented with a screen 2614 that displays the default payment source (e.g. Bank of USA), available balances in the default accounts of the default payment source, and prompts the user to confirm the selected default. As in previous examples, the user can activate the "Select" control to select the default account and payment source, or navigate to an alternative payment source.

After selection and/or confirmation of the payment source via screen 2614, the user is presented with a screen 2616 that allows selection of a payment method. The user uses the "Back" and "Next" keys to navigate the menu and uses "Select" control or a numeric key to make a selection. In this example, the "Paper Check" payment method is shown highlighted and therefore chosen. In response to activation of the Select control in screen 2616, the user is presented with a screen 2618 that requests a confirmation of the payment and the selected payment method, e.g. "Send a paper check to Mr. John Doe's default address?" At this point, the user may select a "Yes," "No," or "Cancel" control. In response to selection of the "Yes" control is screen 2618, the user is presented with a screen 2620 that requests confirmation of the transaction and includes information about the transaction including the name and mailing address of the payee. The screen 2618 includes a "Pay," "Change Address," and "Next" control that operate to confirm the payment, or change the payee's address.

In response to selection of the Pay control, indicating confirmation of the payment, screen 2622 is displayed. Screen 2622 displays confirmation information that a payment in the indicated amount of $123.45 will be made to John Doe by paper check, together with updated account balance information reflecting deduction of the payment amount from the account balance as reflected in the MFTS 18 records. At this point, the user may activate the "Done" control to finish the "PayAnyone" application or the "Next" control to initiate another transaction.

FIG. 27 shows a sequence of mobile device screen views 2700 from a payee's perspective, via a payee's mobile device, for a "PayAnyone" payment method, where a user, selects/enters payee's name and uses a paper check payment method according to an exemplary aspect of the invention. As in other embodiments and aspects, the information shown may be presented to the payee either by a sequence of text messages (SMS) or by displays generated by the Mobile Wallet application if loaded and activated on the payee's mobile device.

As shown in screen 2702, an SMS text message is received from the SMS generator 151, or similar information generated by the Mobile Wallet application running on the payee's mobile device. In accordance with this message, the payee is notified that someone with a phone number 404-404-4040 has sent a payment in the amount of $123.45, via a paper check mailed to an indicated address. According to one exemplary aspect of the invention, the message to the payee includes a default payment address for mailing of the check. If generated by the Mobile Wallet application, the screen 2702 preferably includes a "Confirm" control, a "Change Address" control, and a "Cancel" control. By activating the "Confirm" control the payee/recipient can confirm that the displayed name and address for as stored in the MFTS database is correct for mailing the check. On the other hand, the payee has the ability to change the mailing address by activating the "Change Address" control. As in other examples, if the payee activates the "Change Address" control in screen view 2702, a separate screen (not shown) is displayed at which the payee is allowed to enter an alternative address.

If the payee confirms the payment delivery method by activating the "Confirm" control in screen 2702, a screen view 2704 is shown that prompts the payee to confirm the mailing address. The screen 2704 also preferably includes a "Done" control, a "Change Address" control, and a "Cancel" control. The "Change Address" control works in the manner described elsewhere. Activating the "Done" control causes display of a screen 2706 that prompts the user to set the currently displayed address as a default mailing address for the payee. If the payee activates the "Yes" control in screen 2706, then the default address information is sent back to the MFTS 18 for storage in association with other information relating to this particular payee. Otherwise, the default address is not changed.

Upon confirmation of the mailing address by activation of the "Yes" control in screen 2706 or by activation of the "No" control to leave the identified address intact, a screen 2708 is displayed that prompts the payee/recipient to confirm the mailing of a check to the currently displayed address. A "Yes" and a "No" control are provided to confirm or reject the mailing to the indicated address. If the answer is "Yes", the payee's answer is sent to the MFTS 18 for further processing of the transaction. In response to processing of the transaction in preparation for mailing the check, according to one exemplary aspect of the invention the payee receives a confirmation message or display 2710 indicating that the paper check payment will be mailed to the address the payee specified previously. At this point, the payee may activate a "Done" control to finish with this function or a "Next" control process another transaction, if applicable.

FIG. 28 is a sequence diagram of a "PayAnyone" by paper check payment method or process 2800 according to an exemplary aspect of the invention, showing the interactions among a payee's mobile device 2801, the MFTS 18, a third party address provider 2840, a third party payment provider 2860, and a payee 2880. According to an exemplary aspect of the invention, the mailing address of the payee is located by: (1) retrieving a default address information associated with the payee stored in the MFTS database, (2) entered by the user (the payer), or (3) entered by the payee, or (4) through a third party address provider. If the address information is not available at the time the user requested paper check payment, the MFTS sends a request to the third party address provider to perform address lookup.

As in previous methods described elsewhere, this method 2800 involves steps (not shown) for authentication of the user/payee to the MFTS 18, authentication by the MFTS 18, and sending an authentication confirmation message and user's payee list to the user's mobile device 15. In response to authentication, the user opens the Mobile Wallet application and enters the password or PIN, the MFTS authenticates the login and sends user's current payee list to the user's Mobile Wallet of his/her mobile device. This action allows the user to proceed with use of the Mobile Wallet application. The user then selects "PayAnyone" and selects a payee name from the payee list received during the login or enters a payee name. The user then enters a payment amount with the mobile device in and selects the paper check payment method. Similar steps have been described in detail elsewhere and need not be repeated here.

In response to the foregoing steps, a mobile payment instruction (MPI) message (not shown) is generated by the user's Mobile Wallet application and communicated to the MFTS 18. The MPI will typically include the payment amount, payment method (in this case a paper check payment), and payee information. The MPI is received at the MFTS 18 and processed to initiate the paper check payment method according to this aspect of the invention.

Starting at step 2804, the MFTS 18 examines the payment instruction and generates a message 2806 to a third party address provider to obtain the address of the payee. According to one exemplary aspect of the invention, payee address information is stored in a table in the user database 158 (FIG. 2) indexed by mobile phone number, by name, or by other information. Alternatively, the message 2806 is communicated to an independent address provider 2840 that provides address information in response to provision of a phone number.

At step 2810, the requested address information is provided from the third party address provider 2840 via a message 2810. The message 2810 is received by the MFTS 18 at step 2812 and formulated into a message 2814 including the payee's address information that is communicated to the payee's mobile device 2802. A display such as that shown at screen 2702 in FIG. 27 is generated to the payee, as indicated by 2802. It will be understood that the payee may receive an SMS message with this information or the Mobile Wallet application running on the payee's mobile device may provide this information to the payee.

At step 2818, the payee confirms the address presented, via screens as shown in FIG. 27. A confirmation message 2820 is generated and returned to the MFTS 18. At step 2822, the MFTS formulates an MFTS payment instruction (MFTSPI) message 2824 and communicates this message to a third party payment provider 2860. The third party payment provider receives the message at step 2826, and processes the MFTSPI message 2828 to generate a paper check that is mailed to the payee at the address indicated in the messages. At step 2830, the payee 2880 receives the paper check payment via mail.

Pay Anyone—Stored Value Card

FIG. 29 shows a sequence of payer's mobile device screen views 2900 for a "PayAnyone by phone number" payment method according to an exemplary aspect of the invention. In this particular method, the payer/user selects/enters a mobile device phone number to identify a payee, although it will be understood that other ways to identify a payee are contemplated. Specifically illustrated is a payment method involving use of a stored value (SV) card according to an exemplary aspect of the invention. It will be understood that the payer can alternatively select an ACH or paper check payment method, and that the particular payment method described is merely exemplary of payment using a stored value card.

Those skilled in the art will understand and appreciate that payment by a stored value (SV) card involves payment transaction infrastructure that does not form a part of the present invention, but is conventional and in widespread use. Specifically, a payment instruction is provided by a system constructed as described herein to a payment instruction recipient that has facilities for issuing a new stored value card or adding value to a pre-existing stored value card. It will be appreciated that various entities may serve the function of the payment instruction recipient regarding issue of a stored value card, including a financial service provider or a billing aggregator (either separately or in conjunction with another entity that handles SV card), a stored value card issuer, or a retail establishment that handles stored value cards.

Generally, making a payment to a stored value card typically involves acquisition by a payee of a "blank" or "unloaded" magnetic stripe or electronic smart card from a vendor of SV cards, followed by "loading" of the card with value (i.e. payment credits that can be drawn upon) by presenting the card to a vendor of the SV card having a terminal that can read information from the magnetic stripe or other electronic data storage medium on the card. The vendor then loads the card by providing information to a back office system indicating the amount of credit or payments available for use on the card, and returning the card to the cardholder. The cardholder can then use the card in a manner similar to other payment cards (debit cards, credit cards), except that the card must be presented to an entity that can read the card and determine the available funds "loaded" to the card by accessing the card vendor's electronic payment system. According to one exemplary aspect of the invention, funds can be loaded onto a conventional stored value card from a mobile device (a new stored value card that is issued to a payee, or loading or reloading a pre-existing stored value card), in the manner shown and described herein.

As in previously described embodiments and aspects, the user first selects the Mobile Wallet application in screen 2902, provides authentication information (e.g. a login) via screen 2904, and is authenticated by the MFTS before being presented with options for making a payment at screen 2906. Assume that in screen 2906 the user selects the "PayAnyone" option. In response to this selection the user is provided with a short menu of options as shown in screen view 2908 to select a payee, either by name or by mobile phone number. According to this exemplary aspect of the invention, in response to selection of the option "Paying by Mobile Phone" by either entry of the numeral "2" or activating the Select control, the user is presented with a screen 2910 for entry of the payee/recipient's mobile phone number.

According to this exemplary aspect of the invention, an exemplary payee's phone number 404-555-2121 is entered as shown in the screen view 2910. The screen 2910 further includes controls for Next, Back, and Cancel, which operate in the manner as previously described to continue the process, return to a previous screen, or cancel the transaction. In response to the user's activation of the Next control after entry of the payee's phone number, the user is presented with a payment amount data entry screen 2912 for entry of the amount to pay. The user then enters the amount to pay. In this example, the user has entered $123.45. As in other exemplary screens, the amount entry screen 2912 includes a Next, Back, and Cancel control. In response to the user's activation of the Next control, the user is presented with a screen 2914 that displays the default payment source (e.g. Bank of USA), available balances in the default accounts of the default payment source, and prompts the user to confirm the selected default. As in previous examples, the user can activate the "Select" control to select the default account and payment source, or navigate to an alternative payment source.

After selection and/or confirmation of the payment source via screen 2914, the user is presented with a screen 2916 that allows selection of a payment method. The user uses the "Back" and "Next" keys to navigate the menu and uses "Select" to make a selection. In this example, the Stored Value Card payment method is shown highlighted and therefore chosen. In response to activation of the Select control in screen 2916, the user is presented with a screen 2918 that displays a confirmation of the payment and the selected payment method. According to an aspect of the invention, the exemplary screen 2918 displays a stored value card number for a pre-existing card of the payee (pre-stored), and provides buttons for Pay, New Card, and Cancel. Selection of the Pay button results in making payment via the pre-existing stored value card, while selection of the New Card button results in issuance of a new stored value card. It will of course be understood that a stored value card number of a pre-existing card of a payee is pre-stored in the user/payer's mobile device or elsewhere, so as to enable payment in this manner. Selection of the Pay button would then cause display of the screen 2922, which indicates that the payment of $123.45 was made to the stored value card, using the pre-existing card number.

According to one exemplary aspect of the invention, in the event of selection by the user of the New Card button, a display screen 2920 is provided, indicating a location at which a new and "loaded" stored value card may be obtained. For example, the screen 2920 shows "Please pick up your new stored value card at CVS store as 123 Main St." plus a transaction ID. After this screen, the screen 2922, as in other embodiments, is displayed and provides a confirmation screen that advises the payer that a payment in the indicated amount ($123.45 in this example) is paid to the mobile number identified, to the indicated stored value card account. In addition, preferably the account balance of the utilized payment source is updated and displayed to reflect the reduction of the available funds.

FIG. 30 shows a sequence of mobile device screen views 3000 from a payee's perspective, via a payee's mobile device, for a "PayAnyone" option where a user selects/enters a mobile device phone number and uses a stored value card payment method according to an exemplary aspect of the invention. As in other embodiments and aspects, the information shown may be presented to the payee either by a sequence of text messages (SMS) or by displays generated by the Mobile Wallet application if loaded and activated on the payee's mobile device.

As shown in screen 3002, an SMS text message is received from the SMS generator 151, or similar information generated by the Mobile Wallet application running on the payee's mobile device. In accordance with this message, the payee is notified that someone with a phone number 404-404-4040 has sent a payment in the amount of $123.45 for delivery via a stored value card. According to one exemplary aspect of the invention, the message to the payee includes a default payment receipt method, for example, deposit to a predetermined stored value card account. If generated by the Mobile Wallet application, the screen 3002 preferably includes a "Confirm" control, a "Change Card" control, and a "Cancel" control. By activating the "Confirm" control the payee/recipient can confirm that the displayed stored value card account number stored in the MFTS database is correct for the payment. On the other hand, the payee has the ability to change to another stored value card account by entering a new account number after activating the "Change Card" control.

If the payee activates the "Change Card" control in screen view 3002, a separate screen 3004 is shown that ask the user/payee if they want to receive a new card. The available controls on this screen are "Yes", "No" and "Done"

If the user selects "Yes", they will be prompted on screen view 3006 to enter and Confirm the zip code for picking up the card. Available controls on this screen view are "Confirm", "Back" and "Done".

Upon entering a valid zip code and selecting the "Confirm" control, the user will be presented on screen view 3008 store locations for picking up a new card. Available controls on this screen are "Confirm", "Back", and "Cancel".

In response to processing of the transaction by making the payment, according to one exemplary aspect of the invention the payee receives a confirmation message or display 3010 indicating that the received payment will be deposited into the newly issued stored value card account upon retrieval by the user/payee. At this point, the payee may activate a "Done" control to finish receiving payment or a "Next" control process another transaction, if applicable.

FIG. 31 shows a sequence diagram for a "PayAnyone" payment method 3100 involving use of a stored value card according to an exemplary aspect of the invention. This sequence diagram shows the interactions among the following parties: payee's mobile device 3102, the MFTS 18, a third party Stored Value Card provider 3140, and a payee 3160. Generally speaking, in this example a user/payer selects a stored value payment method as shown in step 3104 and communicates this decision to the MFTS 18 through a MFTS PI 3106. The MFTS sends a request to the third party Stored Value Card provider to create a transaction and a transaction ID as shown in step 3108. The payment amount is drawn from the payment source of the user (the payer) and the third party Stored Value Card provider configures a stored value card account on behalf of the payee in step 3112 with a message 3110. The payee receives the transaction ID in an SMS message and is informed stored value card pick up locations as shown in step 3116. The payee can then acquire a stored value card from a retail location associated with the stored value card vendor and have the card "loaded" as shown in step 3118. A message 3120 is sent to third party stored value card provider to provide the transaction ID, card number and phone number etc at step 3122.

Starting at step 3104, it is first assumed that the user/payer has already selected the stored value card payment method, in a manner as described elsewhere, and have provided the MFTS 18 with a mobile payment instruction (MPI) indicating the payment amount and selected payment method. The MFTS 18 receives this MPI and generates a corresponding MFTS payment instruction (MFTSPI) message 3106 containing information required by a third party pre-paid (stored value) card provider or vendor 3140, and if required, effects a funds transfer to the card provider by drawing on the selected payment source of the user/payer. The MFTSPI 3106 is communicated to the third party stored value card provider 3140, and received at step 3108. According to one exemplary aspect of the invention, the MFTSPI will include a zip code provided by the payee or payer, to facilitate location of one or more retail locations at which the payee can obtain an unloaded SV card (or can reload an existing SV card). At step 3108, the third party stored value card provider 3140 generates a transaction identifier (ID) and conducts a zip code lookup to locate one or more nearby retail locations for the payee to pick up and/or load a Stored Value Card. According to one exemplary aspect of the invention, the transaction ID is maintained by the card provider to be used for authentication purposes when the payee requests that the card be loaded with the payment.

Further at step 3108, the third party card provider 3140 generates a message 3110 back to the MFTS 18 to inform the system that the stored value card account is configured and ready for use. According to one exemplary aspect of the invention, this message 3110 includes information that allows the payee to identify locations at which an unloaded stored value card may be obtained and then loaded, and the transaction ID number. At step 3112, the MFTS 18 receives the message 3110 and generates a message 3114 to the payee's mobile device 3102 advising that a payment has been made, locations that a card may be obtained and/or loaded at certain retail locations associated with the card vendor, and the transaction ID, which is required for authentication of the card to the payee. Exemplary screens in this regard as shown in FIG. 30.

At step 3116, the payee's mobile device 3102 receives the message 3114 and displays (either via SMS text message or via the Mobile Wallet application, if installed) information informing the payee that a payment is waiting by stored value card payment method, and information as to potential pick up locations for obtaining and/or loading a stored value card. At step 3118, and according to one exemplary aspect of the invention, the payee physically goes to a location identified in the message and obtains a stored value card, typically not yet loaded. Further at step 3118, the payee with the stored value card presents the card to a retail location or terminal associated with the third party card provider 3140, so as to load the card for use.

At step 3122, the third party card provider 3140 is presented with a stored value card by the payee, with a request to activate and/or load the card with the payment. The third party card provider typically at this time requires authentication information to activate and/or load the stored value card. In this case the authentication information comprises one or more of the following items of information: the transaction ID number, the card number, the mobile phone number, and optionally other information such as name, address, etc.

After the payee presents the required information to the third party card provider 3140, at step 3124 the card provider loads the card with the funds provided earlier, obtained from the user/payer. At step 3128, the stored value card, now loaded with the payment, is returned to the payee 3160 through transaction 3126, who can then use the card at locations that accept the particular type of stored value card, as a payment form.

According to an exemplary aspect of the invention, if the payee already has a Stored Value Card, he/she can contact the third party Stored Value Card provider 3140 to claim the payment with an existing Stored Value Card, and follow the steps from 3122.

It will be appreciated that the foregoing payment method involving use of a stored value card payment method is useful for making payments to subscribers/users of the MFTS 18, as well as non-subscribers, as the payee need only be provided with the transaction ID number and type of stored value card in order to receive a payment. According to an exemplary aspect of the invention, not described in detail, information corresponding to the stored value card can be displayed in the first instance to the payer, for provision (e.g. via a note or writing) to a payee that does not have a mobile device that can receive SMS messages or run the Mobile Wallet application, or does not have a mobile device at all. Once the initial stored value card account is created on behalf of a particular payee, the user/payer can load additional funds into a stored value card account associated with the payee, as the name of the payee will be stored in the MFTS 18 as described above, and can therefore be quickly and readily reused to provide additional funds to the selected payee.

Balance Transfer

FIG. 32 shows a sequence 3200 of mobile device screen displays corresponding to a "Balance Transfer" financial transaction option according to an exemplary aspect of the invention. A balance transfer is a financial transaction involving the transfer of funds between different accounts of the same user. A balance transfer allows a user of the MFTS to use his or her mobile device to obtain and monitor information relating the user's financial accounts, and move funds from one account to another.

As in previously described embodiments and aspects, the user first selects the Mobile Wallet application in screen 3202, provides authentication information (e.g. a login) via screen 3204, and is authenticated by the MFTS before being presented with options for making a payment (or balance transfer) at screen 3206. Assume that in screen 3206 the user selects the "Balance Transfer" option. In response to this selection the user is provided with a Balance Transfer screen 3208 that allows selection of a funds transfer from one of a plurality of selectable accounts. As shown in screen 3208 as examples, the user can select to transfer funds from a MasterCard™ account, a VISA™ account, a Discover™ account, a GaSL account, or a Bank of USA account as payment sources usable for a balance transfer. Corresponding balances associated with such accounts are also preferably displayed in accordance with this aspect of the invention. The screen 3208 further preferably includes a "Select," "Back," and "Next" controls for navigation and selection, similar to that in other functions. The screen 3208 shows the Bank of USA account highlighted and therefore selected.

In response to user activation of the "Select" control in screen 3208 with a selection in the list of available accounts, an exemplary screen for the selected account, e.g. Bank of USA, is displayed as screen 3210. Screen 3210 displays several different accounts associated with the particular payment source, Bank of USA, namely, a savings balance, a checking balance, and other (e.g. a money market account). The screen 3210 further preferably includes a "Select," "Back," and "Next" controls for navigation and selection, similar to that in other functions. The screen 3210 shows the checking balance highlighted and therefore selected.

In response to activation of the "Select" control in screen 3210 with a selection in the list of available accounts (i.e. the checking balance in the example shown), screen 3212 is displayed. Screen 3212 presents the list of available account/payment sources similar to that of screen 3208, except indicated for a transfer to as opposed to a transfer from. The screen 3212 further preferably includes a "Select," "Back," and "Next" controls for navigation and selection, similar to that in other functions. The screen 3212 shows the GaSL account highlighted and therefore selected.

In response to user activation of the "Select" control in screen 3212 with a selection in the list of available accounts, an exemplary screen for the selected account, e.g. GaSL, is displayed as screen 3214. Screen 3214 displays several different accounts associated with the particular account a balance transfer destination, GaSL, namely, a savings balance, a checking balance, and other (e.g. a money market account). The screen 3214 further preferably includes a "Select," "Back," and "Next" controls for navigation and selection, similar to that in other functions. The screen 3214 shows the checking balance highlighted and therefore selected.

In response to user activation of the "Select" control in screen 3214 with a selection in the list of available accounts, e.g. the checking account at GaSL, a balance transfer confirmation screen 3216 is displayed. According to one exemplary aspect of the invention, the balance transfer confirmation screen 3216 provides a data entry region for user entry of an amount of funds transfer, e.g. $2000 is shown. The screen 3216 further preferably includes a "Transfer," "Back," and "Next" controls for navigation and selection, similar to that in other functions. In response to user activation of the Transfer control, a balance transfer confirmation screen 3218 is displayed, containing information indicating that the balance transfer has been effected. In the example shown, the balance transfer of $2000 is transferred from a Bank of USA checking account to a GaSL checking account. Preferably, also, screen 3218 includes a display of the current balances of each of the accounts involved in the balance transfer, updated to reflect the balance transfer.

FIG. 33 is a sequence diagram of a balance transfer payment method or process 3300 according to an exemplary aspect of the invention, showing the interactions among a payer/user's mobile device 15, the MFTS 18, a first financial institution 30A associated with the user, and a second financial institution 30B associated with the user. The balance transfer is effected between these two financial institutions 30A and 30B.

As in previous methods described elsewhere, initial steps 3302, 3304, 3307, and 3309 in the balance transfer method involve receiving authentication message 3306 from the user/payee, authentication by the MFTS 18, and sending an authentication confirmation message 3308 to the user's mobile device 15. In response to authentication, the user opens the Mobile Wallet application at step 3302 and enters the password or PIN in 3304, the MFTS authenticates the login and sends activates the user's Mobile Wallet of his/her mobile device in step 3307. This action allows the user to proceed with use of the Mobile Wallet application at step 3309. The user then selects Balance Transfer option in step 3310. At step 3312 the mobile device formulates a mobile payment instruction (MPI) message 3314 and transmits this message to the MFTS 18. According to one exemplary aspect of the invention, the MPI message 3320 includes information identifying a payment source account, a destination account, and a balance transfer amount, so that the MFTS can construct appropriate MFTS payment instructions to the selected and identified financial institutions.

At step 3316, the MFTS 18 receives the MPI message 3314 and constructs an appropriate MFTS payment instruction (MFTSPI) message 3318 for communication to the first or payment source financial institution 30A. At step 3320, the first or payment source financial institution 30A receives the MFTSPI message 3318 and debits the selected account for the indicated amount of funds. The first or payment source financial institution 30A then takes action in accordance with its own procedures to transfer these funds to the selected second financial institution 30B through a message 3322, as indicated at step 3320. At step 3324, the second or destination financial institution 30B updates its records to indicate receipt of funds. According to one exemplary aspect of the invention, the first and second financial institution 30A, and 30B provide balance transfer confirmation messages, indicated by messages 3330A, 3330B, back to the MFTS 18, so that the MFTS 18 can update its local record of the funds available at each of the accounts at each of the financial institutions.

At step 3328, the MFTS 18 receives the balance transfer confirmation messages 3330A, 3330B and updates the records of the user to reflect the balance transfer. Further at step 3328, the MFTS 18 communicates a balance transfer confirmation message 3332 to the mobile device 15. At step 3334, the mobile device 15 receives the balance transfer confirmation message 3332 and updates its local storage of the balances associated with the user's accounts and financial institutions, to reflect the completion of the balance transfer.

Receiving Payment at Payee Mobile Device by Mobile Wallet Installation

The reader may have noticed from the discussion above that aspects of the present invention involve a payee either (1) receiving and sending a series of SMS messages (text messages) in order to interact with the MFTS to select a payment receipt method, or (2) installing and utilizing the Mobile Wallet application on the payee's mobile device in order to interact with the MFTS to select a payment receipt method and/or be enabled to conduct transactions (make payments) as an MFTS user. A payee thus need not have the Mobile Wallet application installed on his or her mobile device in order to realize the benefits of certain aspects of the invention. However, a payee with most currently available types of mobile device is presented with an opportunity to download, install, and use the Mobile Wallet, in accordance with certain features and aspects of the invention. Thus, and according to an exemplary aspect of the invention, persons to whom a user wishes to make a payment can be provided with an opportunity to download the Mobile Wallet application and receive the benefits of both receiving payments and selecting payment receipt options in accordance with described aspects of the invention, as well as utilizing the mobile payment services provided by an operator of the MFTS 18.

In order to "spread" the benefits of the Mobile Wallet to payees (who are prospective users of the MFTS, upon installation and activation of the Mobile Wallet application), the present invention includes aspects for informing a payee of the opportunity to download and utilize the Mobile Wallet application and register as a user of the MFTS, provide the code for the Mobile Wallet via a wireless download, activate the payee to become a user of the MFTS services and utilize the Mobile Wallet application as a user.

Turn in this regard to FIG. 34 for a discussion of a method for a payee to receive a payment from a user of the MFTS 18 and also download and install the Mobile Wallet application. FIG. 34 shows a sequence of mobile device screen views 3400 from a payee's perspective, via a payee's mobile device, for a payment receipt method that includes steps for providing a payee with an opportunity to download and install the Mobile Wallet application, register for service with the MFTS, and thereby becoming users themselves of the MFTS services. Advantageously, the method allows the so-called "viral spreading" of the benefits of the Mobile Wallet application and use of the MFTS, by providing payees who receive payments from users who are already participants in the MFTS system with the ability to download and use the Mobile Wallet application quickly and easily, thereby becoming new MFTS users, and in turn spread the benefits in turn to payees of the new MFTS user. Such new user's payees in turn are likewise afforded the opportunity to join and participate.

As in other embodiments and aspects, for a payee that does not have the Mobile Wallet application installed on their mobile device, the information shown will be presented to the payee by a sequence of text messages (SMS).

As shown at screen or message 3402, a payee typically receives a text (SMS) message that indicates that a user has sent the payee a payment, and advising the payee as to how to receive the payment. For example, the screen or message 3402 states that "404-404-4040 has sent you a payment of $123.45." Further in accordance with this exemplary aspect of the invention, the screen or message 3402 includes the text, "Your mobile device does not have the necessary application to receive the payment, do you want to download the application?" A "Yes" control and a "Cancel" control are also preferably provided so that the user can elect to receive the application download or to receive the payment without installing the mobile device application. If the user decides not to install the mobile device application or the mobile device is not capable of installation of the mobile device application, the user is given other options to receive the payment. A screen is displayed if the user selects the "Cancel" button as shown in screen view 3402. The screen view (not shown in FIG. 34) provides the user other options such as receiving the payment with paper check, by way of ACH transaction, or a stored value card. The user may respond the payment with a text (SMS) message back to the payer and inform the payer how he/she would like to receive the payment without installation of the mobile device application. The responses the user send to the payer may include the method of the reception of the payment, as well as the user's address information, or account information and any other related information.

In the event that the payee selects the "Yes" control, a message bearing the maker name, model number of the mobile device is sent back to the MFTS through the MCSP. The MFTS identifies the type of mobile device possessed by the payee and an appropriate Mobile Wallet application code, that is executable on the payee's mobile device, is sent to the mobile device, and a self installation process starts on the mobile device after the Mobile Wallet application code is downloaded to the mobile device. A text message indicating that a installation operation has begun may be displayed, as illustrated at screen view 3404. A conventional progress bar may be displayed as part of the installation process, as shown in screen or message 3404 to advise the payee of the installation progress. A "Cancel" control is optionally provided so that the payee may terminate the installation operation if desired.

Upon completion of the Mobile Wallet application download, a completion screen or message 3406 is displayed, according to one embodiment of the invention. This completion screen view 3406 preferably indicates that the installation of the Mobile Wallet application is completed. According to one exemplary aspect of the invention, the Mobile Wallet application then executes and displays screens (or messages) that it generates. At this stage, preferably, the Mobile Wallet application may optionally prompt the payee to enter a PIN for use of the application and/or an account of the payee maintained by the MFTS operator. Preferably, "Next," "Back," and "Cancel" controls are also provided for their indicated functions. In response to the payee's selection of the Next control in screen or message 3406, a PIN confirmation screen 3408 is preferably next displayed to prompt the payee to re-enter the PIN for confirmation. Similarly, "Next" and "Cancel" controls are preferably provided.

In response to the payee's selection of the Next control, a Payment Received screen 3410 is displayed. This screen preferably repeats the text that "404-404-4040 has sent you a payment of $123.45," and further includes text prompting the payee to select one of a plurality of possible payment reception methods. In the exemplary screen 3410, the payee is presented with the options of receiving payment by ACH, paper check, or stored value (SV) card. Methods, screen displays, and operations for such payment methods have been described elsewhere in this document and need not be repeated here. By way of example and not limitation, the paper check payment method is shown highlighted in screen 3410 and therefore selected. The MFTS is able to obtain the mail address of the user based on the phone number through a third party address provider. If the user decides to receive the paper check with a different address, the user selects the "Change Address" button on a screen view 3412. A plurality of screen views may follow to allow the user to change, edit and confirm a new mailing address. These screen views will be understood by those skilled in the art and not described here in detail.

The screen 3412 requesting confirmation of the mailing address, etc. is preferably displayed, as described elsewhere in greater detail. A payment confirmation screen 3414 confirming the mailing address of the payment (or other selected payment method, if selected) is preferably displayed next, as described elsewhere in greater detail.

At this point, the payee has now downloaded and installed the Mobile Wallet application and is enabled for further use, upon provision of further registration information such as provision of account information to set up payment sources that can be used for the payee (now a user) to make payments to billing entities and other persons in accordance with previously described aspects of the invention. Although the user's mobile device is currently enrolled, and enabled in the MFTS, the user still needs to visit the MFTS user web site to add, enter information relating to payment source, billing entities etc. This information entry will be discussed later in this document.

FIG. 35 is a sequence diagram of a Mobile Wallet installation by payee method or process 3500 according to an exemplary aspect of the invention, showing the interactions among a mobile device 3501 of a payee/prospective user, the MFTS 18, and a third party payment provider 30P, so as to enable a payee to receive a payment, download and install the Mobile Wallet application to the payee's mobile device 3501 and thereby be enabled as a user of the MFTS. It will be understood that the steps of the method 3500 are typically carried out after a user has instructed the MFTS 18 to make a payment to a particular payee by mobile telephone number or name, and the MFTS contacts the payee by one or more messages to advise the payee that a payment is pending. The steps in method 3500 therefore typically occur at the point of determining a payment delivery method to the payee.

Starting at step 3502, the first step taken is the receipt by a payee, a non-subscriber to the services of the MFTS 18 operator, of a message 3503 indicating that a user has made a payment to the payee. According to one exemplary aspect of the invention, this message is text message (SMS) delivered to the mobile number of the payee. At step 3502, the non-subscriber/payee sees the message as shown in screen view 3402 of FIG. 34 and determines whether he/she wants to download and install the Mobile Wallet application for his or her mobile device, e.g. by selecting the "Yes" control in screen 3402 in FIG. 34. A message 3506 is returned to the MFTS 18, with the confirmation of the downloading and installation of the mobile wallet application, as well as the make and model number, or serial number of the mobile device. At step 3508, the MFTS downloads an appropriate Mobile Wallet application to the designated mobile device and installs the downloaded Mobile Wallet application as indicated by message 3510. At step 3512, the user is notified that the download and installation operations are complete, and the payee/prospective user is prompted to create a login (or PIN, or password, as appropriated) and become a user of the MFTS. After the login/password/PIN authentication process (see FIG. 34), at step 3516 the payee/user is provided with a Payment Received screen including details of the payment and requesting selection of a payment method. At step 3518, the user selects a desired payment method (e.g. ACH, paper check, or stored value card), and at step 3520 provides applicable account details needed for the payee/user to receive payment. This account setup information is communicated to the MFTS 18 via one or more electronic messages 3520.

At step 3522, the MFTS 18 receives the account setup information and stores the account information in association with identification information corresponding to the payee/user, in the user database of the MFTS. Also at step 3522, the MFTS 18 communicates an MFTS payment instruction (MFTSPI) message 3523 to a selected third party payment provider 30P or financial institution 30 (e.g. an ACH payment generator, or a paper check issuer, or a stored value card vendor) to cause the issue of the selected form of payment to the payee as shown in step 3524. After providing this MFTSPI to the selected payment provider, also at step 3522 the MFTS 18 provides a payment confirmation message 3526 to the payee/user through his/her mobile device 3501. At step 3528 the payee/user receives the payment confirmation information that the payment has been sent for processing.

Subsequent to the foregoing steps, and as indicated at step 3530, the payee (now a registered user of the MFTS services) is empowered and enabled not only to receive further payments via the installed Mobile Wallet application, but also to register billing entities to whom payments should be made, as well as the payee/user's payment sources. The payee/now user can also facilitate the spread of the Mobile Wallet application and convenient use of the MFTS and associated services by making payments to others that may not have the Mobile Wallet, and thereby facilitate the spread of use of the systems and methods of the present invention. According to an exemplary aspect of the invention, the new user is preferably provided with information identifying the MFTS website and prompting the new user to access the web application (FIGS. 37-42) to enter and provide detailed information relating to billing entities, persons to pay, payment sources, accounts, viewing of transaction details, default payment and receipt methods, etc.

Referring now to FIG. 36, a serial screen view 3600 are shown for a registered user to change the login PIN when such an action is needed, according one embodiment of the present invention. The screen views 3602 and 3604 were explained elsewhere in this document and are not described here. In screen view 3606, the user highlights and selects the "Change PIN" option from a menu provided on the screen view. For security purposes, this action requires the user to enter the current PIN number for verification in screen view 3608. The user is requested to enter a new PIN in screen view 3610 and to re-enter the PIN again for verification purpose in screen view 3612. According to one embodiment of the present invention, the PIN comprises six numerical digits for easy remembrance and can be extended to any reasonable length. In another embodiment, the PIN comprises alpha-numerical digits, if the mobile device has a full keyboard. In one embodiment, the PIN comprises case-sensitive alpha-numerical digits. In another embodiment, the PIN comprises not case-sensitive alpha-numerical digits. In one embodiment, the PIN is fixed length. In another embodiment, the PIN is variable length with pre-determined minimum length and maximum length.

A message is sent to the MFTS to notify the MFTS to change the PIN and store the changed PIN in the user database of the MFTS. The MFTS sends a confirmation message back to the user's mobile device to inform the user that the PIN is successfully changed, and this message is displayed on the screen view 3614. Here an option button "Main Menu" brings the user to the main menu screen view 3616 of the mobile wallet application.

Figure 37C:
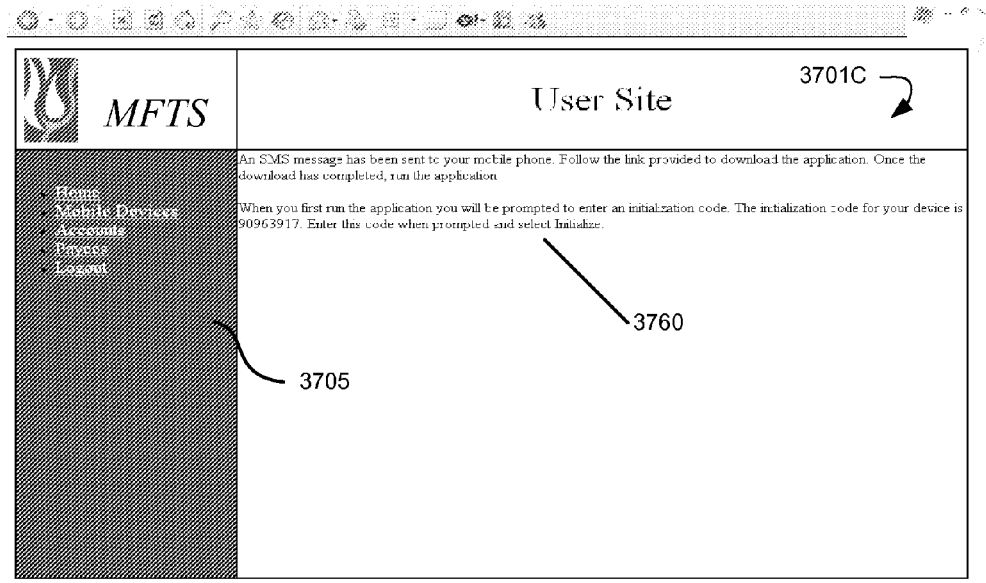
Figure 37D:
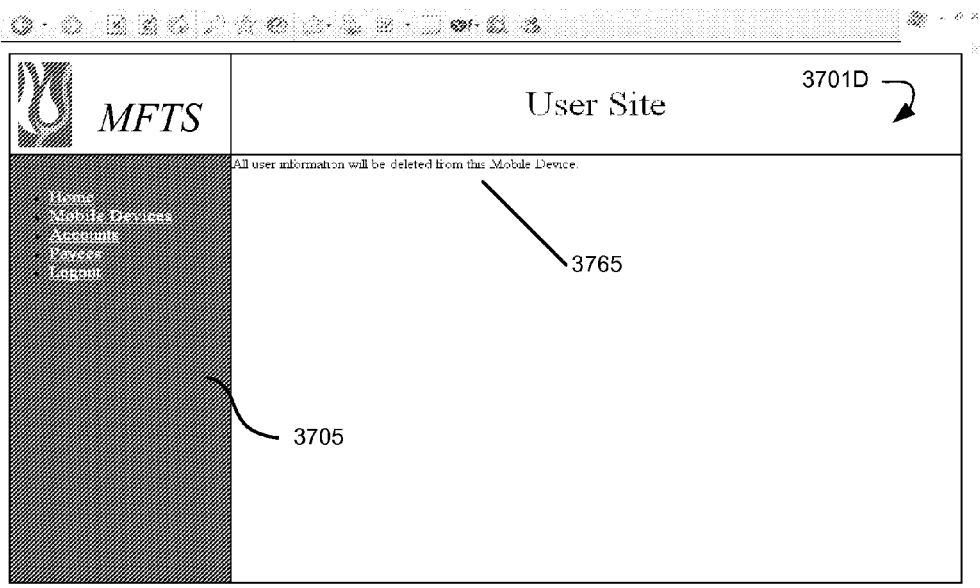

Turning next to FIG. 37, consisting of FIGS. 37A-37D, for a discussion of a user interface comprising screen displays of a web application input/output interface illustrating aspects of user enrollment for use of a mobile financial transaction system (MFTS), through a web application user site, according to an aspect of the present invention. FIG. 37 is an illustrative screen display of the web application 154, in particular, the user site web application 153 (FIG. 2). In particular, FIG. 37A illustrates aspects of enrollment of a user for use of the services provided by the MFTS 18. FIGS. 37B, 37C, & 37D illustrate aspects of adding or editing mobile devices, and editing aspects of a mobile device.

In accordance with an aspect of the present invention, the web application provides a User Site screen display 3701 which includes a first region 3705 including a plurality of selectable links or buttons for pre-determine functions, a second region 3710 for data entry, and a plurality of user control 3715 to provide specific functionality. In the first region 3705, selectable links labeled "Mobile Devices", "Accounts", "Payees", and "Logout" are provided. A user's selection of the Mobile Devices link presents the display as shown in 3701, which enables a user manage Mobile Devices for use in connection with the MFTS according to an aspect of the invention. A user's activation of Accounts links provides a display as will be discussed in connection with FIG. 38. A user's activation of the Payee's link provides a user's display as shown in FIG. 39 as will be discussed below.

The data entry second region 3710 displays the mobile numbers of any Mobile Devices that have previously been enrolled by the current user for use with the MFTS 18. The second region 3710 shows a single Mobile Device number (404) 505-6060, which is an exemplary mobile telephone number.

The selectable user control 3715 provides commands to implement functions in conjunction with enrolled mobile number(s). According to an aspect of the invention, presently considered a preferred embodiment, the user control 3715 comprises an "Add Device" button 3717, an "Initialize Device" button 3720, an "Edit Device" button 3725, a "Lost Device" button 3730, an "Unlock Device" button 3735, and a "Delete Device" button 3740.

These functions are self-explanatory, and will be understood by those skilled in the art. In one embodiment, the "Lost Device" function is to disable a reported lost mobile device for user's protection. The "Unlock Device" function is to re-enable a disabled mobile device or re-activate a mobile device after several consecutive failed logins. The "Delete Device" function is to remove an enrolled mobile device from mobile financial transaction system service.

User activation of either the "Add Device" button 3717 or the "Edit Device" button 3725 causes the MFTS web application to provide a screen display 3701B, as shown in FIG. 37B. The display screen 3701B includes a data entry region 3745 for entry of a mobile device phone number, into which a user can enter a number. A "Submit Query" button 3750 is provided to cause the web application to utilize the number entered into the data entry region 3745 and enter/retrieve user information corresponding to the mobile device number such that information may be entered for use in connection with the MFTS 18, or that properties or information relating to a pre-entered number may be edited. The "Add Device" button 3717 and the "Edit Device" button 3725 allow the user to enter detailed account information related to the mobile device. The information related to the mobile device comprises: user name, mailing address, billing address, web access username and password.

FIG. 37C illustrates a User Site display screen 3701C which is displayed to a user upon entry of a new mobile device number, in order to configure the Mobile Device for use with the MFTS 18 in accordance with aspects of the invention. According to one embodiment of the present invention, upon receipt of a newly-entered mobile device number for use in the system, a text (SMS) message is transmitted to the mobile device with the mobile device number entered. This SMS message, in accordance with an aspect of the invention, provides information to the user at the mobile device for downloading and installation of a mobile device application so as to configure the mobile device for use in connection with the system. Instructional information such as shown at 3760 is preferably displayed to the user, informing the transmission of the text message and the instruction. Additionally, and in accordance with an aspect of the invention, an initialization code is provide for the mobile device for security purposes, with a prompt to the user to enter the initialization on code upon running of the mobile device application on the mobile device.

FIG. 37D provides a display screen 3701D comprising a message 3765 displayed in response to user activation of the "Delete Device" button 3740 in FIG. 37A.

FIG. 38 illustrates various exemplary User Site display screens 3801 that are displayed by the web application 154 in response to user activation of the Accounts link or button in the controller region 3705. In FIG. 38A, a display screen of 3801A is initially provided in response to activation of the "Accounts" button. The display screen 3801A includes an information display region 3805 comprising a listing of one or more accounts associated with the user presently interacting with the MFTS 18, an informational display region 3810 displaying specific and detailed information regarding a selected account, shown highlighted in region 3805, and a plurality of control buttons 3815 to implement functions with respect to a selected account. For example, the account "Kyle's Checking" is shown highlighted in region 3805, and specific information regarding the selected account such as routing number, account number, account nickname, etc., is shown in informational display region 3810.

In accordance with an aspect of the invention, the user controls 3815 include an "Add Account" dropdown menu 3817, an "Edit Selected" button 3820, and a "Delete Selected" button 3825. User selection of the "Add Account" menu 3817 or activation of the "Edit Selected" button 3820 leads to a display screen such as shown in FIG. 38B as screen 3801B.

Figure 38A:
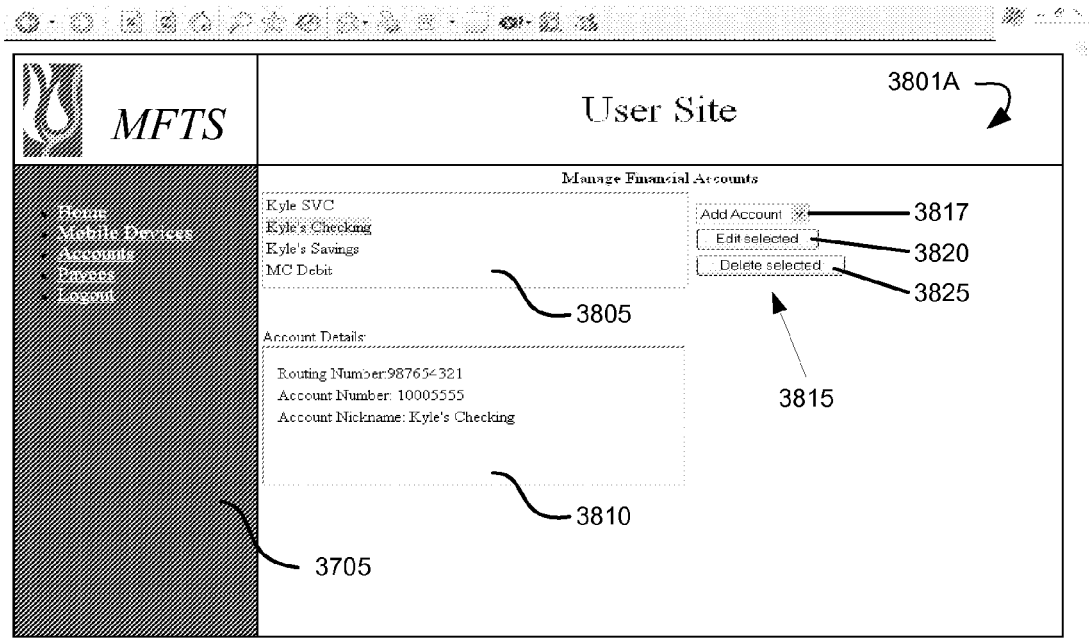
Figure 38B:
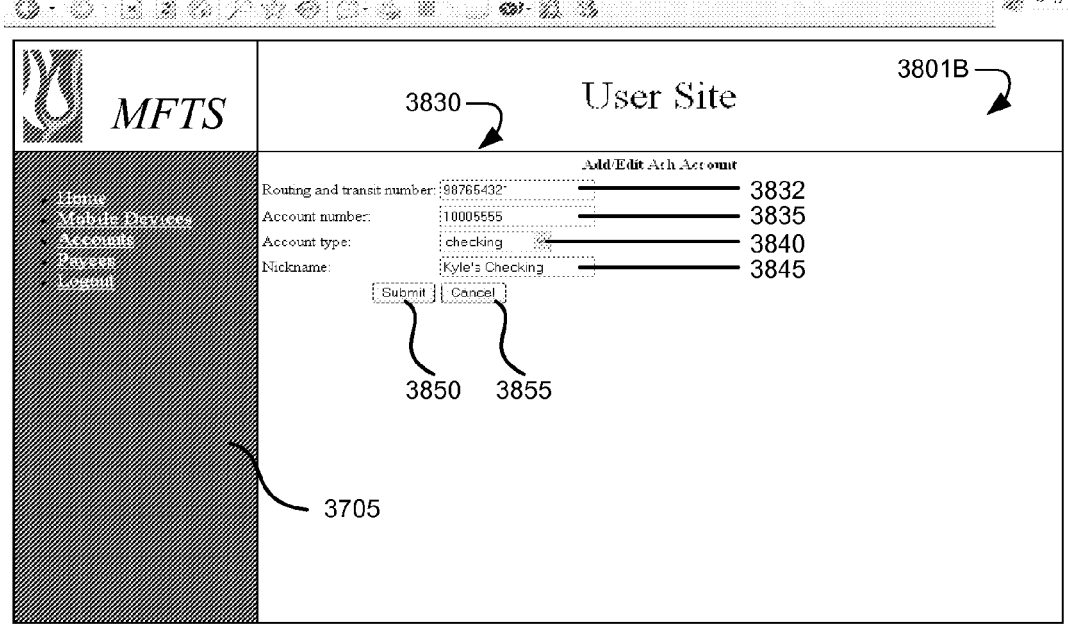

FIG. 38B illustrates aspects of the web application for editing information relating to a selected account. The display screen 3801A includes exemplary data entry regions 3830 for displaying and editing specific information relating to a selected account. For example, in accordance with an aspect of the invention, there is provided a region for entry and editing of routing and transit number 3832, entry and editing of an account number 3835, entry and edit of account type 3840, and entry and editing of a nickname for an account 3845. A "Submit" button 3850 is provided to update and save the information, and a "Cancel" button 3855 is provided as operative in a manner known to those skilled in the art.

Figure 38C:
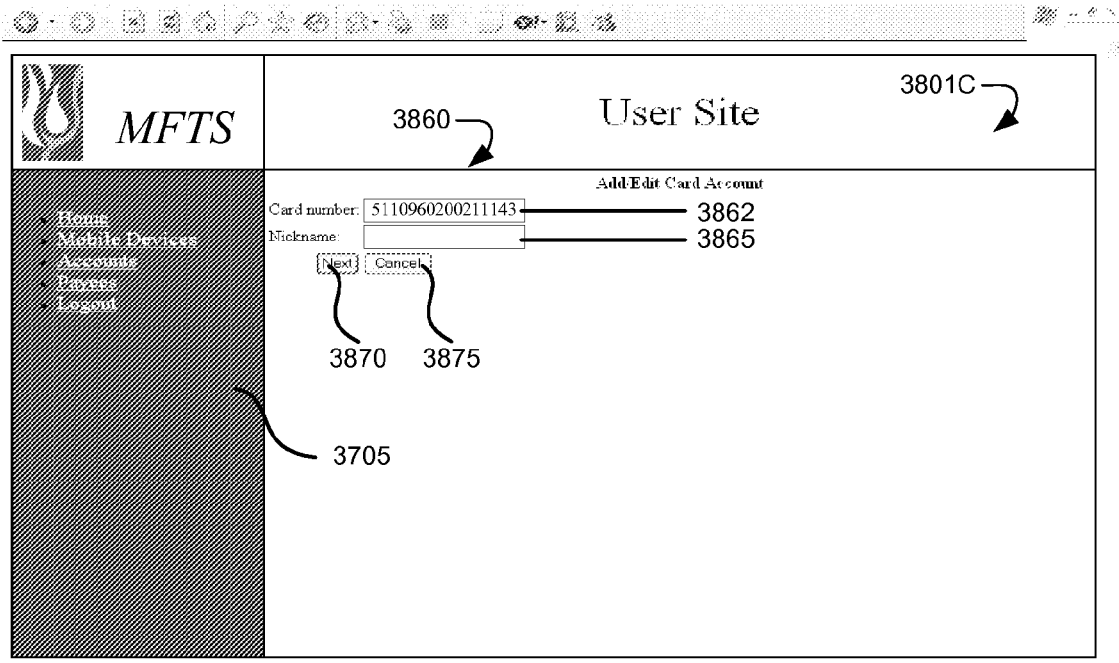

FIG. 38C is an exemplary User Site display screen 3801C that is displayed by the web application 154 in response to user selection of an account in region 3805 (FIG. 38A) that is a card type account, for example, a credit card or a stored value card, as opposed to a bank account, such as shown in FIG. 38B. The display 3801C includes an information display region 3860 for information relating to a card type account. As shown in FIG. 38C, the display areas include a card number display region 3862 and a nickname region 3865, for entry of a short name for the account to promote remembrance. A "Next" button 3870 moves to another account of a plurality of accounts stored and maintained by the MFTS 18, and the "Cancel" button 3875 operates in a known manner.

Figure 38D:
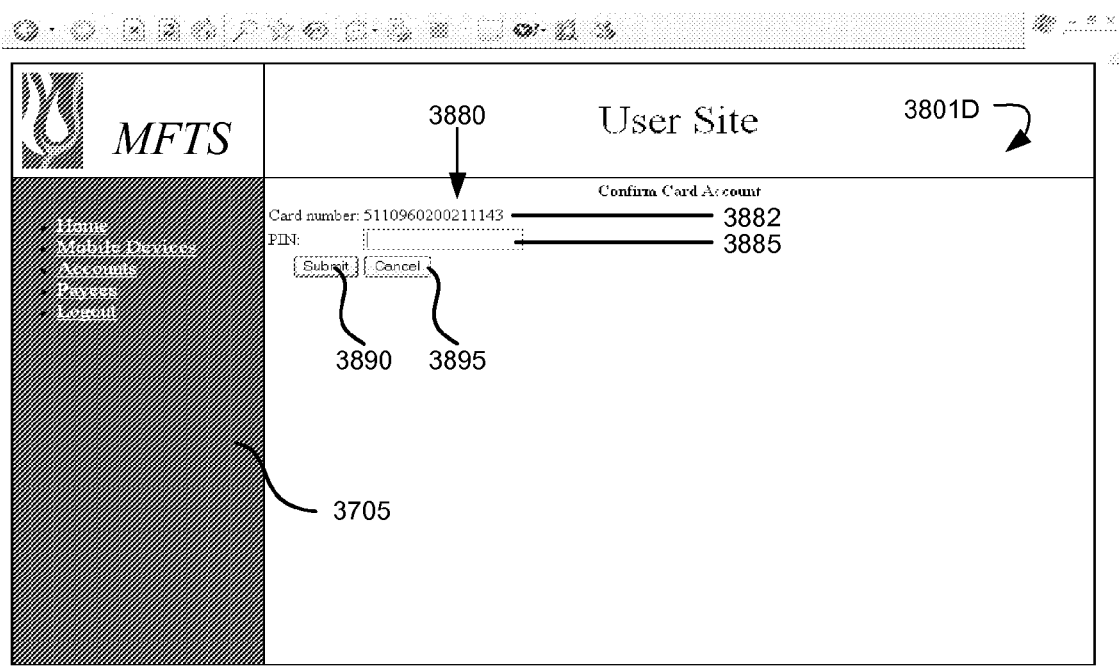

FIG. 38D illustrates an exemplary display screen 3801D, that is displayed in response to a user change of information relating to a card account, e.g. if a user changes any information relating to a card account such as in FIG. 38C. The display screen 3801D includes an informational display region 3880 for displaying a card number of an account that has been selected for entry or editing, and a personal identification number (PIN) data entry region 3885 for entry of a PIN associated with a card account for security purposes. A "Submit" button 3890 and a "Cancel" button 3895 are provided and are operative in the known manner.

Identifying Information

FIG. 39 illustrates User Site display screen 3901 that is displayed in response to user activation of the "Payees" link or button in region 3705, for managing payees for receiving payments in accordance with an aspect of the invention. In FIG. 39A, the "Manage Payee" display screen 3901A includes a region 3905 for displaying information relating to payees that have been previously input by a user into the MFTS 18, either by the web application 154 or, as appropriate, via mobile device application entry. As shown in FIG. 3901A, at least information relating to a name of a payee and a mobile device number of the payee is displayed. In accordance with another aspect of the invention, a payee in the system has other information stored in association therewith, including an address of the payee (if available), a default payment method, a preferred account number for one or more payment methods available to the particular payee, and other identifying information. As shown in FIG. 39A, a particular payee may be highlighted or displayed specific information and for operations such as editing or deletion. Also shown in FIG. 39A, are control buttons for an "Add Payee" button 3910, an "Edit Selected" button 3915, and a "Delete Selected" button 3920. User selected of the "Add Payee" button 3910 or the "Edit Selected" button 3915 produces a display such as is shown in FIG. 39B.

FIG. 39B is an exemplary User Site display screen 3901B that is displayed in response to a user of the web application electing to add a payee or edit a selected payee. The exemplary display screen 3901b includes a data entry and display region 3925, which displays information relating to a particular payee that was selected in FIG. 39A, and allows entry or updating of the information. In this embodiment of the invention, there is provided a "First Name" field 3927, and a "Last Name" field 3930, and a "Phone Number" field 3935. In accordance with another aspect of the invention, address information, account number information, a default selection for payment method field, and other information is also provided. A "Submit" button 3940 and a "Cancel" button 3945 are provided and are operative in the known manner.

Those skilled in the art will understand and appreciate from a review of FIGS. 37-39 that there is provided an internet-accessible web application input/output interface 154 that allows users to input and edit information relating to "Mobile Devices", "Accounts", and "Payees" so as to provide functionality as described elsewhere in this document.

FIG. 40 is an alternative embodiment of user display screens generated by a web application input/output interface 154, construction in accordance with an alternative aspect of the invention. FIGS. 40-42 provide an alternative method for user interaction with the web application, with a somewhat different manner of displaying information and receiving user interaction with respect to selected accounts, mobile devices, billing entities, and payment sources.

FIG. 40 illustrates an exemplary display screen 4001 provided by the web application for managing accounts. The display screen 4001 is provided by the web application for managing accounts. The display screen 4001 includes three selectable tabs, an "Account Summary" tab 4005, a "Billing Entities" tab 4010, and a "Payment Sources" tab 4015. Shown selected in FIG. 40 is the "Account Summary" tab 4005. The information associated with the "Account Summary" tab 4005 includes information relating to the particular user including an account number, mobile number associated with the user's mobile device, and other identifying information as is shown. Other relevant information relating to the user such as address information, registration date information and other information relating to billing entities and payment sources is preferably provided in a display area 4035. An "Edit" button 4020 is provided for editing the information displayed, while a "New" button 4025 is provided for generating a data entry display screen that would allow entry of the information as is shown in FIG. 40.

FIG. 41 is an exemplary alternative display screen 4101 is displayed in response to user activation of the "Billing Entities" tab 4010. The information displayed in the display screen 4101 includes information identifying the specific account or mobile device number for the current user, as well as a display region 4120 that displays information regarding a plurality for "billers" or billing entities, or people to whom a payment can be made, e.g., a payee and "pay anyone" payment scenarios as described elsewhere in this document. An "Edit" button 4020 and a "New" button 4025 are provided and are operative in a manner described above and will be known to those skilled in the art.

The billers data region 4120 as shown in FIG. 41 includes selectable tabs for a plurality of billers, 4105, 4110, and 4115. The activation of the "New" button 4025 adds a new tab and a new page for a new "biller". The exemplary tab 4110 is shown as selected, and displays information relating to a particular biller for which information has been previously entered. In the example shown in FIG. 41, an exemplary billing entity George Electricity Company is shown together with a relevant account number, address, and other identifying information required so as to enable the MFTS 18 to receive a bill from the billing entity and generate a payment to this billing entity in accordance to the aspects of the invention.

Also, provided in the screen 4101 is a current balanced data display region 4125, which displays information relating to a current account balance with respect to the identified and selected biller, e.g., "Biller 2" shown in tab 4110.

FIG. 42 is an exemplary alternative web application display in the form of a display screen 4201 displayed in response to selection of the payment sources tab 4015. The exemplary display screen 4201 includes the information identifying the account being viewed such as account number, mobile number, etc., as in the previous screen, and also provides an "Edit" button 4020 and a "New" button 4025 operative as described elsewhere and in the known manner.

The "Payment Sources" tab 4015 also includes an information display region 4220 for displaying information relating to a selected account. A plurality of selectable tabs with respect to specific accounts available to the user are provided in exemplary selectable tabs 4205, 4210, 4215, which are identified as "Bank 1", "Bank 2", and "Bank 3". Shown selected in FIG. 42 is "Bank 2" 4210. The display region 4220 thus display information associated with the selected payment source, which in this case identifies a specific financial institution and a specific account associated with the selected financial institution. For example, the information preferably include the name of the payment source, e.g., "Georgia Best Bank", and the corresponding account number, account type, address, and other identifying information. Also, preferably provided is information display region 4225 for displaying a current balance associated with the selected account.

From the foregoing, those skilled in the art will understand and appreciate that the web application input/output interface 154 can alternatively provide display screens and controls such as shown in FIGS. 40-42, to allow user data entry and editing payment sources, billing entities or other payees, in accordance with aspects of the invention.

The foregoing description of the exemplary embodiments of the inventions has been presented only for the purposes of illustration and description and is not intended to be exhaustive or to limit the invention to the precise forms disclosed. Many modifications and variations are possible in light of the above teachings.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing in spirit and scope. Accordingly, the scope of the present invention is defined by the appended claims rather than the foregoing description and the exemplary embodiments described therein.

What is claimed is:

1. A method for making a financial payment to a payee via a stored value (SV) card utilizing a mobile device connected for communications via a wireless network, the mobile device being connected via the wireless network with a mobile financial transaction system (MFTS) that is operatively coupled to a payment instruction recipient capable of issuing a SV card to a payee, comprising the steps of:

receiving user input at the mobile device of information identifying the payee to which a payment is to be made;

displaying a plurality of selectable payment methods on the mobile device corresponding to the payment to be made to the identified payee, the plurality of selectable payment methods including a stored value (SV) card payment method;

receiving selection at the mobile device of the SV card payment method;

receiving a SMS message and automatically activating an application in response to receiving the SMS message;

generating, in response to activating the application, a mobile payment instruction comprising information corresponding to the identified payee and indicating the SV card payment method; and wirelessly communicating the mobile payment instruction from the mobile device to the MFTS, whereby the MFTS communicates a payment instruction to the payment instruction recipient and the payment instruction recipient effects the payment to the identified payee via a stored value card by issuing a new SV card to the identified payee or adding value to a preexisting SV card of the identified payee.

2. The method of claim 1, wherein the information identifying the payee comprises identifying the payee by selection of one of a plurality of prestored names in the mobile device.

3. The method of claim 1, wherein the information identifying the payee comprises identifying the payee by user entry of a mobile number.

4. The method of claim 1, wherein the plurality of selectable payment methods includes: a recipient-defined method, an ACH funds transfer, a paper check, and a stored value (SV) card.

5. The method of claim 1, wherein the payment instruction recipient is one of a financial service provider, a billing aggregator, a stored value card issuer, a retail establishment that handles stored value cards.

6. The method of claim 1, further comprising the steps of:

storing a cached account balance in the mobile device representative of the a balance in at least one account maintained by a mobile device user at a financial service provider as of a particular date;

receiving updated account balance information for the at least one account; and in response to receipt of updated account balance information, displaying updated account balance information corresponding to the at least one account via the mobile device.

7. The method of claim 1, further comprising the step of receiving selection of at least one selectable payment source for the payment at the mobile device.

8. The method of claim 7, wherein the selection of the at least one selectable payment source for making the payment includes selection of a financial service provider and selection of a particular account associated with the selected financial service provider for making the payment.

9. The method of claim 7, wherein selection of the at least one selectable payment source causes the MFTS to retrieve current account information from one or more financial service providers and wirelessly communicate the current account information to the mobile device upon receipt of such information from the one or more financial service providers, and wherein the mobile device is operative to display the current account information.

10. The method of claim 1, wherein at least some payee information is input via an Internet-accessible web site accessible for input of payee information and is thereafter wirelessly communicated to the mobile device for display.

11. The method of claim 1, further comprising the step of providing a Mobile Wallet application on the mobile device.

12. The method of claim 11, wherein the Mobile Wallet application provides a display on the mobile device of selectable commands including a Pay Anyone command, a Payment Source selection command, and a Payment Method selection command.

13. The method of claim 12, wherein activation of a Payment Source selection command causes the MFTS to retrieve current account information from a selected financial service provider and wirelessly communicate current account information to the mobile device upon receipt of such information from the selected financial service provider.

14. The method of claim 12, further comprising the step of receiving selection of a payment source for making the payment in response to display of a Payment Source selection command via the Mobile Wallet.

15. The method of claim 12, wherein the selection of a payment source for making the payment includes selection of a financial service provider and selection of a particular account associated with the selected financial service provider for making the payment.

16. The method of claim 15, further comprising the step of wirelessly receiving a payment confirmation message at the mobile device from the MFTS in response to receipt of the payment confirmation message from the payment instruction recipient.

17. The method of claim 1, further comprising the step of displaying a payee's pre-existing SV card account number for confirmation that the payment is to be made by crediting a payee's pre-existing SV card.

18. The method of claim 17, wherein information corresponding to the payee's pre-existing SV card is stored in an MFTS database and wirelessly communicated to the mobile device for display and confirmation by user command.

19. The method of claim 1, further comprising the step of providing a data entry screen on the mobile device for entry of a payee's pre-existing SV card account number for purposes of crediting a payee's pre-existing SV card.

20. A mobile device for making a financial payment to a payee via a stored value (SV) card, the mobile device being connected via a wireless network with a mobile financial transaction system (MFTS) that is operatively coupled to a payment instruction recipient capable of issuing a SV card to a payee, comprising:

a display configured for displaying information relating to a plurality of selectable payment methods for effecting a payment to the payee, the plurality of selectable payment methods including a stored value (SV) card payment method;

a user input means for receiving information identifying the payee, and user selection of a payment method from the plurality of selectable payment methods;

a wireless communications component configured for communicating with the MFTS via the wireless network; and a mobile device processor operative to:
receive via the user input means information identifying the payee to which the payment is to be made;

display the plurality of selectable payment methods on the display corresponding to the payment to be made to the identified payee, the plurality of selectable payment methods including the SV card payment method;

receive via the user input means selection of the SV card payment method;

receiving a SMS message and automatically activating an application in response to receiving the SMS message;

generate, in response to activating the application, a mobile payment instruction comprising information corresponding to the identified payee and indicating the SV card payment method; and wirelessly communicate via the wireless communications component the mobile payment instruction from the mobile device to the MFTS, whereby the MFTS communicates a payment instruction to the payment instruction recipient and the payment instruction recipient effects the payment to the identified payee via a stored value card by issuing a new SV card to the identified payee or adding value to a preexisting SV card of the identified payee.

21. The device of claim 20, wherein the information identifying the payee comprises identifying the payee by selection of one of a plurality of prestored names in the mobile device.

22. The device of claim 20, wherein the information identifying the payee comprises identifying the payee by user entry of a mobile number.

23. The device of claim 20, wherein the plurality of selectable payment methods includes: a recipient-defined method, an ACH funds transfer, a paper check, and a stored value (SV) card.

24. The device of claim 20, wherein the payment instruction recipient is one of a financial service provider, a billing aggregator, a stored value card issuer, a retail establishment that handles stored value cards.

25. The device of claim 24, wherein the mobile device stores a cached account balance in the mobile device representative of a balance in at least one account maintained by a mobile device user at a financial service provider as of a particular date;

wherein the mobile device processor receives updated account balance information for the at least one account and wirelessly communicates updated account balance information from the MFTS to the mobile device via the wireless communications component; and wherein in response to receipt of updated account balance information from the MFTS, the mobile device displays updated account balance information via the display corresponding to the account.

26. The device of claim 20, wherein the mobile device processor is further operative to receive selection of at least one selectable payment source for the payment.

27. The device of claim 26, wherein the selection of the at least one selectable payment source for making the payment includes selection of a financial service provider and selection of a particular account associated with the selected financial service provider for making the payment.

28. The device of claim 26, wherein selection of the at least one selectable payment source causes the MFTS to retrieve current account information from one or more financial service providers and wirelessly communicate the current account information to the mobile device upon receipt of such information from the one or more financial service providers, and wherein the mobile device processor is operative to display the current account information via the display.

29. The device of claim 20, wherein at least some payee information is input via an Internet-accessible web site accessible for input of payee information and is thereafter wirelessly communicated to the mobile device via the wireless communications component for display.

30. The device of claim 20, wherein the mobile device processor operates software comprising a Mobile Wallet application.

31. The device of claim 30, wherein the Mobile Wallet application provides a display on the mobile device of selectable commands including a Pay Anyone command, a Payment Source selection command, and a Payment Method selection command.

32. The device of claim 31, wherein activation of a Payment Source selection command causes the MFTS to retrieve current account information from a selected financial service provider and wirelessly communicate current account information to the mobile device via the wireless communications component upon receipt of such information from the selected financial service provider.

33. The device of claim 31, wherein the mobile device processor is further operative to receive user input corresponding to selection of a payment source for making the payment in response to display of a Payment Source selection command via the Mobile Wallet.

34. The device of claim 31, wherein the selection of a payment source for making the payment includes selection of a financial service provider and selection of a particular account associated with the selected financial service provider for making the payment.

35. The device of claim 20, wherein the mobile device processor is further operative to wirelessly receive a payment confirmation message at the mobile device from the MFTS via the wireless communications component in response to receipt of the payment confirmation message from the payment instruction recipient.

36. The device of claim 20, wherein the mobile device processor is further operative to display a payee's pre-existing SV card account number for confirmation that the payment is to be made by crediting a payee's pre-existing SV card.

37. The device of claim 36, wherein information corresponding to the payee's pre-existing SV card is stored in an MFTS database and wirelessly communicated to the mobile device via the wireless communications component for display and confirmation by user command.

38. The device of claim 20, wherein the mobile device processor is further operative to provide an entry screen on the mobile device display for entry of a payee's pre-existing SV card account number for purposes of crediting a payee's pre-existing SV card.

39. A mobile device for making a financial payment to a payee via a stored value (SV) card, the mobile device being connected via a wireless network with a mobile financial transaction system (MFTS) that is operatively coupled to a payment instruction recipient capable of issuing a SV card to a payee, comprising:

a means for receiving user input at the mobile device of information identifying the payee to which a payment is to be made;

a mobile device display configured for displaying a plurality of selectable payment methods corresponding to the payment to be made to the identified payee, the plurality of selectable payment methods including a stored value (SV) card payment method;

a means for receiving selection at the mobile device of the SV card payment method;

a means for receiving a SMS message and automatically activating an application in response to receiving the SMS message;

a means for generating, in response to activating the application, a mobile payment instruction comprising information corresponding to the identified payee and indicating the SV card payment method; and a means for wirelessly communicating the mobile payment instruction from the mobile device to the MFTS, whereby the MFTS communicates a payment instruction to the payment instruction recipient and the payment instruction recipient effects the payment to the identified payee via a stored value card by issuing a new SV card to the identified payee or adding value to a preexisting SV card of the identified payee.

40. A non-transitory computer-readable medium that is usable by a mobile device, the mobile device being connected via a wireless network with a mobile financial transaction system (MFTS) that is operatively coupled to a payment instruction recipient capable of issuing a SV card to a payee, the computer-readable medium having computer-executable instructions for performing steps comprising:

receiving user input at the mobile device of information identifying the payee to which a payment is to be made;

displaying a plurality of selectable payment methods on the mobile device corresponding to the payment to be made to the identified payee, the plurality of selectable payment methods including a stored value (SV) card payment method;

receiving selection at the mobile device of the SV card payment method;

receiving a SMS message and automatically activating an application in response to receiving the SMS message;

generating, in response to activating the application, a mobile payment instruction comprising information corresponding to the identified payee and indicating the SV card payment method;

and wirelessly communicating the mobile payment instruction from the mobile device to the MFTS, whereby the MFTS communicates a payment instruction to the payment instruction recipient and the payment instruction recipient effects the payment to the identified payee via a stored value card by issuing a new SV card to the identified payee or adding value to a preexisting SV card of the identified payee.

* * * * *